(12) United States Patent
Nakajima et al.

(10) Patent No.: US 7,285,071 B2
(45) Date of Patent: Oct. 23, 2007

(54) DOWNSHIFT CONTROL FOR AUTOMOTIVE AUTOMATIC TRANSMISSION

(75) Inventors: Nobuyori Nakajima, Kariya (JP); Takaji Murakawa, Anjo (JP); Tetsuji Kozaki, Aichi-ken (JP)

(73) Assignee: Denso Corporation, Kariya, Aichi-pref. (JP)

( * ) Notice: Subject to any disclaimer, the term of this patent is extended or adjusted under 35 U.S.C. 154(b) by 279 days.

(21) Appl. No.: 11/207,195

(22) Filed: Aug. 19, 2005

(65) Prior Publication Data

US 2006/0040791 A1 Feb. 23, 2006

(30) Foreign Application Priority Data

Aug. 19, 2004 (JP) ............................. 2004-239811

(51) Int. Cl.
B60W 10/06 (2006.01)
B60W 10/10 (2006.01)
(52) U.S. Cl. ................ 477/107; 477/101; 477/118; 477/906
(58) Field of Classification Search ............... 477/118
See application file for complete search history.

(56) References Cited

U.S. PATENT DOCUMENTS

| 4,962,835 | A | * | 10/1990 | Pruss | .................. | 477/125 |
|---|---|---|---|---|---|---|
| 6,740,005 | B2 | * | 5/2004 | Watanabe et al. | ............ | 477/110 |
| 6,953,417 | B2 | * | 10/2005 | Koenig | .................. | 477/181 |
| 7,204,787 | B2 | * | 4/2007 | Maekawa et al. | ............ | 477/111 |
| 2003/0027685 | A1 | * | 2/2003 | Watanabe et al. | ............ | 477/107 |
| 2006/0046896 | A1 | * | 3/2006 | Nakajima et al. | ............ | 477/107 |

FOREIGN PATENT DOCUMENTS

| JP | 7-247874 | 9/1995 |
|---|---|---|
| JP | 2924463 | 5/1999 |

OTHER PUBLICATIONS

U.S. Appl. No. 11/114,052, filed Apr. 26, 2005.
U.S. Appl. No. 11/108,891, filed Apr. 19, 2005.

* cited by examiner

*Primary Examiner*—Sherry Estremsky
(74) *Attorney, Agent, or Firm*—Nixon & Vanderhye P.C.

(57) ABSTRACT

An automotive automatic transmission control apparatus is provided which works to increase the power of an engine in response to a request to down-shift the gear of an automatic transmission for developing the engine braking. The control apparatus includes a fail-safe circuit working to stop increasing the power of the engine when a defect in operation of a transmission hydraulic control circuit is detected after the hydraulic control circuit starts to control the hydraulic pressures to achieve the downshift of the automatic transmission. This eliminates or alleviates a problem, such as unwanted acceleration of the vehicle during the control of the downshift in the transmission.

31 Claims, 38 Drawing Sheets

FIG. 4

| RANGE \ CLUTCH BRAKE | C1 | B1 | C2 | C0 | B0 |
|---|---|---|---|---|---|
| R | ○ | | | | ○ |
| P·N | | | | | |
| 1ST SPEED | | | | ○ | ○ |
| 2ND SPEED | | ○ | | ○ | |
| 3RD SPEED | | | ○ | ○ | |
| 4TH SPEED | | ○ | ○ | | |

○ CLUTCH ENGAGED TO TRANSMIT TORQUE

NORMAL ETC DOWNSHIFT

ETC DOWNSHIFT IN EVENT OF HYDRAULIC CONTROL FAILURE

FIG. 21

2-1 SHIFT THROTTLE OPENING

| Nt \ WATER TEMP. | 20 | 40 | 60 | 80 |
|---|---|---|---|---|
| 500 | 5 | 4 | 3 | 2 |
| 1000 | 8 | 6 | 5 | |
| 1500 | 10 | 8 | 7 | |

3-1 SHIFT THROTTLE OPENING

| Nt \ WATER TEMP. | 20 | 40 | 60 | 80 |
|---|---|---|---|---|

DOWNSHIFT CONTROL FOR AUTOMOTIVE AUTOMATIC TRANSMISSION

CROSS REFERENCE TO RELATED DOCUMENT

The present application claims the benefit of Japanese Patent Application No. 2004-239811 filed on Aug. 19, 2004, the disclosure of which is incorporated herein by reference.

BACKGROUND OF THE INVENTION

1. Technical Field of the Invention

The present invention relates generally to an automotive automatic transmission controller equipped with a feature to increase an engine power for minimizing a shift shock occurring during downshift control executed according to a driver's deceleration intention to develop the engine braking.

2. Background Art

Most modern automotive automatic transmissions are designed to switch between hydraulic control lines to establish engagement and disengagement of frictional elements such as clutches and brakes selectively for achieving a desired one of speeds. When the accelerator of the vehicle is released fully during running on a downhill, but the engine braking is insufficient, the driver of the vehicle usually turns off the overdrive switch or moves the shift lever from the D to S or L range to make a downshift for increasing the engine braking.

Such a downshift to increase the engine braking with the accelerator released will result in an increased gear ratio of the automatic transmission, thus elevating the speed of the engine. In such a running mode of the vehicle to develop the engine braking, the throttle valve is usually closed, so that the torque is transmitted from an output shaft of the transmission to the engine through some of the frictional elements working to establish an after-downshift speed to increase the speed thereof. This may cause the time required for the downshift to be increased, thus giving rise to a delay in the engine braking or inertia torque arising from the increased speed of the engine to appear as braking torque, which results in an instantaneous increase in the engine braking, leading to a large-scale shift shock. A rapid rise in torque transmitted through the frictional elements of the automatic transmission under hydraulic control will result in a quick rise in speed of the engine, so that the downshifting time decreases, but however, the braking torque increases excessively, thus resulting in a more increase in the shift shock.

Japanese Patent No. 2924463 teaches a transmission control system for avoiding the above problems. This system includes a function to increase the power of the engine temporarily upon a downshift to the gear of the automatic transmission which creates the engine braking with the accelerator released and a timer which measures the elapsed time from an output of a gear shifting command signal to switch between hydraulic lines to establish a downshift of the transmission. The system works to activate the engine power increasing function based on the elapsed time, as measured by the timer, in order to rise the speed of the engine during an interval between start of slipping of a high-speed one (i.e., an off-going clutch) of the frictional elements of the automatic transmission which is to be disengaged to achieve the downshift and completion of engagement of a low-speed one of the frictional elements which is to be engaged to achieve the downshift. The system determines the time the engine power increasing function should be initiated as a function of an operating parameter of the vehicle, such as the oil temperature in a hydraulic control circuit of the automatic transmission or the speed of the engine, which is a factor of at least one of lags in engagement or disengagement of the frictional elements and increase in the power of the engine.

Usually, there are time lags in completion of engagement or disengagement of the frictional elements of the automatic transmission and between start of control to open the throttle valve and an actual rise in power of the engine. The system also works to determine the time the engine power increasing control should be initiated so as to compensate for the time lags for reducing the shift shock and shortening the shifting time. The above patent also teaches control of opening the throttle valve so that the engine blows up at a time a high-speed one of the frictional elements starts to slip.

Japanese Patent First Publication No. 7-247874 also teaches techniques to launch the engine power increasing control before start of an actual gear shift of the automatic transmission for compensating for a time lag inherent in the engine power increasing control.

The above systems are, as already described, designed to launch the engine power increasing control during an interval between start of control of hydraulic pressure on the automatic transmission for achieving a downshift and start of an actual downshift in the automatic transmission in order to compensate for the time lag between start of control to increase the power of the engine and an actual rise in power of the engine. The actual downshift is accomplished by lowering the torque transfer capacity of an off-going one of the frictional elements (i.e., the hydraulic pressure acting on the off-going one) which works to transfer the torque before the downshift. Therefore, if a defect occurs in a hydraulic controller working to control the torque transfer capacity, it will result in an error in dropping the hydraulic pressure acting on the off-going frictional element and a difficulty in achieving the downshift. For instance, in a case of a 4-3 downshift, the power of the engine is increased while a $4^{th}$ speed gear ratio is locked without developing the engine braking, thus resulting in undesirable acceleration of the vehicle during the hydraulic control for the downshift.

SUMMARY OF THE INVENTION

It is therefore a principal object of the invention to avoid the disadvantages of the prior art.

It is another object of the invention to provide an improved structure of an automatic transmission controller designed to eliminate or alleviate a problem, such as unwanted acceleration of a vehicle during control of a downshift in the transmission executed in response to a request from a driver of the vehicle, which arises from, for example, a failure in operation of a hydraulic pressure control device.

According to one aspect of the invention, there is provided an automatic transmission control apparatus which may be employed in automotive vehicles. The automatic transmission control apparatus comprises: (a) a hydraulic control circuit which controls hydraulic pressures to be applied to a plurality of frictional elements such as clutches and brakes of an automatic transmission joined to an engine to selectively achieve engagement and disengagement of the frictional elements for establishing a required speed of the automatic transmission; (b) a defect detector working to detect a defect of the hydraulic control circuit; (c) an engine output increasing circuit designed to perform engine output increasing control to increase an output of the engine upon a downshift of the automatic transmission to develop engine braking in response to a request from an operator to decelerate a speed of the automatic transmission, the engine output increasing circuit initiating the engine output increasing control within an interval between start to control the hydraulic pressures through the hydraulic control circuit to achieve the downshift and start of an actual shift in speed of the automatic transmission; and (d) a fail-safe circuit working to stop the engine output increasing control immediately when the defect detector detects the defect of the hydraulic control circuit after the hydraulic control circuit starts to control the hydraulic pressures to achieve the downshift of the automatic transmission. This alleviates a problem such as unwanted acceleration of a vehicle during hydraulic control of a downshift in the transmission executed in response to a request from a driver of the vehicle.

In the preferred mode of the invention, the hydraulic control circuit includes a solenoid-operated hydraulic control valve working to control the hydraulic pressures to be supplied to the frictional elements of the automatic transmission. The defect detector works to detect a defect of one of a solenoid of the hydraulic control valve and a circuit line leading to the hydraulic control valve.

The automatic transmission control apparatus may be designed to be installed in a vehicle equipped with an electronic throttle system working to operate a throttle valve for the engine through an electronic actuator. The engine output increasing circuit works to control the amount of opening of the throttle valve to achieve the engine output increasing control. The fail-safe circuit works to close the throttle valve to stop the engine output increasing control.

The fail-safe circuit may work to establish a fuel cut in the engine to stop the engine output increasing control.

The fail-safe circuit may also work to correct the amount of retard of ignition timing in the engine to stop the engine output increasing control.

According to the second aspect of the invention, there is provided an automatic transmission control apparatus which comprises: (a) a hydraulic control circuit which controls hydraulic pressures to be applied to a plurality of frictional elements of an automatic transmission joined to an engine to selectively achieve engagement and disengagement of the frictional elements for establishing a required speed of the automatic transmission; (b) a gear shift detecting circuit working to detect start of an actual gear shift of the automatic transmission; (c) an engine output increasing circuit designed to perform engine output increasing control to increase an output of the engine upon a downshift of the automatic transmission to develop engine braking in response to a request from an operator to decelerate a speed of the automatic transmission, the engine output increasing circuit initiating the engine output increasing control within an interval between start to control the hydraulic pressures through the hydraulic control circuit to achieve the downshift and start of an actual shift in speed of the automatic transmission; (d) a timer working to measure an elapsed time from one of events where a request to make the downshift of the automatic transmission to develop the engine braking was outputted and where the hydraulic control circuit started to control the hydraulic pressures to achieve the downshift; and (e) a fail-safe circuit working to stop the engine output increasing control when the elapsed time, as measured by the timer, has reached a time selected to be longer than that required to initiate an actual shift of the automatic transmission normally, and the gear shift detecting circuit does not yet detect the actual gear shift of the automatic transmission.

In the preferred mode of the invention, when the gear shift detecting circuit detects a fact that a gear ratio that is a speed ratio of an input shaft to an output shaft of the automatic transmission has started to change to that upon completion of the downshift, the gear shift detecting circuit determines that the start of the actual gear shift of the automatic transmission has been detected.

When the gear shift detecting circuit detects a fact that a speed of an input shaft of the automatic transmission exceeds a product of a speed of an output shaft and a gear ratio of the automatic transmission before the downshift, the gear shift detecting circuit may determine that the start of the actual gear shift of the automatic transmission has been detected.

The automatic transmission control apparatus may be designed to be installed in a vehicle equipped with an electronic throttle system working to operate a throttle valve for the engine through an electronic actuator. The engine output increasing circuit works to control an amount of opening of the throttle valve to achieve the engine output increasing control. The fail-safe circuit works to close the throttle valve to stop the engine output increasing control.

The fail-safe circuit works to establish a fuel cut in the engine to stop the engine output increasing control.

The fail-safe circuit may also work to correct an amount of retard of ignition timing in the engine to stop the engine output increasing control.

According to the third aspect of the invention, there is provided an automatic transmission control apparatus which comprises: (a) a hydraulic control circuit which is responsive to a hydraulic pressure command to control hydraulic pressures to be applied to a plurality of frictional elements of an automatic transmission joined to an engine to selectively achieve engagement and disengagement of the frictional elements for establishing a required speed of the automatic transmission; (b) a gear shift detecting circuit working to detect start of an actual gear shift of the automatic transmission; (c) an engine output increasing circuit designed to perform engine output increasing control to increase an output of the engine upon a downshift of the automatic transmission to develop engine braking in response to a request from an operator to decelerate a speed of the automatic transmission, the engine output increasing circuit initiating the engine output increasing control within an interval between start to control the hydraulic pressures through the hydraulic control circuit to achieve the downshift and start of an actual shift in speed of the automatic transmission; and (d) a fail-safe circuit working to stop the engine output increasing control when a value of the hydraulic pressure command indicative of a value of the hydraulic pressure to be supplied to an off-going one of the frictional elements of the automatic transmission which is to be disengaged has dropped to within a pressure range low enough to eliminate a torque transfer capacity of the off-going one of the frictional elements, and the gear shift detecting circuit does not yet detect the actual gear shift of the automatic transmission.

In the preferred mode of the invention, when the gear shift detecting circuit detects a fact that a gear ratio that is a speed ratio of an input shaft to an output shaft of the automatic transmission has started to change to that upon completion of the downshift, the gear shift detecting circuit determines that the start of the actual gear shift of the automatic transmission has been detected.

When the gear shift detecting circuit detects a fact that a speed of an input shaft of the automatic transmission exceeds a product of a speed of an output shaft and a gear ratio of the automatic transmission before the downshift, the gear shift detecting circuit determines that the start of the actual gear shift of the automatic transmission has been detected.

The automatic transmission control apparatus may be designed to be installed in a vehicle equipped with an electronic throttle system working to operate a throttle valve for the engine through an electronic actuator. The engine output increasing circuit works to control an amount of opening of the throttle valve to achieve the engine output increasing control. The fail-safe circuit works to close the throttle valve to stop the engine output increasing control.

The fail-safe circuit works to establish a fuel cut in the engine to stop the engine output increasing control.

The fail-safe circuit may also work to correct the amount of retard of ignition timing in the engine to stop the engine output increasing control.

According to the fourth aspect of the invention, there is provided an automatic transmission control apparatus which comprises: (a) a hydraulic control circuit which controls hydraulic pressures to be applied to a plurality of frictional elements of an automatic transmission joined to an engine to selectively achieve engagement and disengagement of the frictional elements for establishing a required speed of the automatic transmission; (b) a hydraulic pressure detector working to detect a fact that the hydraulic pressure acting on an off-going one of the frictional elements of the automatic transmission which is to be disengaged lies within a given lower range; (c) an engine output increasing circuit designed to perform engine output increasing control to increase an output of the engine upon a downshift of the automatic transmission to develop engine braking in response to a request from an operator to decelerate a speed of the automatic transmission, the engine output increasing circuit initiating the engine output increasing control within an interval between start to control the hydraulic pressures through the hydraulic control circuit to achieve the downshift and start of an actual shift in speed of the automatic transmission; (d) a timer working to measure an elapsed time from one of events where a request to make the downshift of the automatic transmission to develop the engine braking was outputted and where the hydraulic control circuit started to control the hydraulic pressures to achieve the downshift; and (e) a fail-safe circuit working to stop the engine output increasing control when the elapsed time, as measured by the timer, has reached a time selected to be longer than that required by the hydraulic pressure acting on the off-going one of the frictional elements to drop to within the given lower range usually during control of the hydraulic pressures for the downshift, and the hydraulic pressure detector does not yet detect the fact that the hydraulic pressure acting on the off-going one of the frictional elements of the automatic transmission lies within the given lower range.

In the preferred mode of the invention, the automatic transmission control apparatus may be designed to be installed in a vehicle equipped with an electronic throttle system working to operate a throttle valve for the engine through an electronic actuator. The engine output increasing circuit works to control the amount of opening of the throttle valve to achieve the engine output increasing control. The fail-safe circuit works to close the throttle valve to stop the engine output increasing control.

The fail-safe circuit works to establish a fuel cut in the engine to stop the engine output increasing control.

The fail-safe circuit may also work to correct the amount of retard of ignition timing in the engine to stop the engine output increasing control.

According to the fifth aspect of the invention, there is provided an automatic transmission control apparatus which comprises: (a) a hydraulic control circuit which controls hydraulic pressures to be applied to a plurality of frictional elements of an automatic transmission joined to an engine to selectively achieve engagement and disengagement of the frictional elements for establishing a required speed of the automatic transmission; (b) an engine output increasing circuit designed to perform engine output increasing control to increase an output of the engine upon a downshift of the automatic transmission to develop engine braking in response to a request from an operator to decelerate a speed of the automatic transmission, the engine output increasing circuit initiating the engine output increasing control within an interval between start to control the hydraulic pressures through the hydraulic control circuit to achieve the downshift and start of an actual shift in speed of the automatic transmission; and (c) a fail-safe circuit working to stop the engine output increasing control immediately when a speed of one of an input shaft and an output shaft of the automatic transmission has dropped below a given failure decision value after start of control of the hydraulic pressures for achieving the downshift.

In the preferred mode of the invention, the fail-safe circuit determines the failure decision value as a function of a deceleration of a vehicle in which the engine is mounted.

The automatic transmission control apparatus may be designed to be installed in a vehicle equipped with an electronic throttle system working to operate a throttle valve for the engine through an electronic actuator. The engine output increasing circuit works to control the amount of opening of the throttle valve to achieve the engine output increasing control. The fail-safe circuit works to close the throttle valve to stop the engine output increasing control.

The fail-safe circuit works to establish a fuel cut in the engine to stop the engine output increasing control.

The fail-safe circuit may also work to correct the amount of retard of ignition timing in the engine to stop the engine output increasing control.

According to the sixth aspect of the invention, there is provided an automatic transmission control apparatus which comprises: (a) a hydraulic control circuit which controls hydraulic pressures to be applied to a plurality of frictional elements of an automatic transmission joined to an engine mounted in a vehicle to selectively achieve engagement and disengagement of the frictional elements for establishing a required speed of the automatic transmission; (b) an engine output increasing circuit designed to perform engine output increasing control to increase an output of the engine upon a downshift of the automatic transmission to develop engine braking in response to a request from an operator to decelerate a speed of the automatic transmission, the engine output increasing circuit initiating the engine output increasing control within an interval between start to control the hydraulic pressures through the hydraulic control circuit to achieve the downshift and start of an actual shift in speed of the automatic transmission; and (c) a fail-safe circuit working to stop the engine output increasing control immediately when detecting a fact that a torque converter of the automatic transmission has switched in rotation from a reverse direction which develops the engine braking to a normal direction where engine torque is transmitted to wheels of the vehicle is detected before the downshift is made actually following initiation of control of the hydraulic pressures for the downshift.

In the preferred mode of the invention, when a speed of the engine exceeds a speed of an input shaft of the automatic transmission after start of control of the hydraulic pressures for the downshift and before start of an actual downshift of the automatic transmission, the fail-safe circuit determines that the fact that the torque converter of the automatic transmission has switched in rotation from the reverse direction to the normal direction is detected.

The automatic transmission control apparatus may be designed to be installed in a vehicle equipped with an electronic throttle system working to operate a throttle valve for the engine through an electronic actuator. The engine output increasing circuit works to control an amount of opening of the throttle valve to achieve the engine output increasing control. The fail-safe circuit works to close the throttle valve to stop the engine output increasing control.

The fail-safe circuit works to establish a fuel cut in the engine to stop the engine output increasing control.

The fail-safe circuit may also work to correct an amount of retard of ignition timing in the engine to stop the engine output increasing control.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 4 is a table which shows a combination of engagements of clutches and brakes of an automatic transmission in each gear position of the transmission;

FIG. 21 is a view which demonstrates maps used to determine the amount of opening of a throttle valve upon a downshift of an automatic transmission;

DESCRIPTION OF THE PREFERRED EMBODIMENTS

Figure 1:
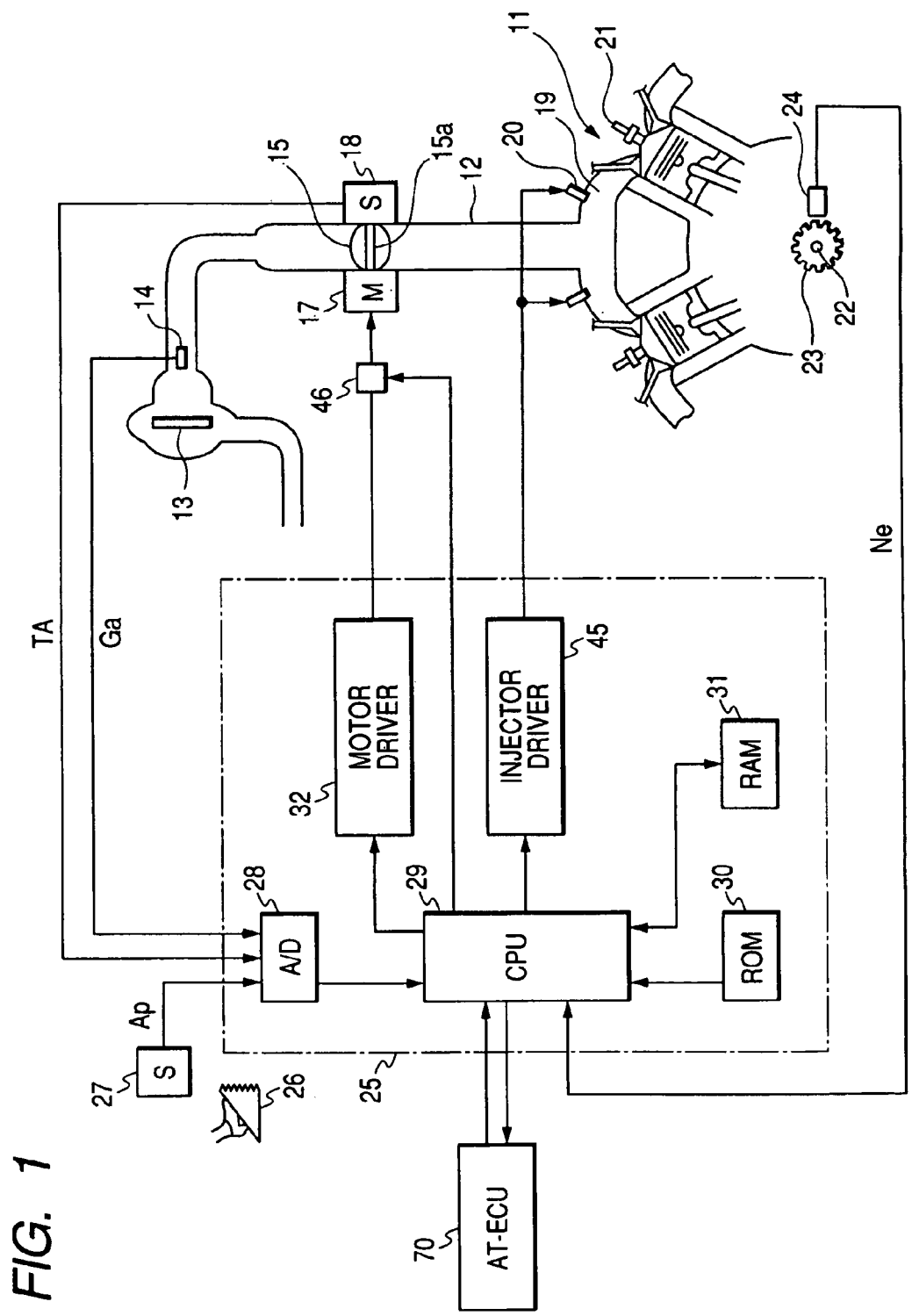
FIG. 1 is a block diagram which shows an engine control system according to the first embodiment of the invention.
Figure 2:
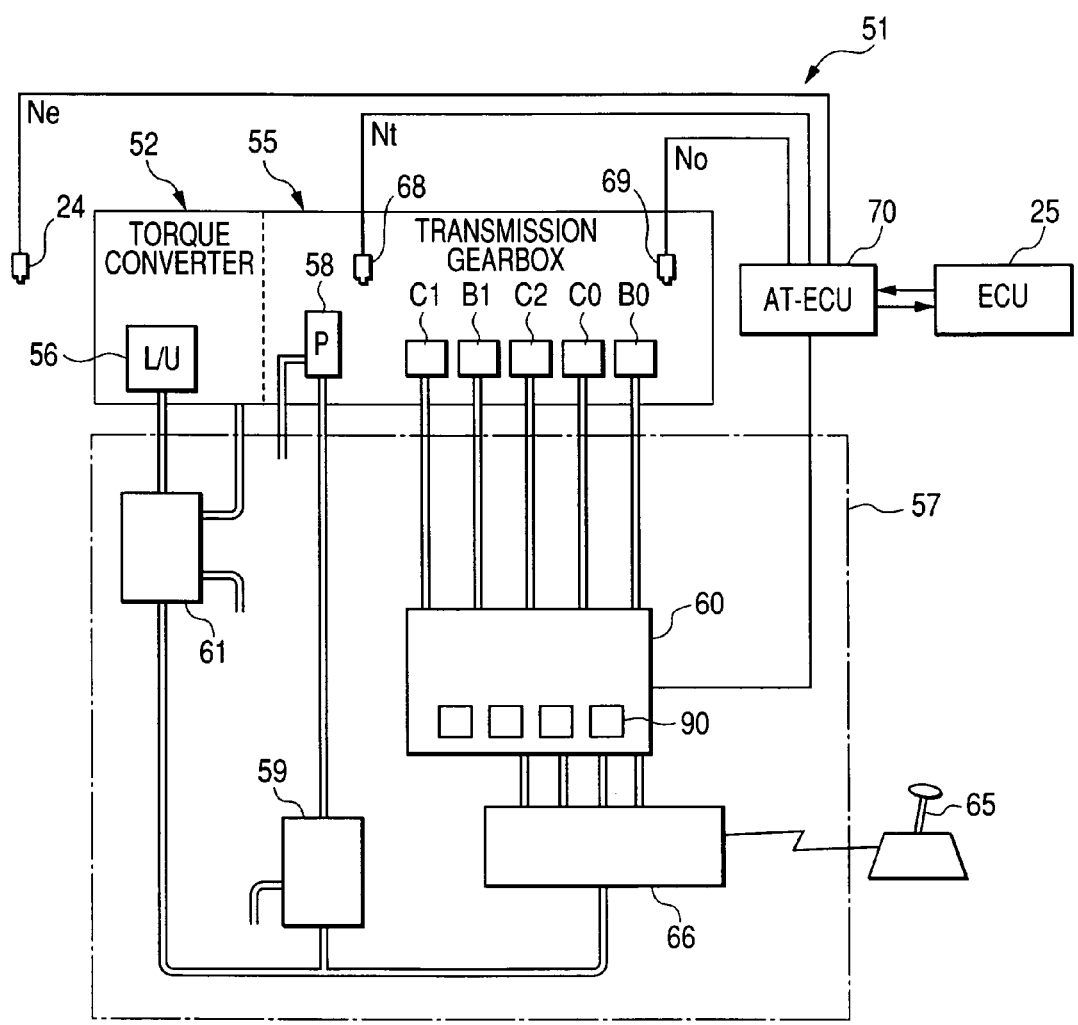
FIG. 2 is a block diagram which shows an automatic transmission and a hydraulic control circuit which are to be controlled by the engine control system of FIG. 1.

Referring to the drawings, wherein like reference numbers refer to like parts in several views, particularly to FIG. 1, there is shown an engine control system according to the first embodiment of the invention which is designed to control an operation of an automotive internal combustion engine 11 and a downshift operation of an automatic transmission 51, as illustrated in FIG. 2, with aid of activity of an electronic throttle control (ETC) system.

The engine 11 is connected to an intake pipe 12. An air cleaner 13 is installed upstream of the intake pipe 12. An air flow meter 14 is disposed downstream of the air cleaner 13 which measures an intake air flow rate Ga. A throttle valve 15 is disposed downstream of the air flow meter 14. The throttle valve 15 has a rotating shaft 15a connected to an electric motor 17 such as a DC motor. The motor 17 works to control the position (i.e., the amount of throttle opening) of the throttle valve 15. A throttle position sensor 18 measures the position of the throttle valve 15 and outputs a throttle position signal TA indicative thereof.

An intake manifold 19 which delivers the intake air having passed through the throttle valve 15 to each cylinder of the engine 11 has injectors 20 installed therein. A spark plug 21 is installed in a cylinder head of each cylinder of the engine 11. A crank angle sensor 24 is disposed which faces an outer periphery of a signal rotor 23 fitted on a crankshaft 22 of the engine 11. The crank angle sensor 24 is responsive to passages of protrusions on the periphery of the signal rotor 23 to produce a series of pulses (will be referred to as an engine speed signal Ne below). An engine ECU (electronic control unit) 25 monitors the engine speed signal Ne and measures the frequency thereof to determine the speed of the engine 11.

The engine control system also includes an accelerator stroke sensor 27 which works to measure the amount of pedal depression or stroke of an accelerator pedal 26 and output a voltage signal Ap indicating the stroke of the accelerator pedal 26 to the engine ECU 25 through an A/D converter 28. The intake air flow rate signal Ga, as produced by the air flow meter 14, and the throttle position signal TA, as produced by the throttle position sensor 18, are also inputted to the engine ECU 25 through the A/D converter 28.

The engine ECU 25 is implemented by a microcomputer consisting of a CPU 29, a ROM 30, a RAM 31, etc. The CPU 29 executes various engine control programs stored in the ROM 30 selectively to control the ignition timing of each of the spark plugs 21 and the pulse width of an injection signal inputted to each of the injectors 20 through an injector driver circuit 45 to adjust the quantity of fuel to be injected to the engine 11 to a target one.

The CPU 29 also executes throttle control programs stored in the ROM 30 to feedback-control the motor 17 of the throttle valve 15 under the PID control through a motor driver circuit 32 to bring the throttle position, as measured by the throttle position sensor 18, into agreement with a target one. If this electronic throttle system (ETS) has failed in operation, the CPU 28 activates a safety circuit 46, as disposed between the motor driver circuit 32 and the motor 17, to keep the motor 17 in an off-state and maintains the throttle valve 15 in a given position to allow the vehicle to run to a motor vehicle workshop.

Figure 3:
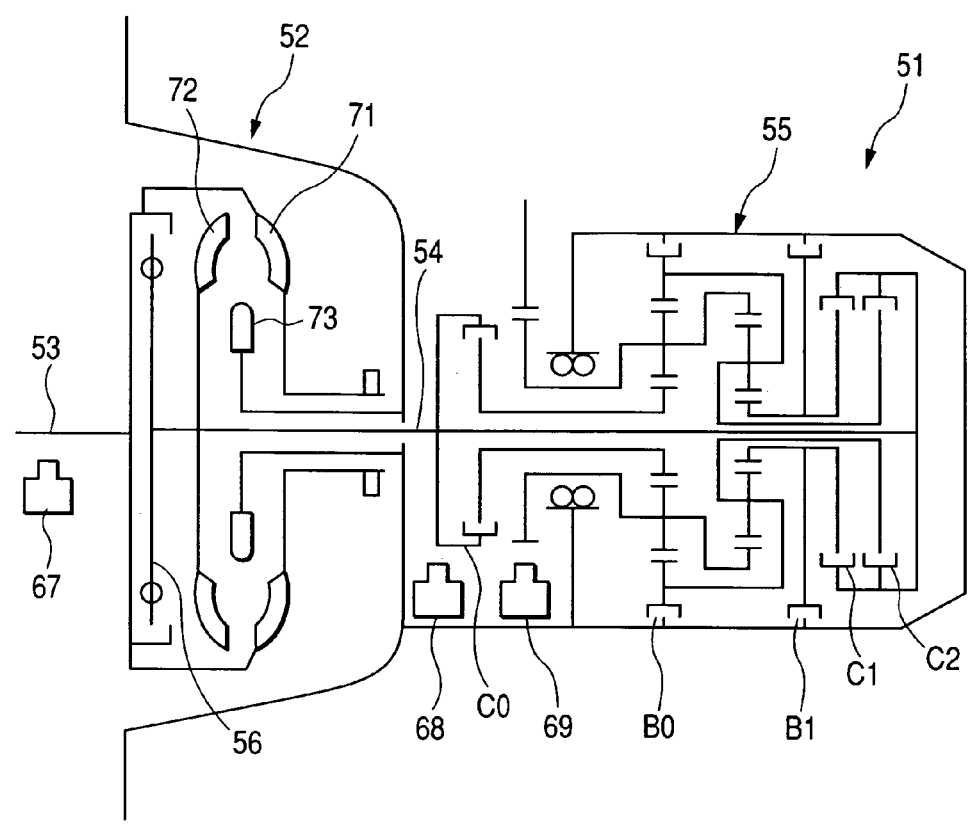
FIG. 3 is a schematically sectional view which shows an internal structure of an automatic transmission to be controlled by the engine control system of FIG. 1.
Figure 5:
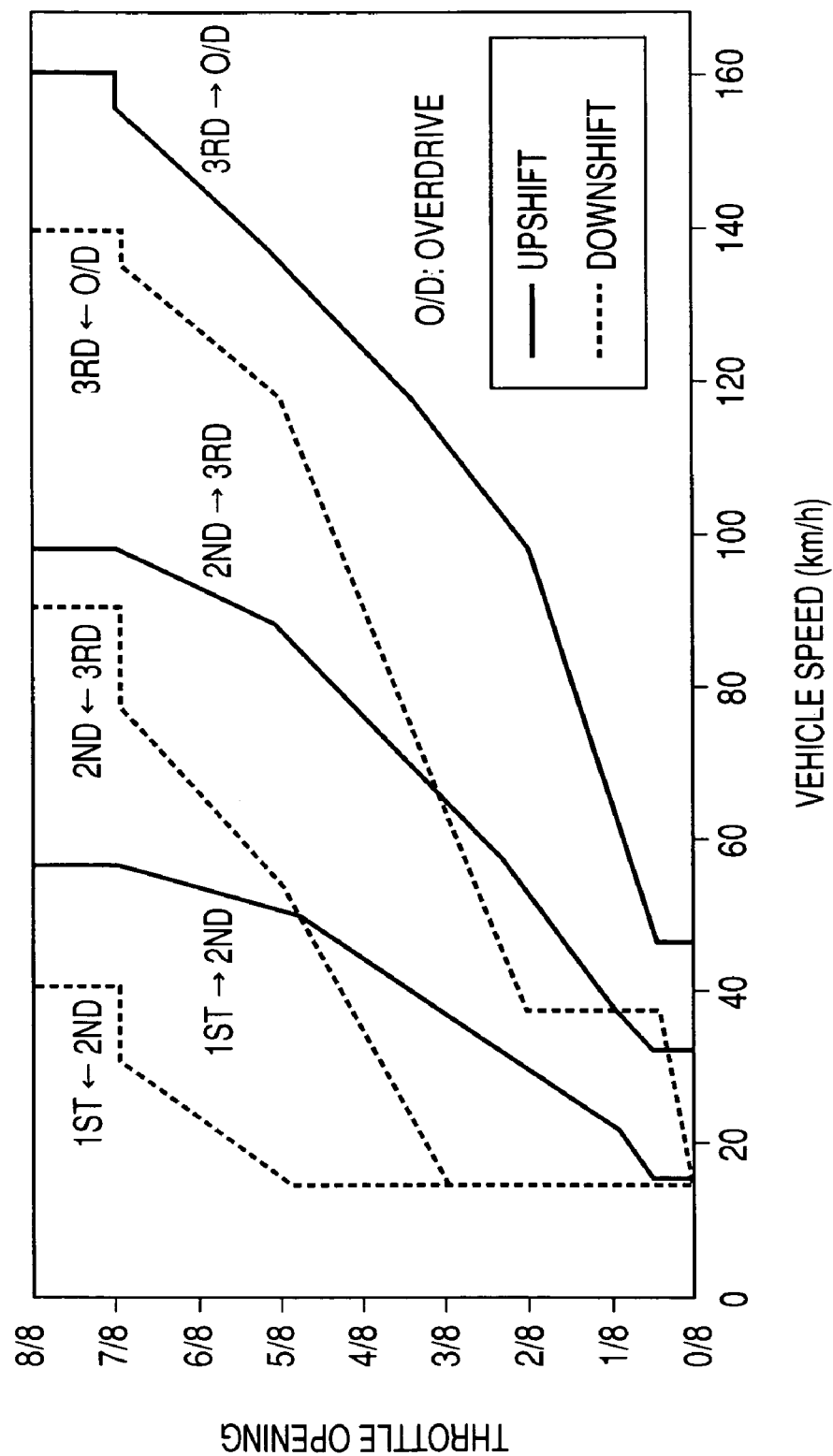
FIG. 5 is a graph which shows a relation between the amount of opening of a throttle valve and the speed of a vehicle in terms of gear shifts of an automatic transmission.

The engine ECU 25 is connected to an automatic transmission ECU 70. The AT-ECU 70 works to control an operation of an automatic transmission 51, as illustrated in FIGS. 2 and 3.

The automatic transmission 51 generally includes a torque converter 52 and a hydraulic transmission gearbox 55. The torque converter 52 has an input shaft 53 joined to an output shaft of the engine 11 and an output shaft 54 jointed to the hydraulic transmission gearbox 55. The torque converter 12 has installed therein a pump impeller 71 (i.e., a fluid coupling), turbine runner 72, and a stator 73 disposed between the pump impeller 71 and the turbine runner 72. The pump impeller 71 faces the turbine runner 72 and connects with the input shaft 53 of the torque converter 52. The turbine runner 72 connects with the output shaft 54 of the torque converter 52. The stator 73 works to rectify the torque converter oil.

The torque converter 52 also includes a lock-up clutch 56 which works to selectively establish or release engagement of the output shaft 54 with the input shaft 53. The torque converter 52 works to transmit engine torque to driven wheels (i.e., front or rear wheels) of the automotive vehicle through a gear train such as a planetary gear train of the transmission gearbox 55.

The transmission gearbox 55 includes clutches C0, C1, and C2 and brakes B0 and B1. A selected speed or gear ratio is established by hydraulically controlling engagement and disengagement of the clutches C0, C1, and C2 and the brakes B0 and B1 to change a combination of gears through which the torque is to be transmitted. FIG. 3 shows operative relations between the gear ranges of the automatic transmission 51 (i.e., the positions of the gear shift lever 65 and shifted speeds: first to fourth speeds) and operative conditions of frictional elements (i.e., the clutches C0, C1, and C2 and the brakes B0 and B1). "◯" indicates the clutches C0, C1, and C2 and brakes B0 and B1 placed in engagement in a selected one of the gear ranges to establish the transmission of engine torque. For example, when the accelerator pedal 26 is depressed in a drive (D) range of the automatic transmission 51, the automatic transmission 51 makes upshifts, in sequence, from the first to the second, to the third, and to the fourth speed as the speed of the vehicle increases. The upshift from the first to the second speed is achieved by keeping the clutch C0 engaged while disengaging the brake B0 and engaging the brake B1. The upshift from the second to third speed is achieved by keeping the clutch C0 engaged while disengaging the brake B1 and also engaging the clutch C2. The upshift from the third to fourth speed is achieved by keeping the clutch C2 engaged while disengaging the clutch C0 and engaging the brake B1.

If the hydraulic pressure supplied to the brake B1 has failed to be decreased for some reason during the shift from the second to third speed so that, so that the brake B1 is kept engaged, it will result in an interlock in the automatic transmission 51 upon engagement of the clutch C2, thus locking the driven wheels. To avoid this, a failsafe mechanism is installed in the transmission gearbox 55. The failsafe mechanism is made up of hydraulic pressure switches (not shown) each of which is installed in a place where the hydraulic pressure acting on one of the clutches C0 to C2 and the brakes B0 and B1 in the transmission gearbox 55 can be detected. Each of the hydraulic pressure switches is designed to be turned on to output a high-level signal when the detected hydraulic pressure is higher than a given pressure threshold level while being turned off to output a low-level signal when the detected hydraulic pressure is lower than the given pressure threshold level. The AT-ECU 70 analyzes the outputs of the hydraulic pressure switches and hydraulic pressure control signals outputted to an automatic shift control circuit 60 and determines whether each of the outputs of the hydraulic pressure switches matches a corresponding one of the hydraulic pressure control signals or not to diagnose failures of the clutches C0 to C1 and the brakes B0 and B1. The AT-ECU 70 analyzes results of the diagnosis and controls one(s) of the clutches C0 to C2 and the brakes B0 and B1 to inhibit a gear shift to one of the speeds at which the interlock will occur.

Referring back to FIG. 2, the transmission gearbox 55 has installed therein a hydraulic pump 58 driven by the output of the engine 11. A hydraulic control circuit 57 is installed within an oil pan (not shown) within which working fluid is stored. The hydraulic control circuit 57 consists of a line pressure control circuit 59, the automatic shift control circuit 60, a lock-up control circuit 61, and a manual selector valve 66. The working fluid pumped by the hydraulic pump 58 out of the oil pan is supplied to the automatic shift control circuit 60 and the lock-up control circuit 61 through the line pressure control circuit 59. The line pressure control circuit 59 has installed therein a hydraulic control valve (not shown) which works to adjust the pressure of the working fluid from the hydraulic pump 58 to a selected line pressure. The automatic shift control circuit 60 has installed therein a plurality of hydraulic control valves 90 which work to control the pressures of the working fluid to be supplied to the clutches C0, C1, and C2 and the brakes B0 and B1 of the transmission gearbox 55. The lock-up control circuit 61 has installed therein a hydraulic control valve (not shown) which works to control the pressure of the working fluid to be supplied to the lock-up clutch 56. The hydraulic circuit in the automatic shift control circuit 60 in which the hydraulic control valves 90 are installed is of a typical one. Japanese Patent First Publication No. 2002-130460 discloses such a structure, the disclosure of which is incorporated herein by reference.

Each of the hydraulic control valves 90 of the automatic shift control circuit 60 and the hydraulic control valve of the lock-up control circuit 61 is implemented by, for example, a linear solenoid valve which is responsive to a pulse voltage applied at a selected duty cycle and energizes a coil installed therein to produce a magnetic attraction pulling a valve body for controlling the hydraulic pressure. In order to absorb a variation in current flowing through the coil of each of the linear solenoid valves relative to the duty cycle of the pulse voltage, the AT-ECU 70 monitors the current through a current detector (built in a failure detector 82, as will be described later) and feedback-controls it.

The manual selector valve 66 is disposed between the line pressure control circuit 59 and the automatic shift control circuit 60 to select one or some of hydraulic supply lines to establish hydraulic communications with a corresponding one or ones of the hydraulic control valves 90 of the automatic shift control circuit 60 in response to a shifting motion of the gear shift lever 65. Specifically, the manual selector valve 66 works to establish the hydraulic communications between the hydraulic supply line and the hydraulic control valves 90 leading to the clutches C0 and C2 and the brakes B0 and B1 required to establish forward gear ratios (i.e., forward speeds) when the gear shift lever 65 is placed in the D position. When the gear shift lever 65 is shifted to P (Parking) or N (Neutral) position, the manual selector valve 66 selects the hydraulic pressure to be supplied to the transmission gearbox 55 which brings the transmission gearbox 55 into a neutral position even if the hydraulic control valves 90 of the automatic shift control circuit 60 are de-energized.

An engine speed sensor 24 is installed on the engine which measures an engine speed Ne. The transmission gearbox 55 also includes an input shaft speed sensor 68 and an output shaft speed sensor 69. The input shaft speed sensor 68 works to measure an input shaft speed Nt (i.e., the speed of the output shaft 54 of the torque converter 52). The output shaft speed sensor 69 works to measure an output shaft speed No of the transmission gearbox 55.

Outputs of the engine speed sensor 24, the input shaft speed sensor 68, and the output shaft speed sensor 69 are inputted to the AT-ECU 70. The AT-ECU 70 is implemented by a microcomputer and executes gear shift programs installed in a ROM to control energization of the hydraulic control valves 90 of the automatic shift control circuit 60 and regulates the hydraulic pressure acting on the clutches C0, C1, and C2 and the brakes B0 and B1 of the transmission gearbox 55 to establish or release the engagement thereof, as illustrated in FIG. 4, in response to a gear shift request produced based on the position of the gear shift lever 65 and vehicle running conditions (e.g., throttle position, vehicle speed, etc.), thereby establishing a target gear ratio in the transmission gearbox 55 selected according to a given shift schedule.

Figure 6:
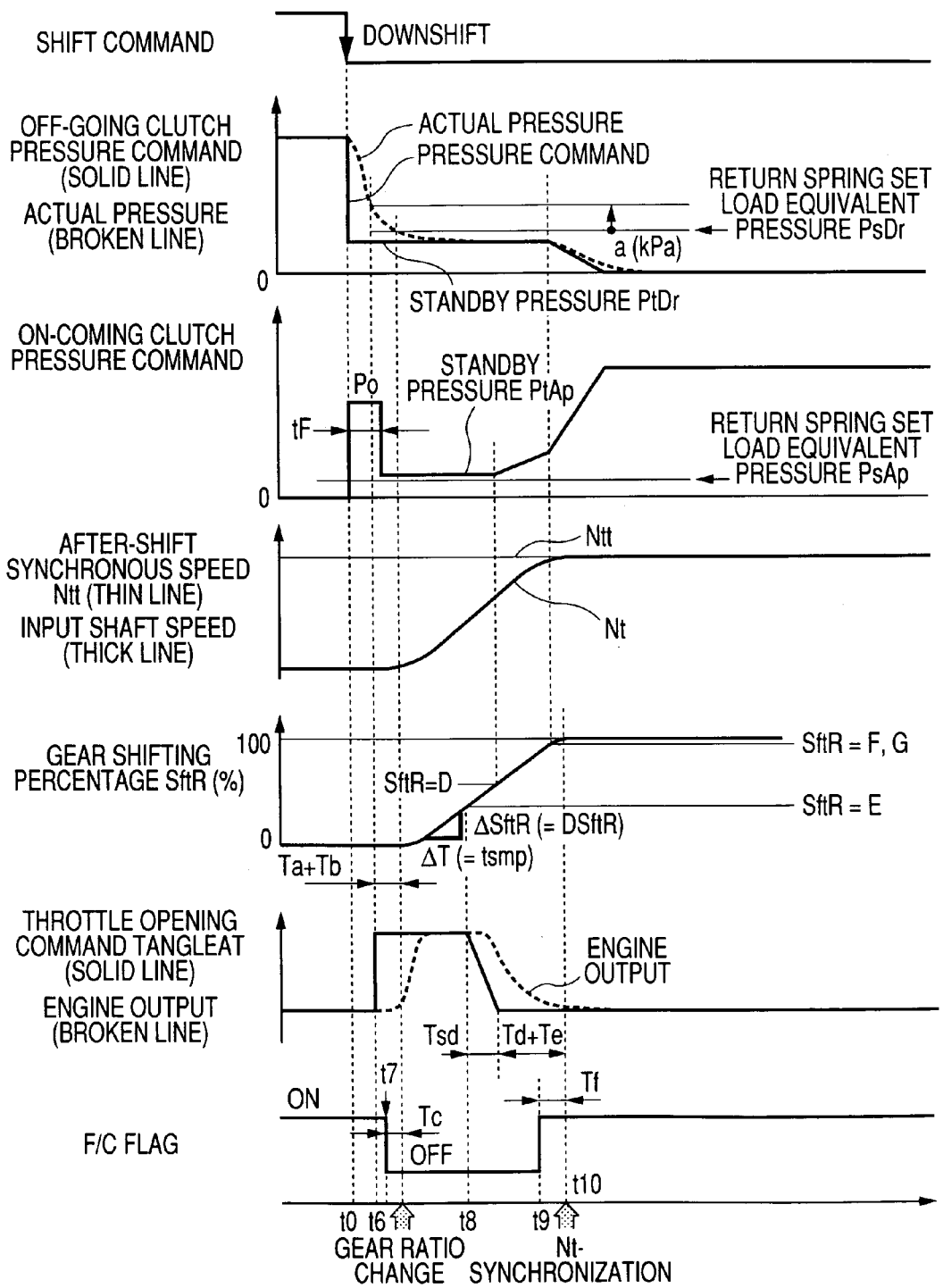
FIG. 6 is a timechart which shows operations of the engine control system of FIG. 1 when an ETC (Electronic Throttle Controlled) downshift operation is performed properly.

The AT-ECU 70 also works to make a downshift, as demonstrated in FIG. 6, in the automatic transmission 51 in response to a driver's deceleration request to produce the engine braking. In the following discussion, the clutches C0, C1, and C2, and the brakes B0 and B1 each will be referred to as a clutch for the sake of explanation. One of the clutches to be switched from an engaged to a disengaged position by downshift control will be referred to as an off-going clutch, while one to be switched from the disengaged to the engaged position by the downshift control will be referred to as an on-coming clutch.

FIG. 6 is a timechart demonstrating an example of an ETC (Electronic Throttle Controlled) downshift operation of the automatic transmission 51 which works to increase the output torque of the engine 11 (will also be referred to as engine output increasing control below) during a downshift to activate the engine braking according to the driver's intention.

When stated requirements to launch the ETC downshift operation are met, and a downshift command is outputted at time t0, a hydraulic pressure command value indicating the hydraulic pressure to be exerted on the off-going clutch is decreased quickly to a standby hydraulic pressure PtDr that is slightly lower than a hydraulic pressure PsDr equivalent to a set load of a return spring of the off-going clutch. This keeps the off-going clutch in a neutral position where the off-going clutch is almost disengaged. This permits the input shaft speed Nt of the automatic transmission 51 to rise freely and minimizes catapulting of the vehicle caused by the engine output increasing control.

The control of hydraulic pressure on the on-coming clutch in the ETC downshift operation is substantially the same as that in the so-called power-on downshift operation in which the vehicle driver depresses the accelerator pedal 26 and also requires a downshift. Specifically, at time t0 the downshift command has been outputted, the hydraulic pressure command value for the on-coming clutch is set to a given loading pressure PO to commence loading control to load the working fluid into the on-coming clutch. When the loading control continues to be performed for a given period of time tF, and the time just before the on-coming clutch is engaged is reached, the hydraulic pressure command value for the on-coming clutch is decreased to a standby hydraulic pressure PtAd selected around a hydraulic pressure PsAp equivalent to a set load of a return spring of the on-coming clutch. The loading control is then finished. This keeps the on-coming clutch in a position required to produce a desired amount of engine braking.

Subsequently, when a gear shifting percentage SftR [=100×(input shaft speed Nt−output shaft speed No×a before-shift gear ratio)/(output shaft speed No×after-shift gear ratio−output shaft speed No×before-shift gear ratio)] reaches a given value D, the AT-ECU 70 starts to increase the hydraulic pressure command value for the on-coming clutch at a constant rate. When the gear shifting percentage SftR reaches a given value F, the AT-ECU 70 starts to decrease the hydraulic pressure command value for the off-going clutch at a constant rate.

When the gear shifting percentage SftR has reached a given value G, the hydraulic pressure command value for the on-coming clutch is maximized to increase the hydraulic pressure acting on the on-coming clutch to a maximum level. Specifically, when the input shaft speed Nt is rising to a speed corresponding to a lower speed after the downshift, the AT-ECU 70 increases the hydraulic pressure to achieve the engagement of the on-coming clutch and completes the downshift.

The feature of the above ETC downshift operation is to perform the engine output increasing control in the following manner. At time t6 when the torque transmission capacity of the off-going clutch has become low or zero, and the actual pressure on the off-going clutch has dropped to a level (will also referred to as a control start pressure below) at which the driver is insensitive to increasing of the engine power and does not feel acceleration of the vehicle during an interval in which an actual pressure acting on the off-going clutch drops to the standby hydraulic pressure PtDr, the AT-ECU 70 launches the engine output increasing control.

A determination of whether time t6 when the actual pressure acting on the off-going clutch has dropped below the control start pressure has been reached or not is achieved by approximating the speed of response of the actual pressure on the off-going clutch to output of the hydraulic pressure command value by a transfer function of a first-order lag plus a dead time, comparing an estimate of the actual pressure, as calculated using the transfer function, with the control start pressure, and determining the time when the estimate has reached the control start pressure as time t6 the engine output increasing control should be launched.

When time t6 the engine output increasing control should be launched is reached, the engine ECU 25 produces a throttle opening command value indicating the amount by which the throttle valve 15 is to be opened and starts to control the throttle valve 15. At following time t7, the engine ECU 25 turns off a fuel cut flag (will also be referred to as an F/C flag below) to terminate a fuel-cut in the engine 11 and resume fuel injection control to inject the fuel into the injectors 20 of the engine 11.

After a delay from the start of the engine output increasing control (i.e., the start of throttle opening control and the resumption of fuel injection control), the engine 11 starts to increase the output power thereof. Such a time lag is thought of as being caused by three factors: a response lag Ta between the start of the throttle opening control and the start of actual motion of the throttle valve 15, a response lag Tb between the start of opening of the throttle vale 15 and the start of rise in power of the engine 11, and a response lag Tc between the resumption of injection of fuel into the engine 11 and the start of rise in power of the engine 11.

The throttle response lag Ta is calculated by look-up using a map listing parameters (i.e., the temperature of engine coolant, the voltage of a storage battery, etc.) to which the response of the motor 17 of an electronic throttle system is sensitive. The throttle response lag Tb is calculated by using a time lag between suction of intake air increased in quantity by opening of the throttle valve 15 into the cylinders of the engine 11 and the start of combustion of a mixture of fuel and the sucked intake air in the engine 11 and a map listing parameters (i.e., the speed of the engine 11, the amount of opening of the throttle valve 15, etc.) related to the flow velocity of the intake air. The engine lag Tc is calculated by the time consumed between the start of injection of fuel into the engine 11 and the start of combustion in the engine 11 (i.e., the time required for rotation of a crankshaft of the engine 11 through 720° CA).

When the time (i.e., the time t6 in FIG. 6) the throttle opening control (i.e., the engine output increasing control) should be launched is determined to have been reached, the engine ECU 25 determines and keeps the throttle opening command value which will achieve the input shaft speed Nt of the automatic transmission 51 required for establishing a desired gear shifting time and giving desired shift comfort to the driver and outputs it to the motor 17 of the throttle valve 15. Specifically, the throttle opening command value is determined based on the friction loss of the engine 11, measured parameters (i.e., a gear shift pattern (i.e., a change in gear ratio), the temperature of engine coolant, the input shaft speed Nt, etc.), and a desired gear shifting time and may also be determined using additional parameters such as a slope of the road surface and/or the degree of deceleration of the vehicle in order to controlling the shift comfort finely. For example, the throttle opening command value is decreased during deceleration of the vehicle, while it is increased during acceleration of the vehicle. The throttle opening command value may be corrected using an output of the air flow meter 14. The engine ECU 25 determines the throttle opening command value in the above manner and elevates the input shaft speed Nt (i.e., the speed of the output shaft of the torque converter 52) when the hydraulic pressure acting on the off-going clutch has reached near the standby hydraulic pressure PtDr.

During the engine output increasing control, the engine ECU 25 determines whether a termination time to terminate the increasing of power of the engine 11 under the engine output increasing control in terms of the time when the downshift is completed, that is, when the gear shifting percentage SftR reaches 100% has been reached or not and keeps a given amount of increase in the power of the engine 11 constant. Such a determination is made by calculating the time the increasing of the power of the engine 11 should be terminated compensating for a lag between the time when a command is outputted to terminate the increasing of power of the engine 11 and the time when it is actually terminated based on the gear shifting percentage SftR and a change ΔSftR in the gear shifting percentage SftR per unit time ΔT, finding what value of the gear shifting percentage SftR corresponding to that time, and determining the time when the gear shifting percentage SftR reaches the found value as the termination time the increasing of power of the engine 11 should be terminated, i.e., the time (t8 in FIG. 6) the throttle opening control should be terminated. The engine ECU 25 also determines a termination time (t9 in FIG. 6) the control of resumption of the fuel injection should be terminated in a similar manner. When it is determined that the termination times (t8, t9) have been reached, the engine ECU 25 initiates termination control to decrease the throttle opening command value to zero (0. Specifically, the engine ECU 25 decreases the throttle opening command value gradually at a stated rate in order to develop a transient operation of the electronic throttle system. The engine ECU 25 also turns on the F/C flag to resume the fuel cut in the engine 11. However, if there is no request of the fuel cut from the engine 11 due to a sudden drop in speed of the engine 11 or any other reasons, the engine ECU 25 keeps the F/C flag off.

The lag between the time when the command is outputted to terminate the increasing of power of the engine 11 and the time when it is actually terminated is though of as being caused by four factors: a response lag Td in operation to close the throttle valve 15 fully, a response lag Te between the time when the throttle valve 15 is closed fully and the time when the increasing of power of the engine 11 is terminated completely, a response lag Tsd between the time when the termination time the increasing of power of the engine 11 should be terminated, i.e., the throttle opening command value should be decreased is determined to have been reached and the time when the throttle opening command value has reached zero (0), and a response lag Tf between the resumption of the fuel cut and the time when the power of the engine 11 becomes zero (0).

The response lag Td is calculated by look-up using a map listing parameters (i.e., the temperature of engine coolant, the voltage of a storage battery, etc.) to which the response of the motor 17 of the electronic throttle system is sensitive. The response lag Te is calculated by using a time lag between suction of intake air decreased in quantity by closing of the throttle valve 15 into the cylinders of the engine 11 and the start of combustion of a mixture of fuel and the sucked intake air in the engine 11 and a map listing parameters (i.e., the speed of the engine 11, the amount of opening of the throttle valve 15, etc.) related to the flow velocity of the intake air. The response lag Tsd is calculated based on a relation of the throttle opening command value/ the rate at which the throttle opening command value is to be changed. The response lag Tf is calculated as the time consumed between the resumption of a fuel cut in the engine 11 and the start of a power stroke of a piston of one of the cylinders of the engine 11 undergoing the fuel cut (i.e., the time required for rotation of the crankshaft of the engine 11 through 720° CA).

For the off-going clutch, when the gear shifting percentage SftR has reached 100%, the AT-ECU 70 starts to decrease the hydraulic pressure command value at a constant rate. In the above manner, the ETC downshift operation is completed.

Figure 7:
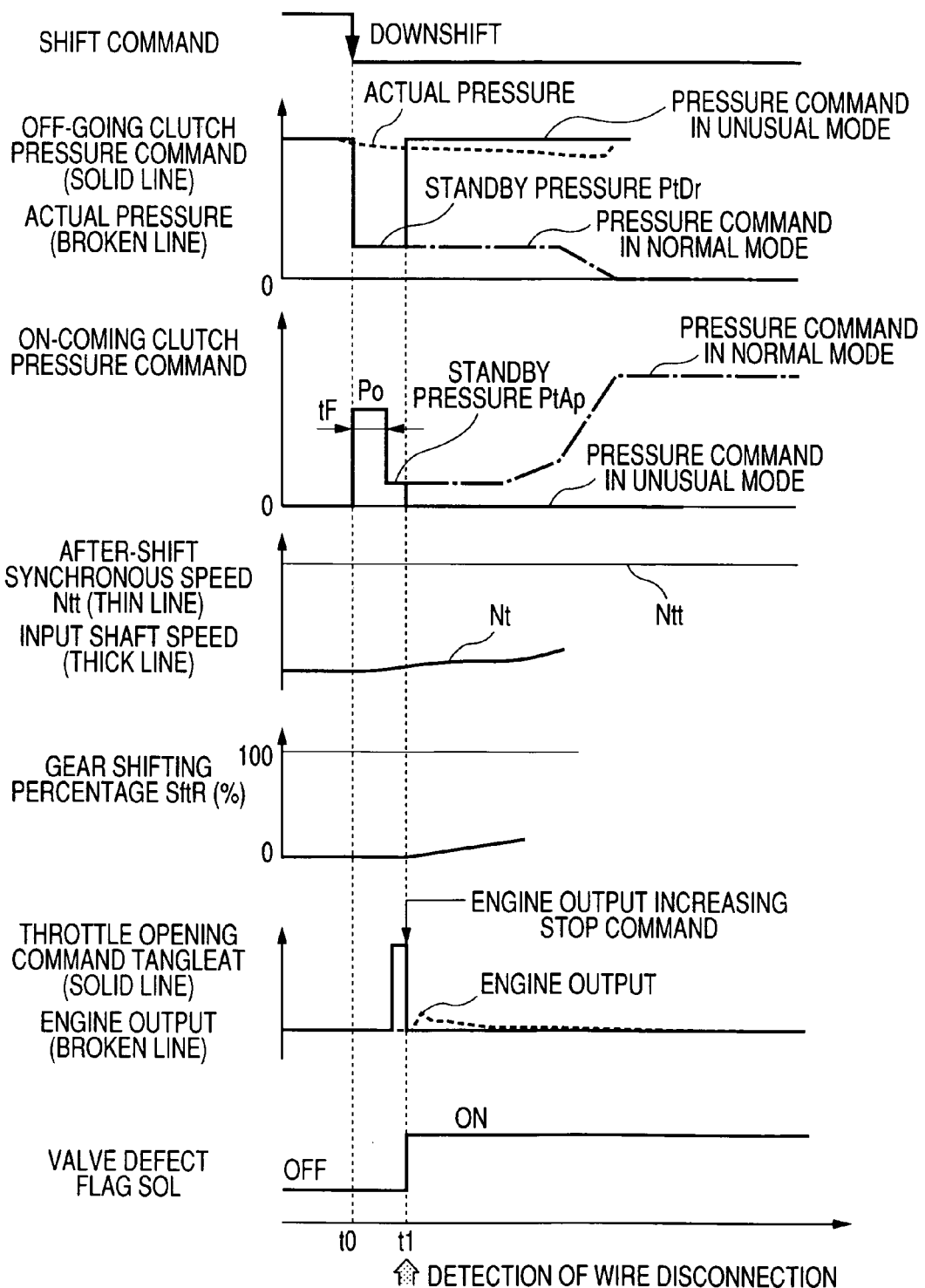
FIG. 7 is a timechart which shows operations of the engine control system of FIG. 1 when an ETC (Electronic Throttle Controlled) downshift operation has failed due to wire disconnection of a hydraulic pressure control valve.

As apparent from the above discussion, the AT-ECU 70 is designed to increase the power of the engine 11 after the start of the downshift hydraulic pressure control in the automatic transmission 51, but before the actual start of the downshift so as to eliminate the lag between the time when the command is outputted to initiate the increasing of power of the engine 11 and the time when it is actually initiated. The downshift hydraulic pressure control works to lower the torque transfer capacity (i.e., the hydraulic pressure) of the off-going clutch placed in a torque transmission path establishing a before-shift gear ratio in the automatic transmission 51 to start an actual gear shift. If, therefore, some defect occurs in the hydraulic control circuit 57 working to control the torque transfer capacity, it will result in an error in lowering the hydraulic pressure acting on the off-going clutch which gives rise to a difficulty in initiating the gear shift actually (see FIG. 7). Upon occurrence of such a defect, the gear ratio of the automatic transmission 51 is kept as it is without activating a gear shift, as requested to produce the engine braking, but the engine ECU 25 starts to increase the power of the engine 11. If the engine ECU 25 keeps increasing the power of the engine 11, it may cause the vehicle to be accelerated in error during the downshift control.

Figure 9:
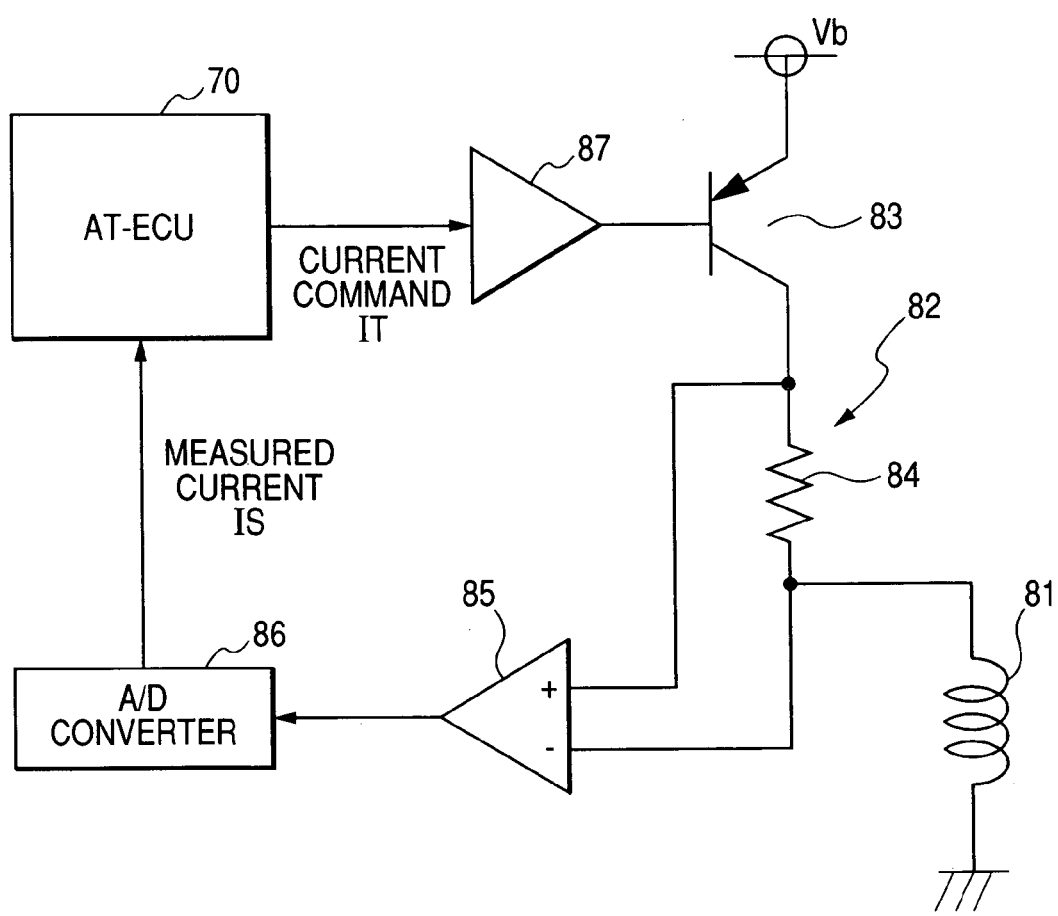
FIG. 9 is a circuit diagram which shows a failure monitor circuit designed to monitor a failure in operation of a solenoid-operated hydraulic pressure control valve.

We have found that the defect occurring in the hydraulic control circuit 57 is mainly an electrical defect such as a wire disconnection or an excessive rise in resistance in a solenoid 81 of each of the hydraulic pressure control valves 90, as will be discussed later in FIG. 9, or a circuit line leading to the solenoid 81 of each of the hydraulic pressure control valves 90. In order to find such a defect, the engine control system of this embodiment also includes, as shown in FIG. 9, failure monitor circuits 82, one for each of the hydraulic pressure control valves 90. If the failure monitor circuit 82 has detected the defect, such as the wire disconnection in the solenoid 81 at time t1 after initiation of the downshift hydraulic pressure control, the AT-ECU 70 immediately outputs an engine output increasing control stop command signal to stop the engine output increasing control. This is achieved by closing the throttle valve 15 and subjecting the engine 11 to a fuel cut or additionally retarding the ignition timing of the spark plugs 21.

Referring to FIG. 9, the failure monitor circuit 82 includes a resistor 84, a differential amplifier 85, and an A/D converter 86.

Each of the hydraulic pressure control valves 90 includes, as described above, the solenoid 81 which is energized by a source voltage Vb through a switching device 83. The resistor 84 is disposed between the switching device 83 and the solenoid 81. A potential difference between terminals of the resistor 84 that is a function of a current IS flowing through the resistor 84 is inputted to the differential amplifier 85. The differential amplifier 85 amplifies the input and outputs it to the A/D converter 86. The A/D converter 86 converts the input into a digital signal and outputs it to the AT-ECU 70 as representing the current IS. The AT-ECU 70 samples the output of the A/D converter, as A/D-converted a given sampling cycle, and determines the current IS flowing to the solenoid 81 through the resistor 84 and also determines whether a difference between a current command value IT, as outputted to a solenoid driver 87, and the determined value of the current IS (i.e., IT-IS) is greater than a given failure decision threshold Ith or not to diagnose the defect of the hydraulic pressure control valve 90.

The AT-ECU 70 also works to find a difference (IT-IS) between the current command value IT, outputted already, and the determined value of the current IS, correct the current command value IT to be outputted next using the difference (IT-IS), and output it to the solenoid driver 87 to control an on-off operation of the switching device 83 at a controlled duty cycle.

Figure 8:
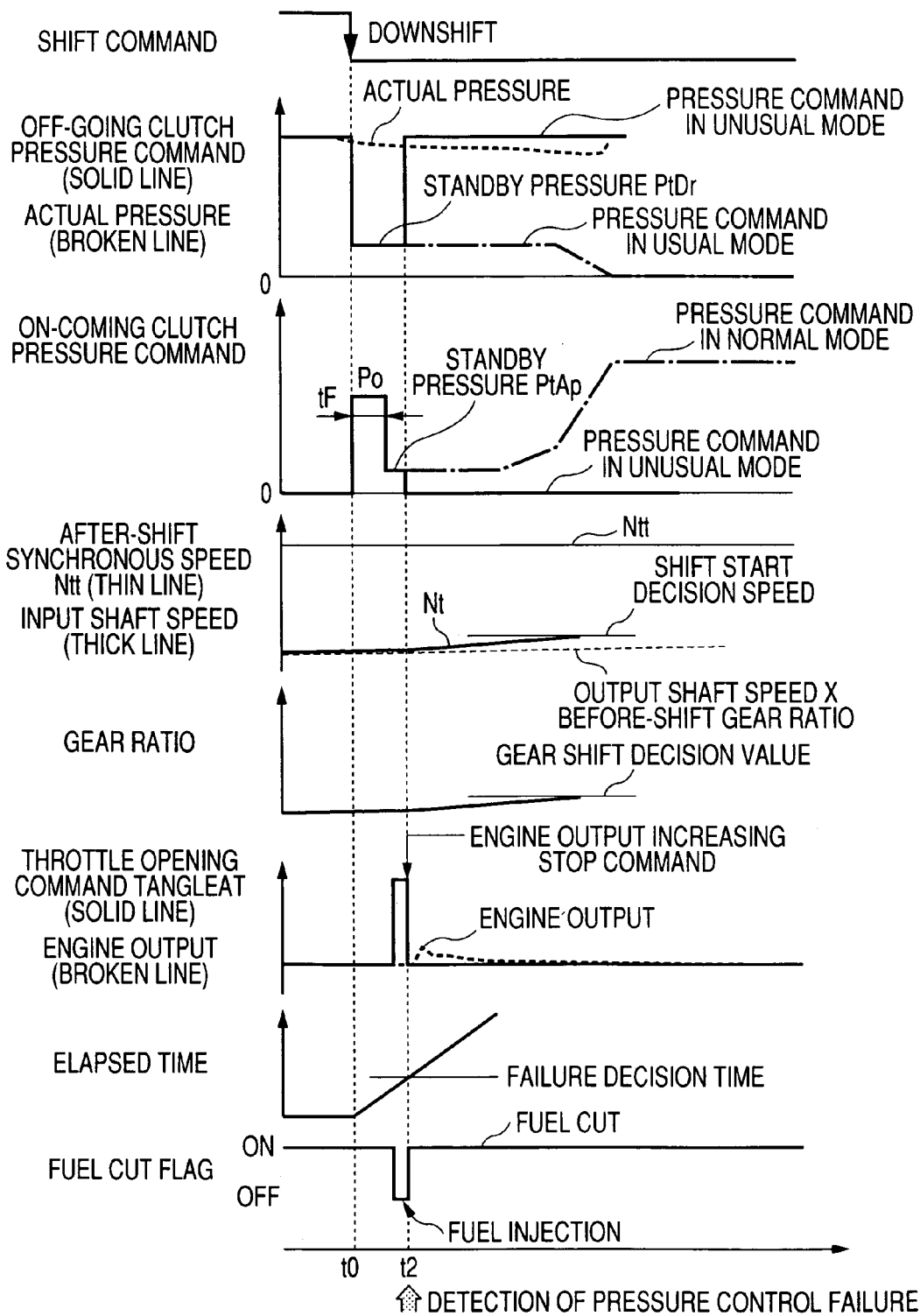
FIG. 8 is a timechart which shows operations of the engine control system of FIG. 1 when an ETC (Electronic Throttle Controlled) downshift operation has failed due to a defect in downshift hydraulic control.

The engine control system of this embodiment is also designed to perform an additional diagnosis function to diagnose a failure in controlling the hydraulic pressure to be supplied to the automatic transmission 51 in the downshift control based on the time when a downshift has been initiated. The diagnosis function will be described below with reference to FIG. 8.

When the hydraulic pressure control circuit 57 is operating normally to perform the downshift control, a gear shift will be initiated actually in the automatic transmission 51 at an expected time. Therefore, if the gear shift is not launched after expiry of the expected time, it may be decided that some defect having resulted in a failure in changing the gear in the automatic transmission 51 has occurred. Such a decision is made in the At-ECU 70 by measuring the elapsed time from the start of the downshift hydraulic pressure control (time t0), i.e., since a downshift request was made using a timer and determining that any failure has occurred in controlling the hydraulic pressure supplied to the transmission gearbox 55 if an actual gear shift is not detected in the automatic transmission 51 after the elapsed time, as measured by the timer, reaches a failure decision time set slightly longer than an expected time at which the automatic transmission 51 will launch a gear shift actually. In such an event, the engine ECU 25 immediately outputs the engine output increasing control stop command signal to stop the engine output increasing control.

The detection of occurrence of an actual gear shift in the automatic transmission 51 may be accomplished in either of the following manners.

Detection Method 1

When the fact that a gear ratio (Nt/No) that is a ratio of the input shaft speed Nt to the output shaft speed No of the transmission gearbox 55 has started to change to that after a gear shift is detected, the gear shift is determined to have been initiated. A determination of whether the gear ratio (Nt/No) has started to change or not may be made by determining whether it has exceeded a stated gear shift decision value or not.

Detection Method 2

From the relation of the gear ratio=the input shaft speed Nt/the output shaft speed No of the transmission gearbox 55, we obtain Nt=No×the gear ratio. The gear shift is, therefore, determined to have been initiated when the fact that the input shaft speed Nt has exceeded the product of the output shaft speed No and the gear ratio at the speed before a gear shift is detected. Such a determination is preferably made when the input shaft speed Nt has exceeded a stated shift start decision speed slightly greater than the product of the output shaft speed No and the gear ratio at the speed before a gear shift.

The above described gear shift control and defect diagnosis are accomplished by programs, as discussed below, executed in either of the AT-ECU 70 or the engine ECU 25.

Figure 10:
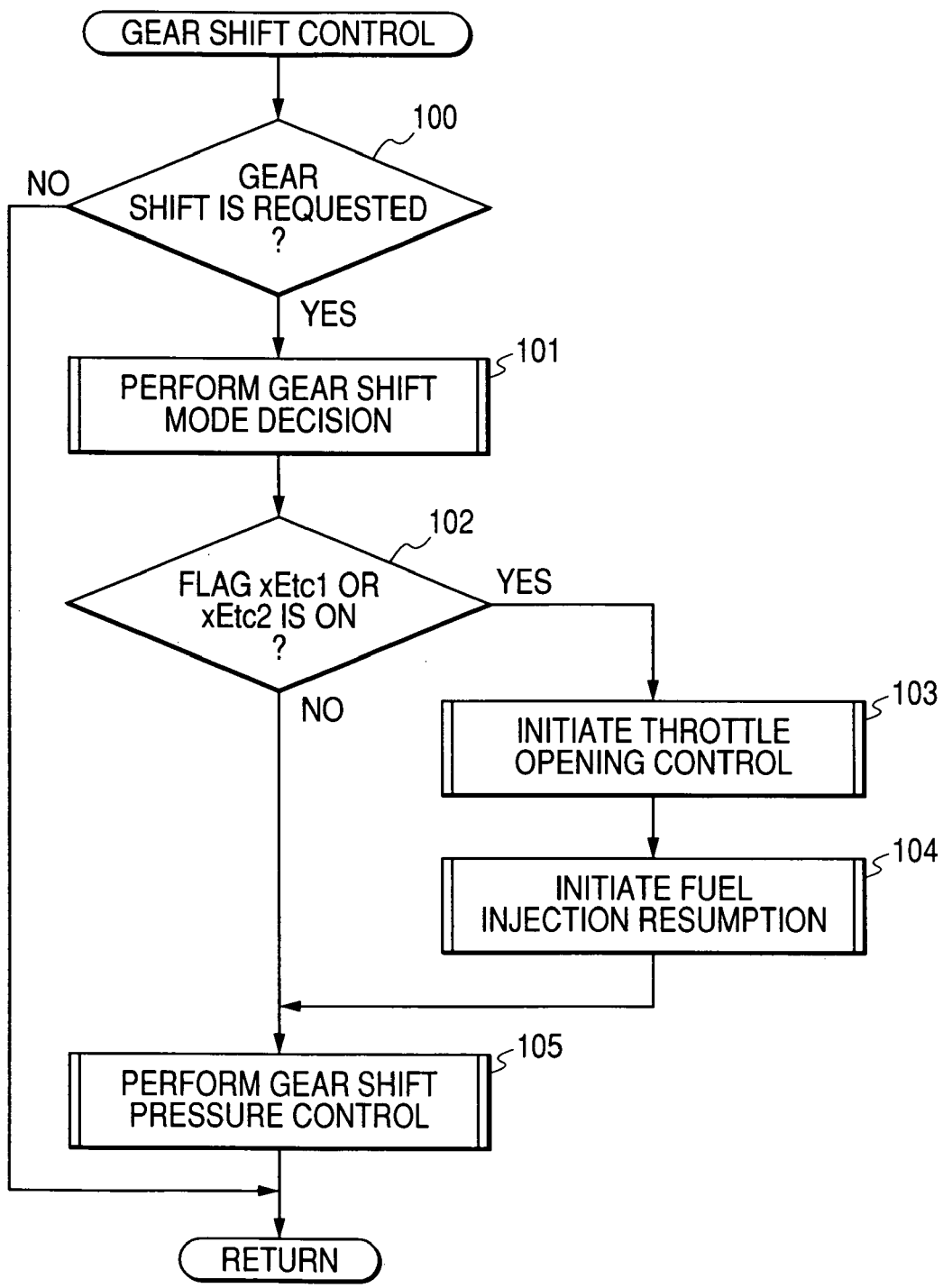
FIG. 10 is a flowchart of a gear shifting program for an automatic transmission to be executed by the engine control system of FIG. 1.

FIG. 10 shows a gear shift control main program to be executed at an interval of, for example, 8 to 32 msec. during running of the engine 11.

Upon entering the program, the routine proceeds to step 100 wherein it is determined whether a gear shift has been requested or nor, that is, whether a gear shift command has been outputted or not. If a NO answer is obtained meaning that the gear shift is not requested, then the routine terminates. Alternatively, if a YES answer is obtained, then the routine proceeds to step 101 wherein a gear shift mode decision program, as will be discussed later in FIG. 11, is executed to find a gear shift mode, as requested by the gear shift command.

The routine proceeds to step 102 wherein it is determined whether an ETC downshift flag xEtc1 or xEtc2 is set to ON or not which indicates that stated ETC downshift requirements have been met. If a NO answer is obtained meaning that both the ETC downshift flags xEtc1 and xEtc2 are set to OFF, then the routine proceeds to step 105 wherein gear shift hydraulic pressure control in the gear shift mode, as determined in step 101, is executed to shift the gear of the automatic transmission 51 to that, as requested by the gear shift command. The routine then terminates.

Figure 17:
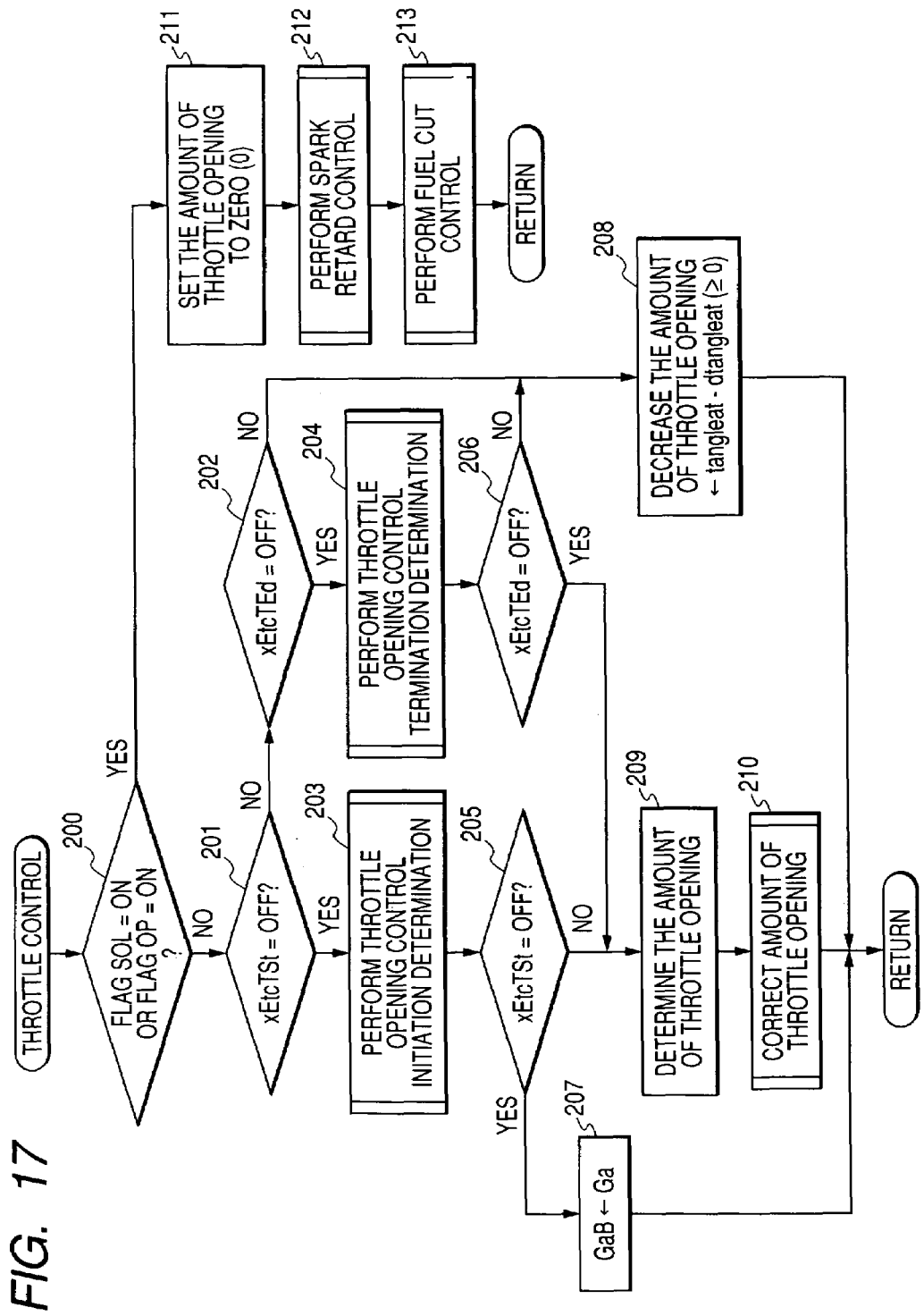
FIG. 17 is a flowchart of a throttle valve control program be executed by the engine control system of FIG. 1 upon a downshift of an automatic transmission.
Figure 22:
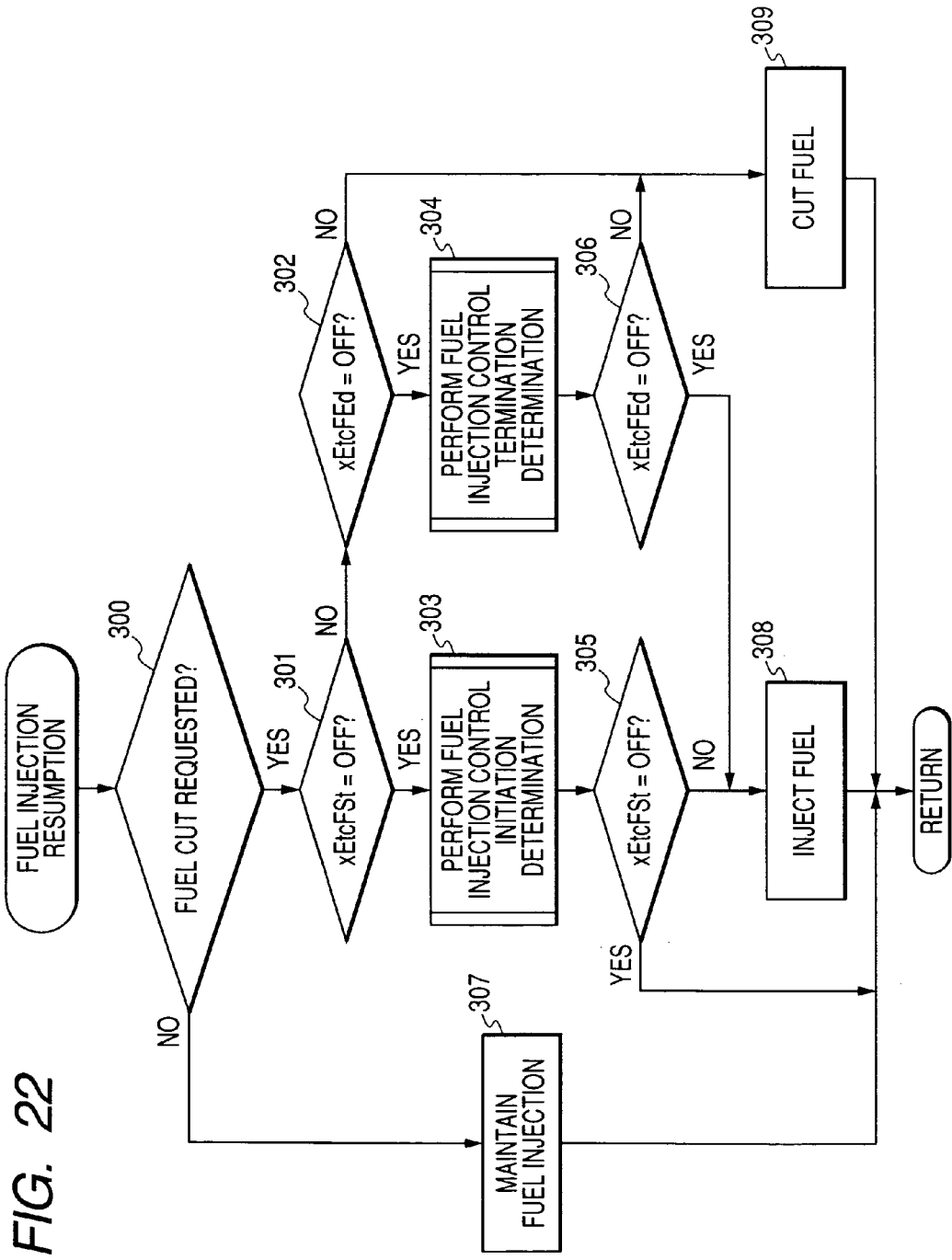
FIG. 22 is a flowchart of a fuel injection control resumption program to be executed by the engine control system of FIG. 1 upon a downshift of an automatic transmission.

If a YES answer is obtained instep 102 meaning that either of the ETC downshift flags xEtc1 and xEtc2 is set to ON and that the ETC downshift requirements have been met, then the routine proceeds to step 103 wherein throttle opening control, as will be described later in FIG. 17, is initiated. The routine the proceeds to step 104 wherein fuel injection resumption, as will be described later in FIG. 22, is initiated. The routine then proceeds to step 105, as described above.

Figure 11:
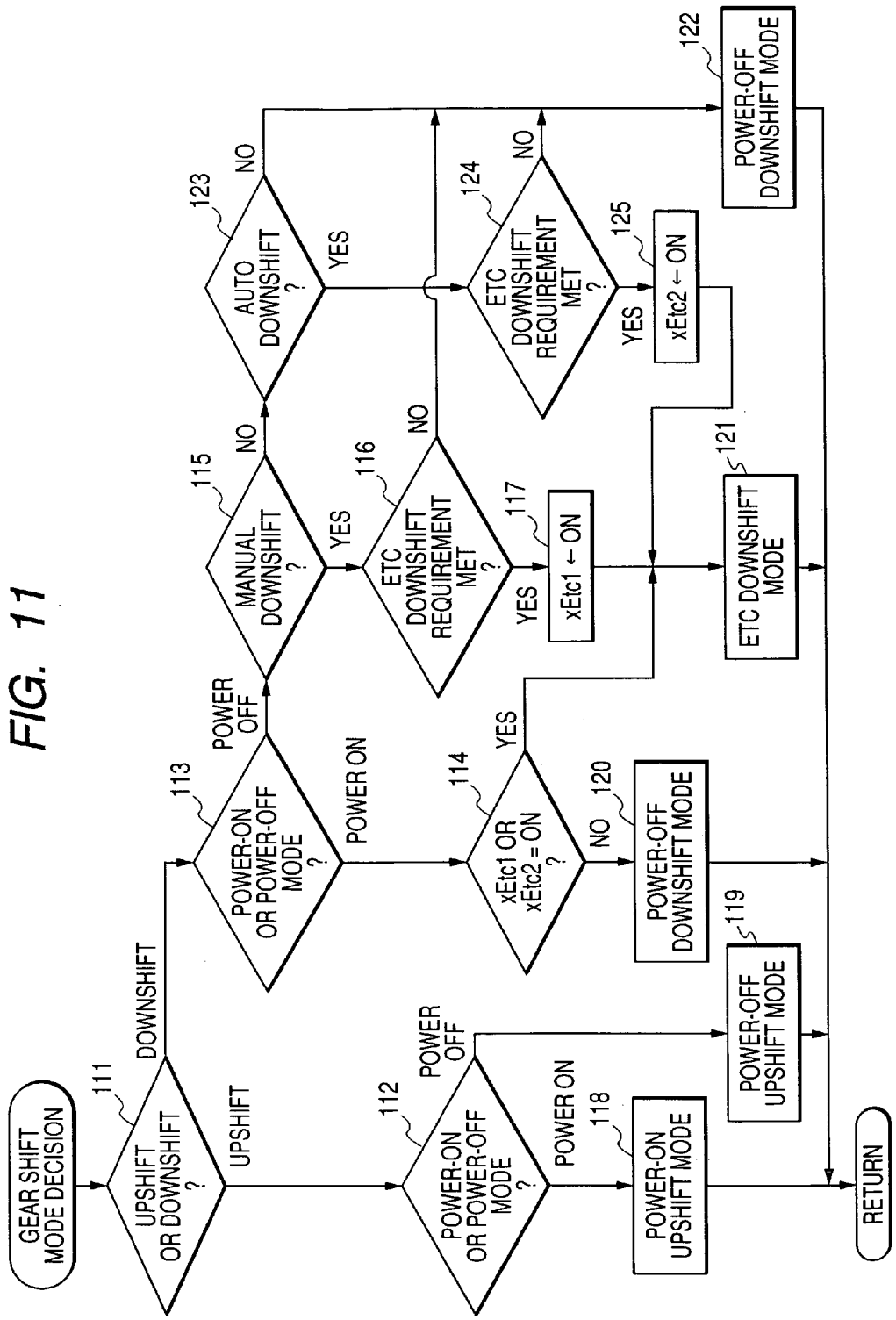
FIG. 11 is a flowchart of a gear shift mode decision program to be executed by the engine control system of FIG. 1.

FIG. 11 shows the gear shift mode decision program to be executed in step 101 of FIG. 10.

After entering the program, the routine proceeds to step 111 wherein it is determined whether the current gear shift command is requesting an upshift or a downshift. If the upshift is determined to be being requested, then the routine proceeds to step 112 wherein it is determined whether the automatic transmission 51 is in a power-on mode in which the power of the engine 11 is applied to the automatic transmission 51 or a power-off mode in which the power is applied to the automatic transmission 51 from the driven wheels of the vehicle. If it is determined that the automatic transmission 51 is in the power-on mode, then the routine proceeds to step 118 wherein a gear shift, as requested by the current gear shift command, is determined to be requesting a power-on upshift. Alternatively, if it is determined that the automatic transmission 51 is in the power-off mode, then the routine proceeds to step 119 wherein the gear shift, as requested by the current gear shift command, is determined to be requesting a power-off upshift.

If the downshift is determined to be being requested in step 111, then the routine proceeds to step 113 wherein it is determined whether the automatic transmission 51 is in the power-on mode or in the power-off mode. If it is determined that the automatic transmission 51 is in the power-off mode, then the routine proceeds to step 115 wherein it is determined whether a gear shift, as requested by the current gear shift command, is a manual downshift, as requested by a vehicle driver's manual operation on the shift lever 65, or not. If a YES answer is obtained, then the routine proceeds to step 116 wherein it is determined whether an ETC downshift requirement is met or not by determining whether the temperature of working oil in the hydraulic control circuit 57 lies within a range or not which ensures a desired hydraulic response to the hydraulic pressure command value in order to assure hydraulic controllability of the hydraulic control circuit 57. If a YES answer is obtained in step 116 meaning that the ETC downshift requirement is encountered, then the routine proceeds to step 117 wherein the first ETC downshift flag xEtc1 is set to ON. The routine proceeds to step 121 wherein the current gear shift command is determined to be requesting an ETC downshift.

If it is determined that the gear shift, as requested by the current gear shift command, is not the manual downshift, then the routine proceeds to step 123 wherein it is determined whether the gear shift, as requested by the current gear shift command, is an auto-downshift or not. If a YES answer is obtained, then the routine proceeds to step 124 wherein it is determined, like in step 116, whether the ETC downshift requirement is met or not. If a YES answer is obtained meaning that the ETC downshift requirement is encountered, then the routine proceeds to step 125 wherein the second ETC downshift flag xEtc2 is set to ON. The routine proceeds to step 121 wherein the current gear shift command is determined to be requesting the ETC downshift.

If it is determined in step 123 that the gear shift, as requested by the current gear shift command, is not the auto-downshift or if it is determined in step 116 or 124 that the ETC downshift requirement is not met, then the routine proceeds to step 122 wherein the current gear shift command is determined to be requesting a power-off downshift.

If it is determined that the automatic transmission 51 is in the power-on mode, then the routine proceeds to step 114 wherein it is determined whether either of the ETC downshift flags xEtc1 and xEtc2 is in the ON state or not in order to discriminate whether the power-on mode is established by the ETC downshift operation (i.e., the engine output increasing control) or driver's depression of the accelerator pedal 26. If a YES answer is obtained meaning that the ETC downshift flag xEtc1 or xEtc2 is in the ON state, then the routine proceeds to step 121 wherein the current gear shift command is determined to be requesting the ETC downshift. Alternatively, if a NO answer is obtained, then the routine proceeds to step 120 wherein the current gear shift command is determined to be requesting a power-on downshift.

Figure 12:
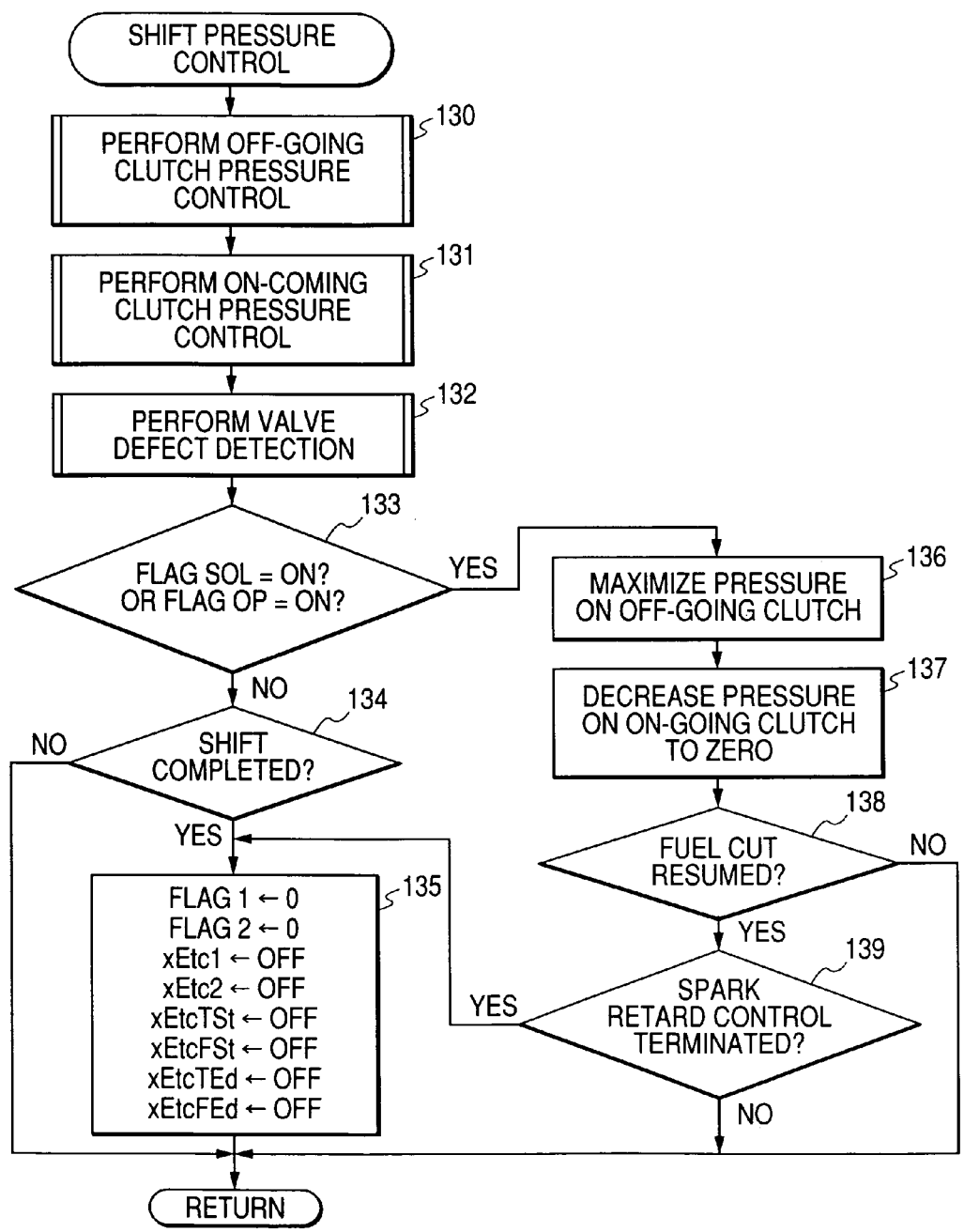
FIG. 12 is a flowchart of a hydraulic pressure control program to be executed by the engine control system of FIG. 1.

FIG. 12 shows a gear shift hydraulic control program to be launched when the current gear shift command is requesting the ETC downshift.

Figure 14:
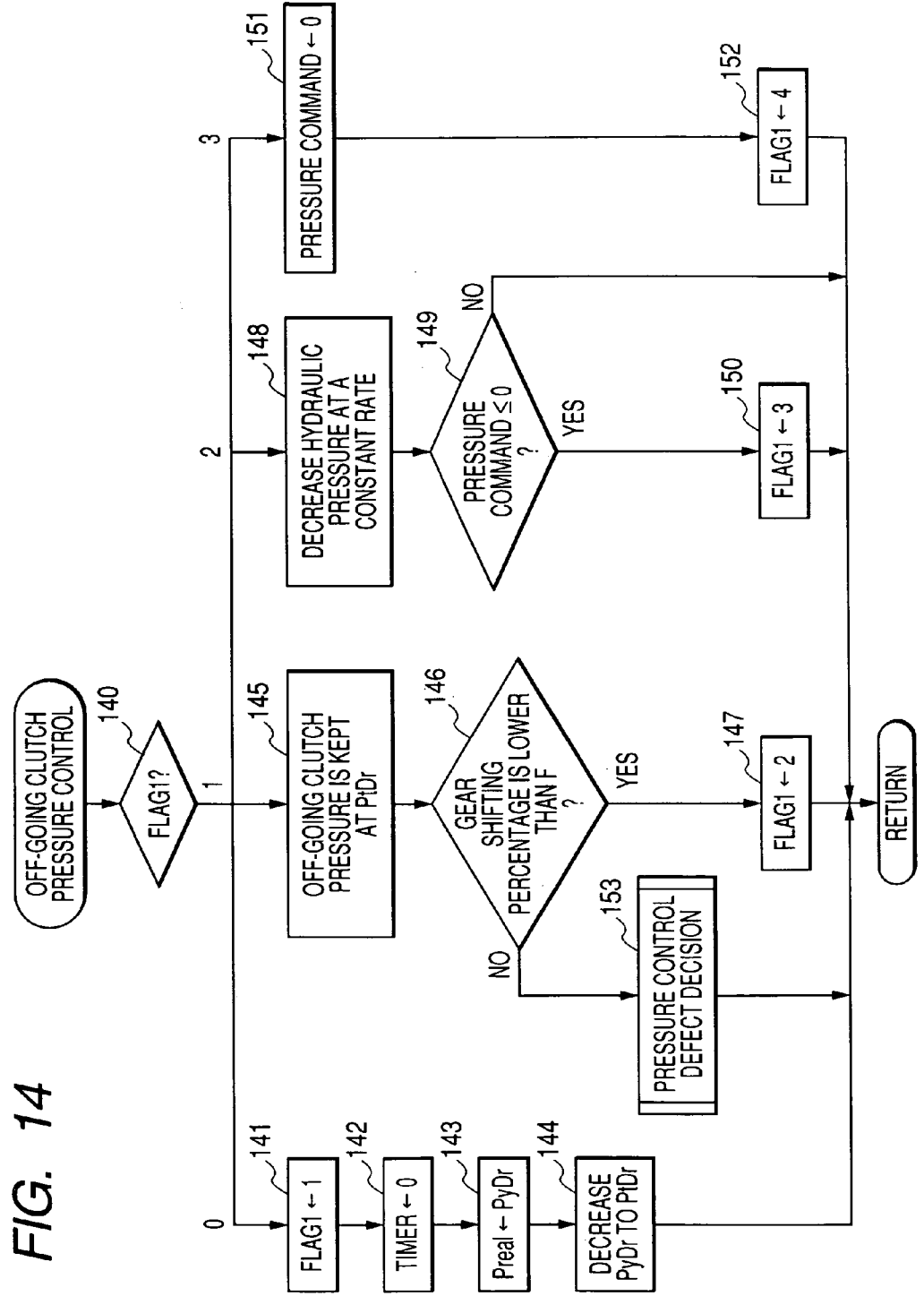
FIG. 14 is a flowchart of an off-going clutch control program for an automatic transmission to be executed by the engine control system of FIG. 1.

After entering the program, the routine proceeds to step 130 wherein off-going clutch pressure control, as will be discussed later in FIG. 14, is executed to control the hydraulic pressure acting on the off-going clutch in the transmission gearbox 55.

Figure 16:
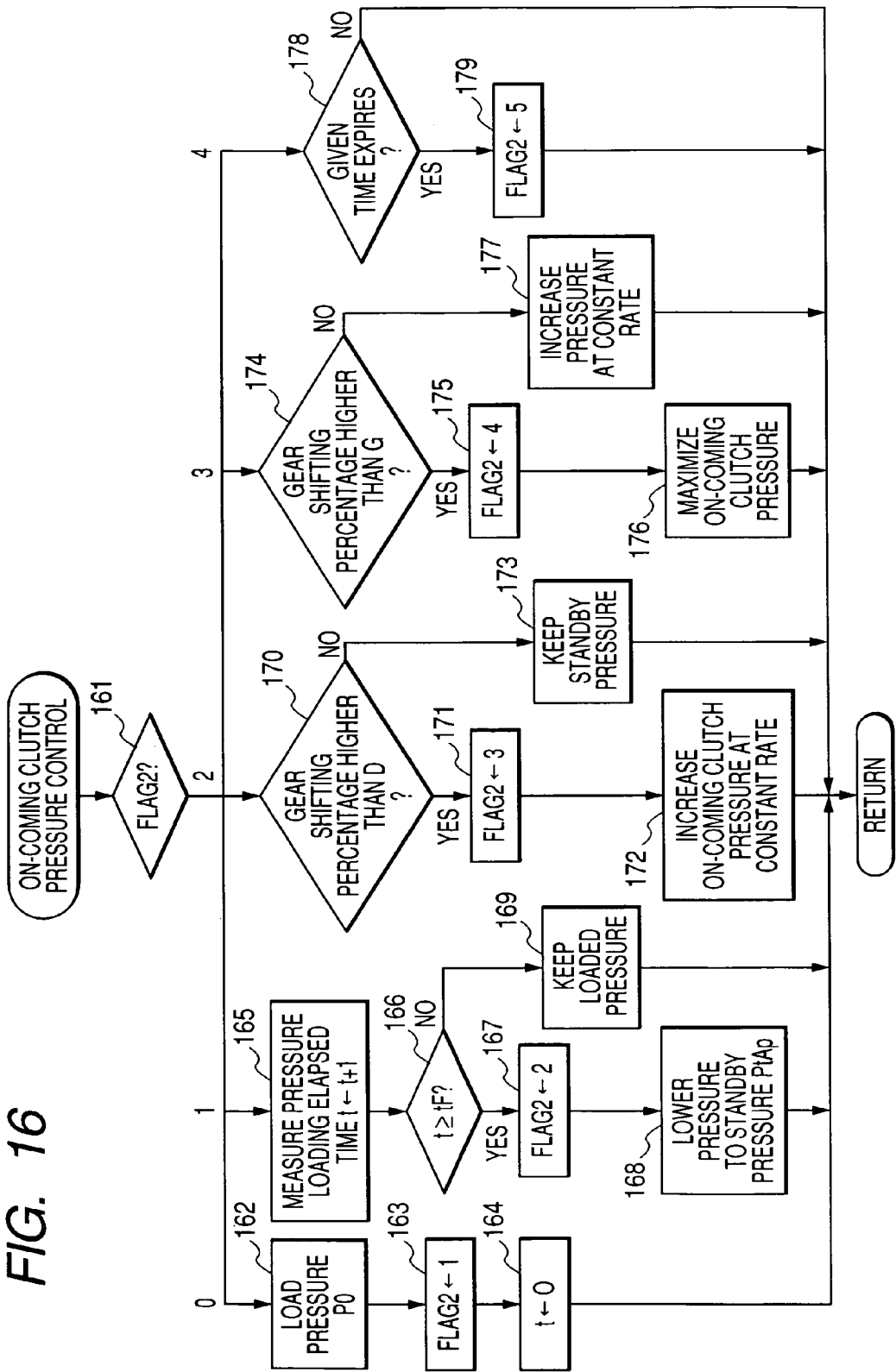
FIG. 16 is a flowchart of an on-coming clutch control program for an automatic transmission to be executed by the engine control system of FIG. 1.

The routine proceeds to step 131 wherein on-coming clutch pressure control, as will be discussed later in FIG. 16, is executed to control the hydraulic pressure acting on the on-coming clutch in the transmission gearbox 55.

Figure 13:
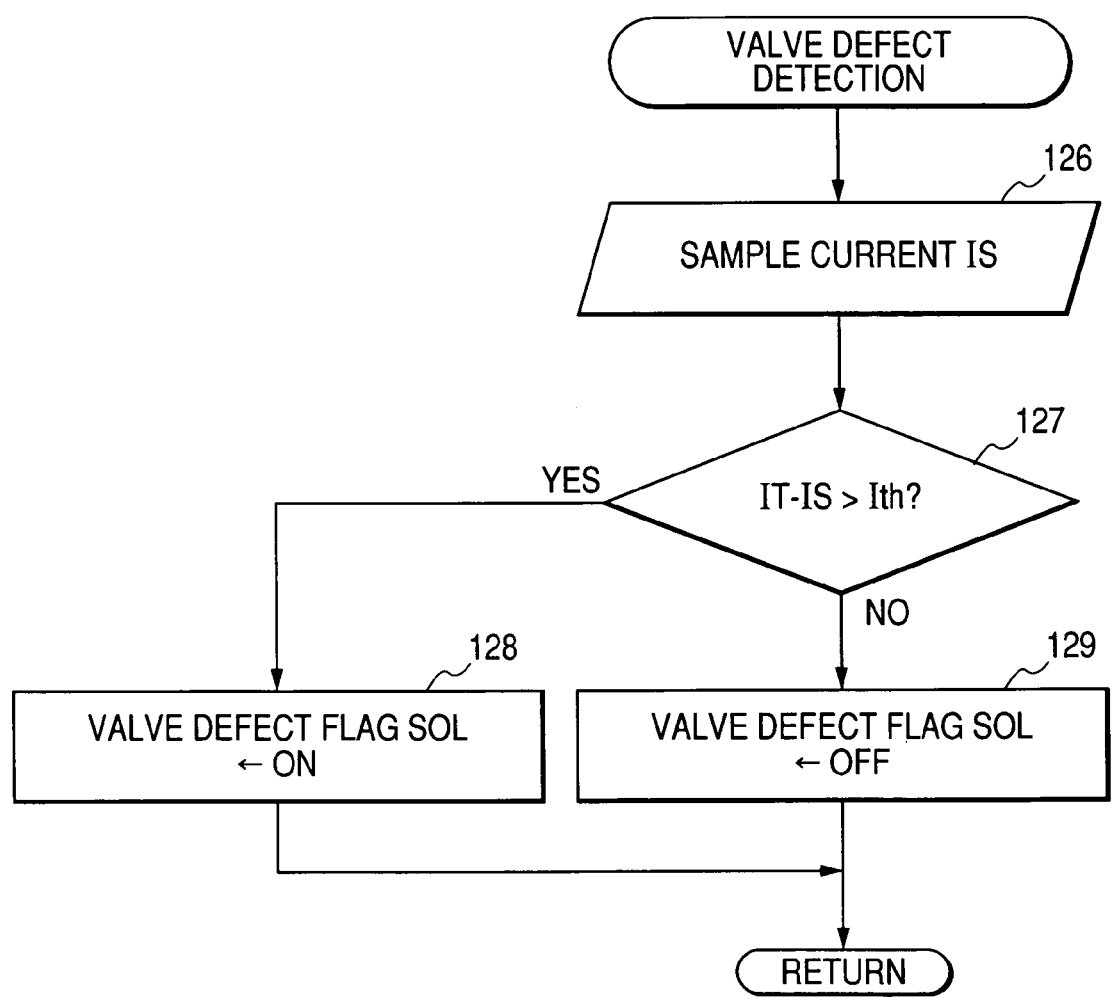
FIG. 13 is a flowchart of a solenoid wire disconnection detecting program to be executed by the engine control system of FIG. 1.

The routine proceeds to step 132 wherein valve defect detection, as will be discussed later in FIG. 13, is performed to determine whether there is a defect in each of the hydraulic pressure control valves 90 such as a wire disconnection in the solenoids 18 or not.

The routine proceeds to step 133 wherein it is determined whether a valve defect flag SOL indicating the presence of a defect in any of the hydraulic pressure control valves 90 such as a wire disconnection in the solenoids 81 or a pressure control defect flag OP indicating the presence of a defect in the hydraulic pressure control by the hydraulic control circuit 57 is ON or not. If a NO answer is obtained meaning that the defects in each of the hydraulic control valves 90 and the hydraulic pressure control are not detected, then the routine proceeds to step 134 wherein it is determined whether the downshift has been completed or not by determining whether control step flags Flag 1 and Flag 2, as will be described later in detail, are four (4) and five (5), respectively, or not. If a YES answer is obtained meaning that the downshift has been completed, then the routine proceeds to step 135 wherein the control step flags Flag 1 and Flag 2 are both reset to zero (0), and other flags xEtc1, xEtc2, xEtcTSt, xEtcFSt, xEtcTEd, and xEtcFEd or all set to OFF. The routine then terminates.

If it is determined in step 133 that either of the valve defect flag Flag 1 or the pressure control defect flag Flag 2 is ON meaning that the defect is occurring in any of the hydraulic pressure control valves 90 or the hydraulic pressure control, which will lead to a failure in the downshift, then the routine proceeds to step 136 wherein the hydraulic pressure to be supplied to the off-going clutch is maximized. The routine then proceeds to step 137 wherein the hydraulic pressure to be supplied to the on-coming clutch is decreased to zero (0) to inhibit the downshift.

The routine proceeds to step 138 wherein it is determined whether a fuel cut has been resumed or not. If a NO answer is obtained, then the routine terminates. Alternatively, if a YES answer is obtained, then the routine proceeds to step 139 wherein it is determined whether a spark retard control has been terminated or not. If a NO answer is obtained, then the routine terminates. Alternatively, if a YES answer is obtained, then the routine proceeds to step 135, as described above.

FIG. 13 shows a valve defect detection program to be executed in step 132 of FIG. 12 to detect a defect in each of the hydraulic pressure control valves 90. This program is performed for each of the hydraulic pressure control valves 90.

After entering the program, the routine proceeds to step 126 wherein the current IS flowing through the solenoid 81, as already referred to in FIG. 9, is sampled through the failure monitor circuit 82.

The routine proceeds to step 127 wherein it is determined whether a difference (IT-IS) between the current command value IT, as outputted to the solenoid driver 87, and the value of the current IS, as sampled in step 126, is greater than the failure decision threshold Ith or not to diagnose the defect of the hydraulic pressure control valve 90, such as a wire disconnection in the solenoid 81.

If a YES answer is obtained (i.e., IT-IS>Ith), then the routine proceeds to step 128 wherein the valve defect flag SOL is set to ON indicating the fact that the hydraulic pressure control valve 90 is malfunctioning. Alternatively, if a NO answer is obtained, then the routine proceeds to step 129 wherein the valve defect flag SOL is set to OFF indicating the fact that the hydraulic pressure control valve 90 is operating properly. Note that it is preferable that when at least the off-going clutch is determined to be malfunctioning, the valve defect flag SOL is set to ON in order to ensure the effectiveness of the engine output increasing control during the downshift operation of the automatic transmission 51.

FIG. 14 shows an off-going clutch pressure control program to be executed in step 130 of FIG. 12 to control the hydraulic pressure acting on the off-going clutch in the transmission gearbox 55.

After entering the program, the routine proceeds to step 140 wherein it is determined which of 0, 1, 2, and 3, the control step flag Flag1 indicates to find a current step of hydraulic pressure control for the off-going clutch of the automatic transmission 51. Specifically, the AT-ECU 70 is designed to control the hydraulic pressure to be supplied to the off-going clutch in a sequence of four control steps. The control step flag Flag1 is incremented by one (1) each time the control step proceeds to the next one. The control step flag Flag1 changes from an initial value of zero (0) to four (4) representing the final control step.

For example, at time t0 when the hydraulic pressure control for the off-going clutch starts, the control step flag Flag1 is placed at the initial value of zero (0). The routine, thus, proceeds to step 141 wherein the control step flag Flag1 is set to one (1). The routine proceeds to step 142 wherein a timer, which measures the elapsed time from the start of the downshift hydraulic pressure control, i.e., since a downshift request arises, is reset. The routine proceeds to step 143 wherein an initial value of an estimate of an actual hydraulic pressure (will be referred to as an actual pressure estimate Preal below) acting on the off-going clutch (y) which is going to be disengaged at the current ETC downshift is updated to a hydraulic pressure command value PyDr for the off-going clutch (y). The routine proceeds to step 144 wherein the hydraulic pressure command value PyDr is set to a standby hydraulic pressure PtDr to decrease the hydraulic pressure to be supplied to the off-going clutch to the standby hydraulic pressure PtDr (i.e., the first control step).

Figure 15:
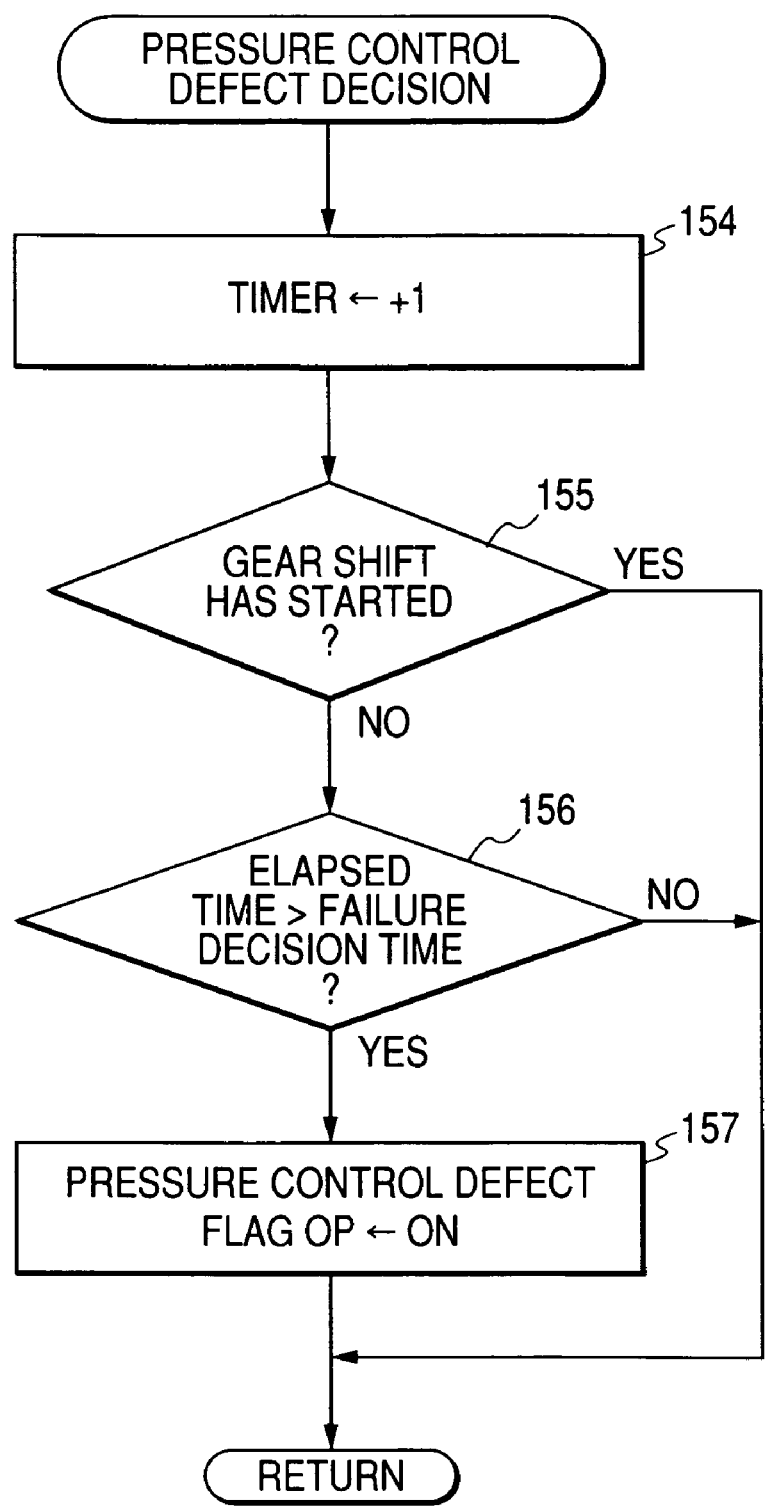
FIG. 15 is a flowchart of a hydraulic control defect decision program for an automatic transmission to be executed by the engine control system of FIG. 1.

Upon subsequent initiation of this program, the routine proceeds from step 140 to step 145 since the control step flag Flag1 is already set to one (1). In step 145, the hydraulic pressure acting on the off-going clutch is kept at the standby hydraulic pressure PtDr. The routine proceeds to step 146 wherein it is determined whether the gear shifting percentage SftR has reached to a stated value F defined near 100% or not. If a NO answer is obtained, then the routine proceeds to step 153 wherein a hydraulic pressure defect decision program, as will be discussed later in FIG. 15, is launched to diagnose a failure in controlling the hydraulic pressure to the transmission gearbox 55. Alternatively, if a YES answer is obtained, then the routine proceeds to step 147 wherein the control step flag Flag1 is set to two (2) to terminate the second step of the hydraulic pressure control for the off-going clutch.

Upon subsequent initiation of this program, the routine proceeds from step 140 to step 148 wherein the hydraulic pressure command value for the off-going clutch is decreased at a constant rate. The routine proceeds to step 149 wherein it is determined whether the hydraulic pressure command value has decreased below zero (0) or not. The third step of the hydraulic pressure control continues until the hydraulic pressure command value is below zero (0). If a YES answer is obtained, then the routine proceeds to step 150 wherein the control step flag Flag1 is set to three (3) to terminate the third step of the hydraulic pressure control for the off-going clutch.

Upon subsequent initiation of this program, the routine proceeds from step 140 to step 151 wherein the hydraulic pressure command value is set to zero (0) to disengage the off-going clutch fully. The routine proceeds to step 152 wherein the control step flag Flag1 is set to four (4) to terminate the hydraulic pressure control for the off-going clutch.

FIG. 15 shows the hydraulic pressure control defect detection program to be executed in step 153 of FIG. 14.

First, in step 154, the count value of the timer is counted up to measure the elapsed time from the start of the downshift hydraulic pressure control, i.e., since the downshift request arise.

The routine proceeds to step 155 wherein it is determined whether an actual gear shift has started in the transmission gearbox 55 or not by, as described above, determining whether the gear ratio (Nt/No) has started to change to that upon completion of the gear shift or whether the input shaft speed Nt of the transmission gearbox 55 has exceeded a stated decision speed lightly greater than the product of the output shaft speed No and the gear ratio at the speed before the gear shift. If a YES answer is obtained meaning that the transmission gearbox 55 has started to make the gear shift actually, then the routine terminates. Alternatively, if a NO answer is obtained, then the proceeds to step 156 wherein it is determined whether the elapsed time, as measured by the timer instep 154, has exceeded a failure decision time set slightly longer than an expected time at which the automatic transmission 51 will launch the gear shift actually or not. If a NO answer is obtained, then the routine terminates. Alternatively, if a YES answer is obtained meaning that the fact that the gear shift has started is not found, and the value of the timer has exceeded the failure decision time, then the routine proceeds to step 157 wherein a pressure control failure flag OP is set to ON indicating the occurrence of failure in the hydraulic pressure control for the automatic transmission 51.

FIG. 16 shows an off-going clutch pressure control program to be executed in step 131 of FIG. 12 to control the hydraulic pressure acting on the on-coming clutch in the transmission gearbox 55.

First, in step 161, it is determined which of 0, 1, 2, 3, and 4 the control step flag Flag2 indicates to find a current step of hydraulic pressure control for the on-coming clutch of the automatic transmission 51. Specifically, the AT-ECU 70 is designed to control the hydraulic pressure to be supplied to the on-coming clutch in a sequence of five control steps. The control step flag Flag2 is incremented by one (1) each time the control step proceeds to the next one. The control step flag Flag2 changes from an initial value of zero (0) to five (5) representing the final control step.

For example, at time t0 when the hydraulic pressure control for the on-coming clutch starts, the control step flag Flag2 is placed at the initial value of zero (0). The routine, thus, proceeds to step 162 wherein the hydraulic control command value is set to the loading pressure PO, as described above, for bringing the on-coming clutch into a position immediately before the on-coming clutch is engaged to connect a driving force from a driven member thereof. The routine proceeds to step 163 wherein the control step flag Flag2 is set to one (1). The routine proceeds to step 164 wherein a count value t of a pressure loading timer, which measures the elapsed time from the start of the loading of the hydraulic pressure to the on-coming clutch, is reset to zero (0). The routine then terminates.

Upon subsequent initiation of this program, the routine proceeds from step 161 to step 165 since the control step flag Flag2 is already set to one (1). In step 165, the count value of the pressure loading timer is counted up to measure the elapsed time from the start of loading of the hydraulic pressure to the on-coming clutch. The routine proceeds to step 166 wherein it is determined whether the count value t of the pressure loading timer has exceeded a stated time tF or not. If a NO answer is obtained, then the routine proceeds to step 169 wherein the hydraulic pressure loaded to the on-coming clutch is kept constant until expiry of the stated time tF. The time tF is a period of time required to bring the on-coming clutch into a position before the on-coming clutch is engaged and predetermined experimentally.

Alternatively, if a YES answer is obtained in step 166, then the routine proceeds to step 167 wherein the control step flag Flag2 is set to two (2). The routine proceeds to step 168 wherein the hydraulic pressure command value is decreased to the standby hydraulic pressure PtAp to terminate the loading of the hydraulic pressure to the on-coming clutch. Afterwards, the on-coming clutch is kept by the standby hydraulic pressure PtAp in the right-before engaged position.

When the on-coming clutch is subjected to the standby hydraulic pressure PtAp, the control step flag Flag2 is placed at two (2). The routine, thus, proceeds from step 161 to step 170 wherein it is determined whether the gear shifting percentage SftR is higher than or equal to the stated value D or not (see FIG. 6). If a NO answer is obtained, then the routine proceeds to step 173 wherein the hydraulic pressure command value is kept at the standby hydraulic pressure PtAp until the gear shifting percentage SftR exceeds the value D.

If a YES answer is obtained in step 170, then the routine proceeds to step 171 wherein the control step flag Flag2 is set to three (3). The routine proceeds to step 172 wherein the hydraulic pressure command value is increased at a constant rate.

Upon subsequent initiation of this program, the routine proceeds from step 161 to step 174 wherein it is determined whether the gear shifting percentage SftR is higher than or equal to the stated value G set near 100% or not (see FIG. 6). If a NO answer is obtained, then the routine proceeds to step 177 wherein the hydraulic pressure command value is increased at the constant rate until the gear shifting percentage SftR exceeds the value G.

If a YES answer is obtained in step 174 wherein the control step flag Flag2 is set to four (4). The routine proceeds to step 176 wherein the hydraulic pressure command value is maximized to increase the hydraulic pressure applied to the on-coming clutch up to a maximum level. With the above operations, the degree of engagement of the on-coming clutch is increased following a rise in the input shaft speed Nt to that when the downshift will be completed.

Upon subsequent initiation of this program, the routine proceeds from step 161 to step 178 wherein it is determined whether a given period of time expires since the control step flag Flag2 is set to four (4), that is, since the gear shifting percentage SftR has reached the value G or not. If a NO answer is obtained, then the routine terminates. Alternatively, if a YES answer is obtained, then the routine proceeds to step 179 wherein the control step flag Flag2 is set to five (5). The routine then terminates to complete the off-coming clutch hydraulic pressure control.

FIG. 17 shows a throttle opening control program to be executed in step 103 of FIG. 10 to increase the power of the engine 11.

Figure 18:
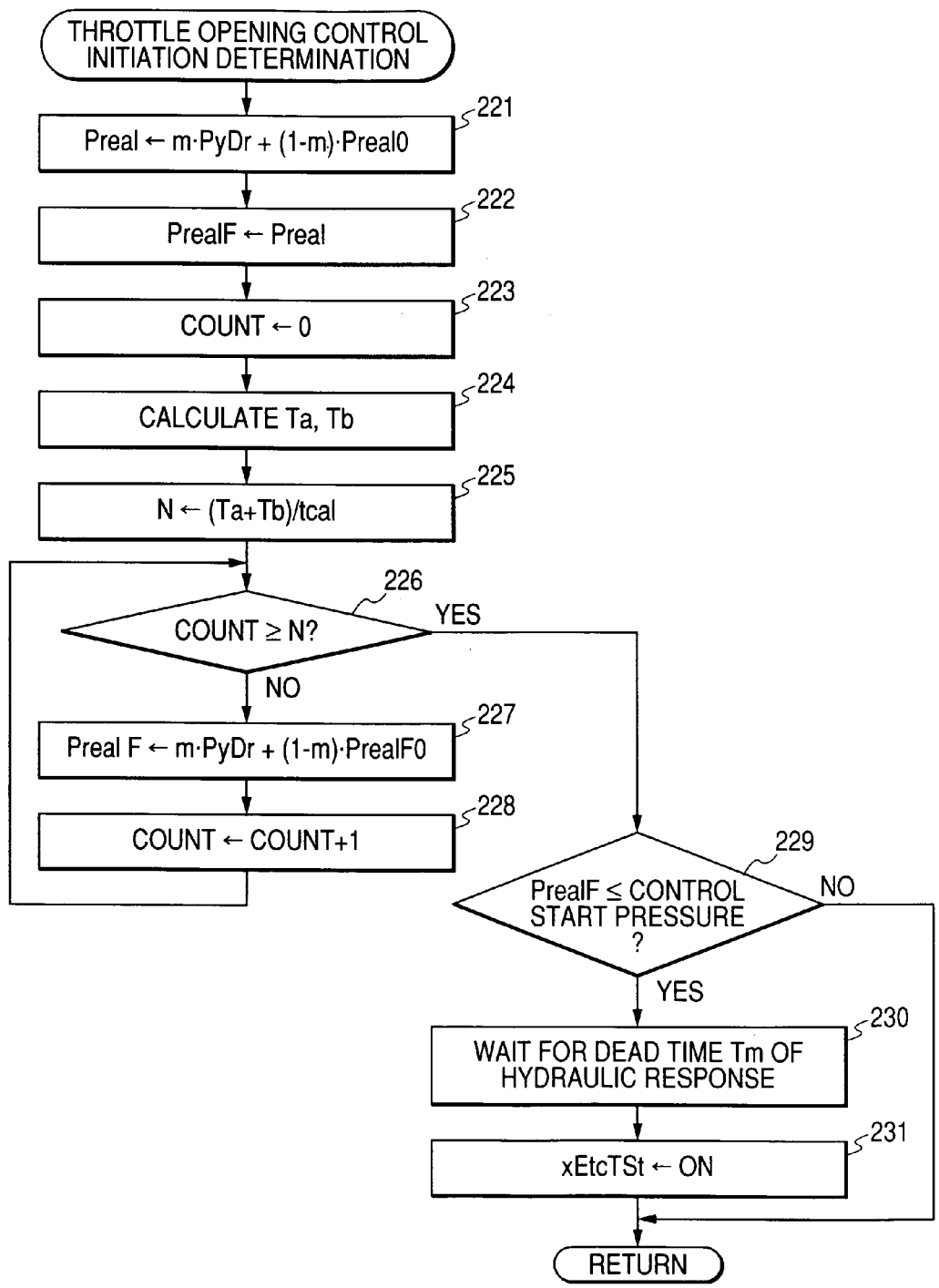
FIG. 18 is a flowchart of a throttle valve control initiation time decision program be executed by the engine control system of FIG. 1 upon a downshift of an automatic transmission.

Upon initiation of this program, the routine proceeds to step 200 wherein it is determined whether the valve defect flag SOL is ON or the pressure control defect flag OP is ON to detect the presence of a defect, as described above, in any of the hydraulic control valves 90 or the hydraulic pressure control for the automatic transmission 55. If both the flags SOL and OP is not ON meaning that the hydraulic pressure control valves 90 and the hydraulic pressure control are operating properly, then the routine proceeds to step 201 wherein it is determined whether a throttle opening control start flag xEtcTSt is OFF or not which indicates that the throttle opening control is not yet to be launched. If a YES answer is obtained, then the routine proceeds to step 203 wherein a throttle opening control initiation determination, as will be discussed later in FIG. 18, is made to determine whether the time the throttle opening control should be initiated has been reached or not. The throttle opening control start flag xEtcTSt is set to ON or OFF which indicates a result of the determination.

The routine proceeds to step 205 wherein it is determined whether the throttle opening control start flag xEtcTSt is still OFF or not. If a YES answer is obtained, then the routine proceeds to step 207 wherein an intake air flow rate GaB, as measured and stored prior to the throttle opening control, is updated to an instantaneous value Ga, as measured by the air flow meter 14. The routine then terminates.

Figure 20:
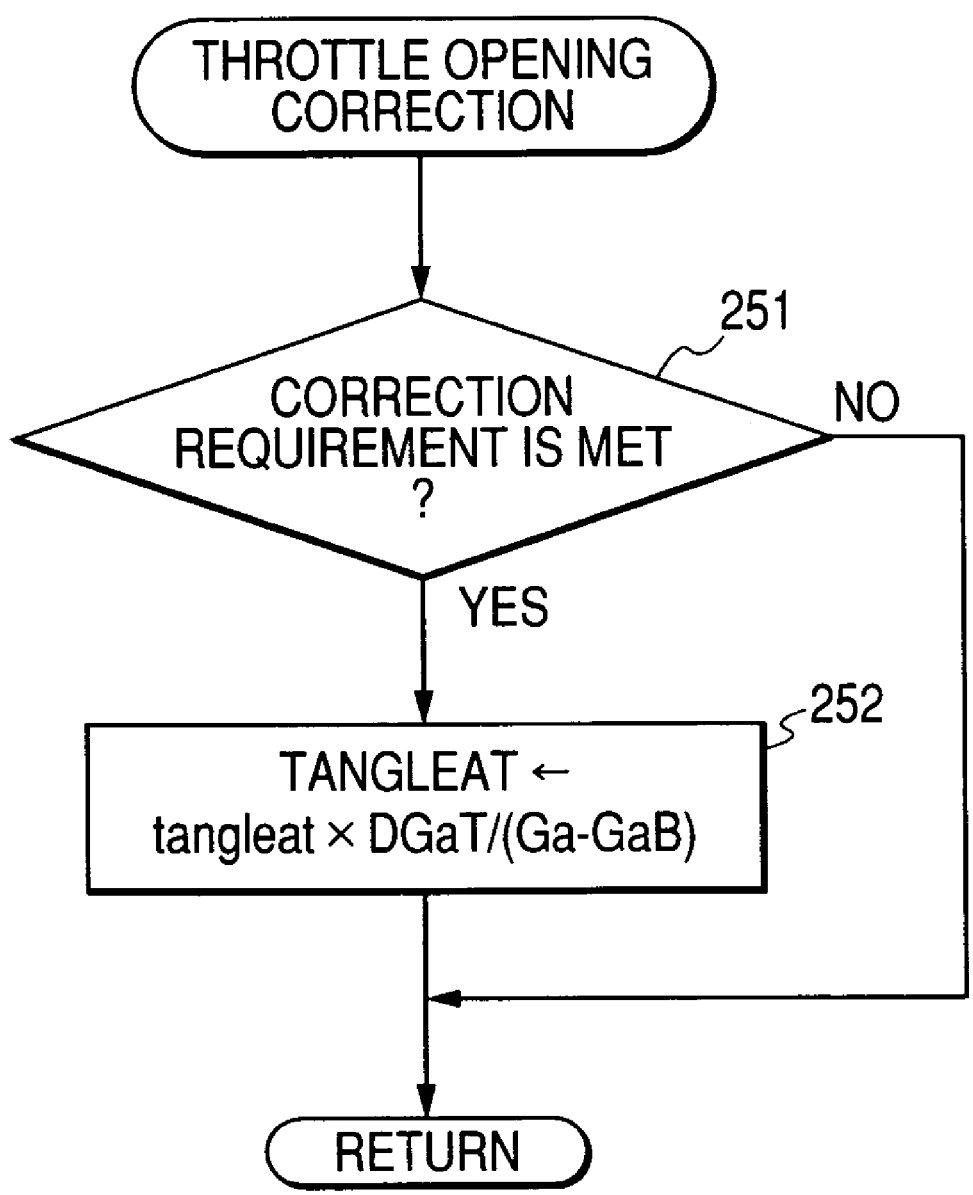
FIG. 20 is a flowchart of a throttle valve position correction program be executed by the engine control system of FIG. 1 upon a downshift of an automatic transmission.

If a NO answer is obtained in step 205 meaning that the throttle opening control start flag xEtcTSt has been set to ON, then the routine proceeds to step 209 wherein a throttle opening command value tangleat is determined by look-up using maps, as shown in FIG. 21, based on the transmission speed resulting from a downshift, the temperature of engine coolant, and the input shaft speed Nt of the transmission gearbox 55. The routine proceeds to step 210 wherein a throttle opening correction, as will be described alter in detail in FIG. 20, is made. The routine then terminates.

Figure 19:
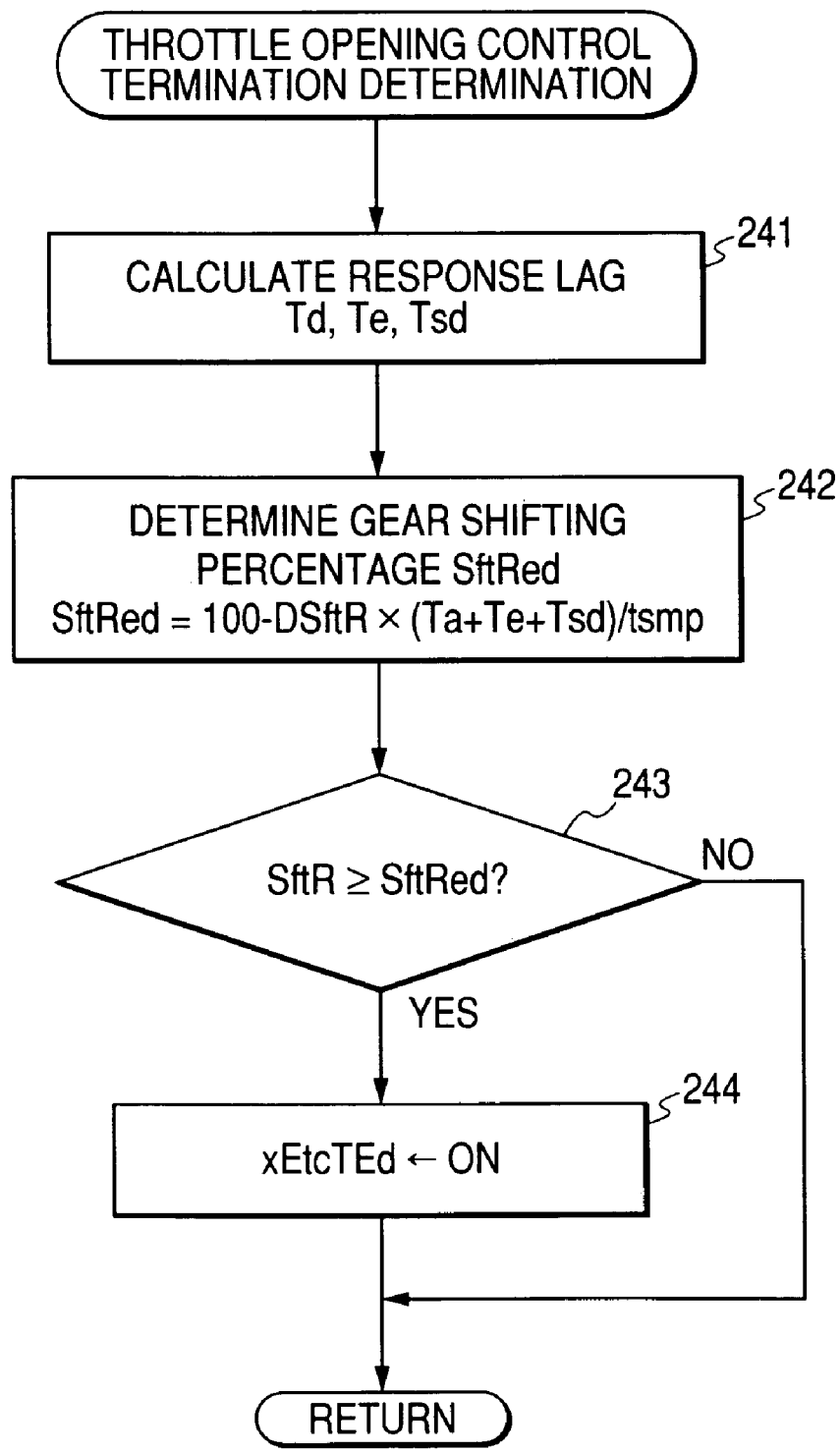
FIG. 19 is a flowchart of a throttle valve control termination time decision program be executed by the engine control system of FIG. 1 upon a downshift of an automatic transmission.

If a NO answer is obtained in step 201 meaning that the throttle opening control start flag xEtcTSt is ON indicating that the throttle opening control is being performed, then the routine proceeds to step 202 wherein it is determined whether a throttle opening control end flag xEtcTEd is OFF or not which indicates that the throttle opening control is not yet to be terminated. If a YES answer is obtained meaning that the throttle opening control is not yet to be terminated, then the routine proceeds to step 204 wherein a throttle opening control termination decision, as will be discussed later in FIG. 19, is made to determine whether the time the throttle opening control should be terminated has been reached or not. The throttle opening control end flag xEtcTEd is set to ON or OFF which indicates a result of the determination.

The routine proceeds to step 206 wherein it is determined whether the throttle opening control end flag xEtcTEd is still OFF or not. If a YES answer is obtained, then the routine proceeds to step 209. Alternatively, if a NO answer is obtained meaning that the throttle opening control end flag xEtcTEdt has been set to ON, then the routine proceeds to step 208 wherein a termination control is initiated by decreasing the throttle opening command value tangleat by a stated amount dtangleat for bringing the throttle opening command value tangleat to zero (0).

Figure 25:
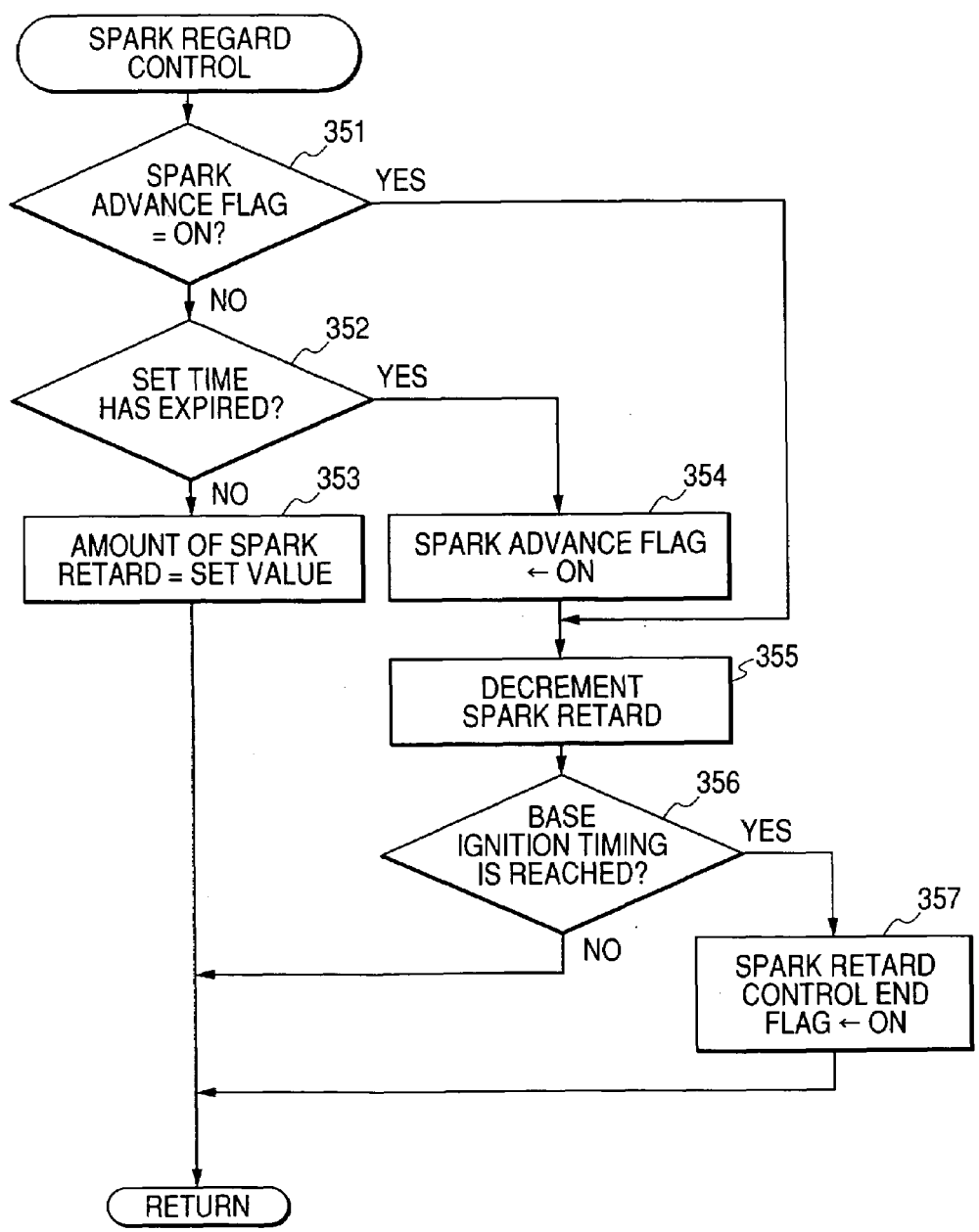
FIG. 25 is a flowchart of a spark retard control program to be executed by the engine control system of FIG. 1 upon a downshift of an automatic transmission.
Figure 26:
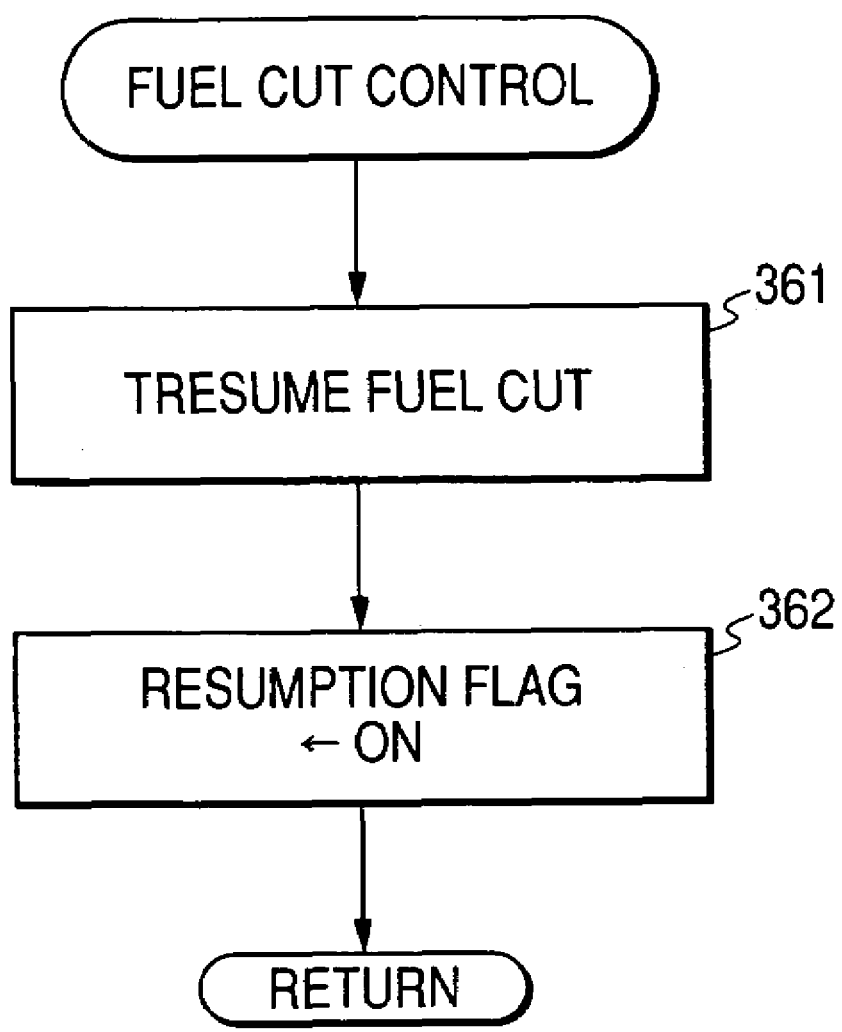
FIG. 26 is a flowchart of a fuel cut program to be executed by the engine control system of FIG. 1 upon a downshift of an automatic transmission.

If a YES answer is obtained in step 200 meaning that the defect is occurring in any of the hydraulic pressure control valves 90 or the hydraulic pressure control, then the routine proceeds to step 211 wherein the throttle opening command value tangleat is set to zero (0) to stop the engine output increasing control immediately. The routine proceeds to step 212 wherein spark retard control, as will be described later in FIG. 25, is launched to retard the ignition timing of the spark plugs 21 to reduce the power of the engine 11. The routine proceeds to step 213 wherein fuel cut control, as will be described later in FIG. 26, is launched to resume a fuel cut in the engine 11.

FIG. 18 shows a throttle opening control initiation determination program to be executed in step 203 of FIG. 17.

After entering step 203, the routine proceeds to step 221 wherein the actual pressure estimate Preal of hydraulic pressure acting on the off-going clutch (y) which is going to be disengaged in the current ETC downshift is approximated to a first-order lag function of the hydraulic pressure control command PyDr for the off-going clutch (y) and calculated according to the following equation.

$$Preal = m \cdot PyDr + (1-m) \cdot Preal0$$

where Preal0 is the actual pressure estimate Preal, as derived one program cycle earlier, and m is a smoothing factor (0<m<1) Note that the initial value of the actual pressure estimate Preal is set in step 143 of FIG. 14 to the hydraulic pressure control command PyDr just before being set to the standby hydraulic pressure.

In the above Eq., the smoothing factor m may be selected as a constant for the sake of simplicity of a mathematical operation, but a variable derived by mathematical calculation or look-up using a map based on the temperature (i.e., the viscosity) of working oil and the type of the clutches of the transmission gearbox 55 which usually give rise to a variation in response of the actual hydraulic pressure acting on the clutch relative to the hydraulic pressure command value PyDr.

After step 221, the routine proceeds to step 222 wherein the actual pressure estimate Preal, as derived in this program cycle, is set to an initial value of an actual pressure estimate PrealF, as will be described later, during a response lag and stored in a memory. The routine proceeds to step 223 wherein a count value of a counter working to count the number of calculations of the actual pressure estimate PrealF during the response lag is reset to zero (0).

The routine proceeds to step 224 wherein the response lag Ta between the start of the throttle opening control and the start of actual motion of the throttle valve 15 and response lag Tb between the start of opening of the throttle vale 15 and the start of rise in power of the engine 11, as described above, are calculated. Specifically, the throttle response lag Ta is calculated by look-up using the map listing parameters (i.e., the temperature of engine coolant, the voltage of the storage battery of the vehicle, etc.) to which the response of the motor 17 of the electronic throttle system is sensitive. The throttle response lag Th is calculated by using the time lag between suction of intake air increased in quantity by opening of the throttle valve 15 into the cylinders of the engine 11 and the start of combustion of a mixture of fuel and the sucked intake air in the engine 11 and the map listing parameters (i.e., the speed of the engine 11, the amount of opening of the throttle valve 15, etc.) related to the flow velocity of the intake air.

The routine proceeds to step 225 wherein it is determined whether the number of calculations N of the actual pressure estimate PrealF made during the sum of the response lags Ta and Tb is determined according to the relation below.

$$N = (Ta + Tb)/tcal$$

where tcal is a cycle of calculation of the actual pressure estimate Preal. Note that the number of calculations N is given by an integer derived by counting fractions of 0.5 and over and cutting away the rest or cutting away fractions.

The routine proceeds to step 226 wherein it is determined whether the count value of the counter has reached the number of calculations N or not. If a NO answer is obtained, then the routine proceeds to step 227 wherein the actual pressure estimate PrealF during the response lag is approximated to a first-order lag function of the hydraulic pressure control command PyDr for the off-going clutch (y) and calculated according to the following equation.

$$PrealF = m \cdot PyDr + (1-m) \cdot PrealF0$$

where PrealF0 is the actual pressure estimate PrealF, as derived one program cycle earlier, and m is a smoothing factor (0<m<1)

The routine proceeds to step 228 wherein the count value of the counter is incremented by one (1) and returns back to step 226.

If a YES answer is obtained in step 226 meaning that the count value has reached the number of calculations N, then the routine proceeds to step 229 wherein it is determined whether the actual pressure estimate PeralF has dropped below a control start pressure (equivalent to a given torque transfer capacity) or not. The control start pressure is selected to a level at which the driver is insensitive to increasing of the engine power and does not feel acceleration of the vehicle because the torque transfer capacity of the off-going clutch is decreased to a lower value or zero (0). The control start pressure may be a stated constant for the sake of simplicity of the mathematical operation, but a variable derived by mathematical calculation or look-up using a map based on the type of the clutches of the transmission gearbox 55 or input torque Tin thereinto.

The input torque Tin may be mathematically determined based on engine operating conditions or characteristics of the torque converter 52 according to an equation below.

$$Tin = C(e) \times tr(e) \times Ne^2$$

where C(e) is a torque converter capacity factor, tr(e) is a torque ratio, and Ne is the speed of the engine 11. The torque converter capacity factor C(e) and the torque ratio tr(e) are each mathematically calculated or found by look-up using a map as a function of a speed ratio (=Nt/Ne). The input torque Tin may also be determined by computing an output torque of the engine 11 using the intake air flow rate and the amount of opening of the throttle valve 15 and multiplying it by the torque ratio t(e).

If a NO answer is obtained in step 229 meaning that the actual pressure estimate PrealF does not yet drop below the control start pressure, then the routine terminates. Alternatively, if a YES answer is obtained, then the routine proceeds to step 230 wherein the routine waits for the dead time Tm of the hydraulic response. Afterwards, the routine then proceeds to step 231 wherein the throttle opening control start flag xEtcTSt is set to ON. The routine then terminates.

FIG. 19 shows a throttle opening control termination decision program to be executed in step 204 of FIG. 17.

First, in step 241, the response lag Td in operation to close the throttle valve 15 fully, the response lag Te between the time when the throttle valve 15 is closed fully and the time when the increasing of power of the engine 11 is terminated completely, and the response lag Tsd between the time when the termination time the increasing of power of the engine 11 should be terminated and the time when the throttle opening command value reaches zero (0), as described above, are determined. Specifically, the response lag Td is calculated by look-up using a map listing parameters (i.e., the temperature of engine coolant, the voltage of the storage battery, etc.) to which the response of the motor 17 of the electronic throttle system is sensitive. The response lag Te is calculated by using the time lag between suction of intake air decreased in quantity by closing of the throttle valve 15 into the cylinders of the engine 11 and the start of combustion of a mixture of fuel and the sucked intake air in the engine 11 and a map listing parameters (i.e., the speed of the engine 11, the amount of opening of the throttle valve 15, etc.) related to the flow velocity of the intake air. The response lag Tsd is calculated based on a relation of the throttle opening command value/the rate at which the throttle opening command value is to be changed.

The routine proceeds to step 242 wherein a gear shifting percentage SftRed upon termination of the throttle opening control (i.e., the start of the termination control) is calculated according to an equation below.

$$SftRed = 100 - DSftR \times (Td+Te+Tsd)/tsmp$$

where DSftR is a change in gear shifting percentage SftR per calculation cycle (i.e., a current value of SftR—a previous one), and tsmp is a calculation cycle of DSftR.

From the above equation, the gear shifting percentage SftRed upon termination of the throttle opening control (i.e., the start of the termination control) is derived which compensates for a time lag (Td+Te+Tsd) of response of the system serving to terminate the throttle opening control to achieve an after-shift gear ratio (i.e., StfR=100%).

The routine proceeds to step 243 wherein it is determined whether the actual gear shifting percentage SftR has exceeded the percentage SftRed or not. If a NO answer is obtained (i.e., SftR<SftRed), then the routine terminates. Alternatively, if a YES answer is obtained meaning that the condition in which the downshift terminates actually has been encountered, then the routine proceeds to step 244 wherein the throttle opening control end flag xEtcTEd is set to ON.

FIG. 20 shows a throttle opening correction program to be executed in step 210 of FIG. 17.

First, in step 251, it is determined whether a correction requirement is met or not. This determination may be made by determining whether the elapsed time since the throttle opening command is greater than a response lag equivalent time or not. If a NO answer is obtained, then the routine terminates. Alternatively, if a YES answer is obtained, then the routine proceeds to step 252 wherein the throttle opening command value tangleat (i.e., a target amount of opening of the throttle valve 15) is corrected according to an equation below.

$$tangleat = tangleat \times DGaT/(Ga-GaB)$$

where DGaT is a target increase in intake air flow rate Ga arising from the throttle opening control which is selected by look-up using a table as a function of the throttle opening command value tangleat, and GaB is the intake air flow rate, as measured and stored prior to the throttle opening control in step 207 of FIG. 17. The above correction serves to compensate for errors caused by production and aging variations in the system and variations in operating condition of the engine 11 arising from variations in atmospheric air and temperature of the intake air.

FIG. 22 shows a fuel injection resuming program to be executed in step 104 of the gear shift control in FIG. 10.

Figure 23:
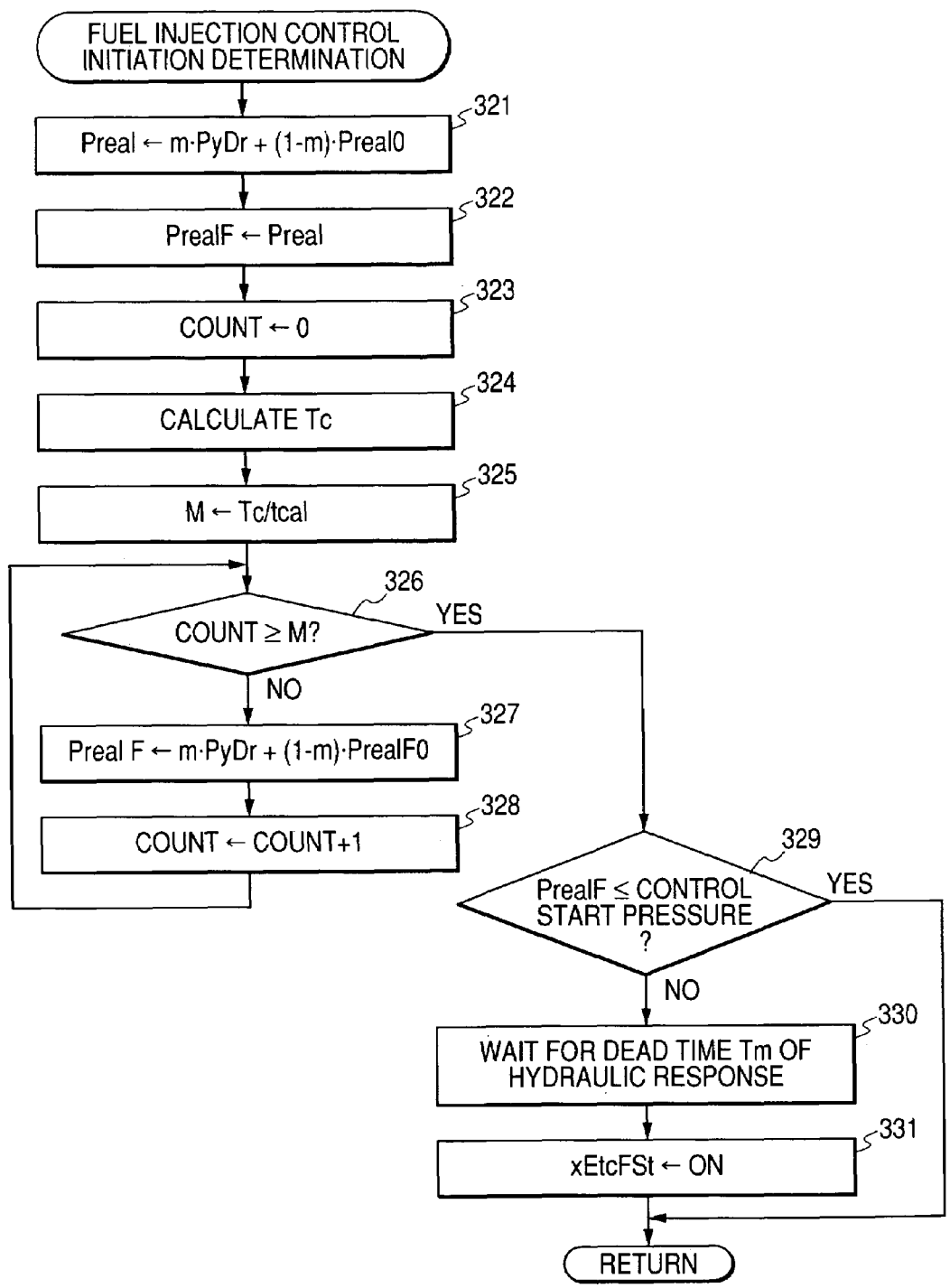
FIG. 23 is a flowchart of a fuel injection control initiation decision program to be executed by the engine control system of FIG. 1 upon a downshift of an automatic transmission.

First, in step 300, it is determined whether the engine 11 is requesting a fuel cut or not. If a NO answer is obtained, then the routine proceeds to step 307 wherein the fuel is maintained to be injected into the engine 11. Alternatively, if a YES answer is obtained meaning that the engine 11 is undergoing a fuel cut, then the routine proceeds to step 301 wherein it is determined whether a fuel injection resumption control start flag xEtcFSt is OFF or not which indicates that the fuel injection is not yet to be resumed. If a YES answer is obtained, then the routine proceeds to step 303 wherein a fuel injection control initiation determination, as will be discussed later in FIG. 23, is made to determine whether the time the fuel injection control should be initiated has been reached or not. The fuel injection resumption control start flag xEtcFSt is set to ON or OFF which indicates a result of the determination.

The routine proceeds to step 305 wherein it is determined whether the fuel injection resumption control start flag xEtcFSt is still OFF or not. If a YES answer is obtained, then the routine terminates. Alternatively, if a NO answer is obtained, then the routine proceeds to step 308 wherein the fuel starts to be injected into the engine 11. The routine terminates.

Figure 24:
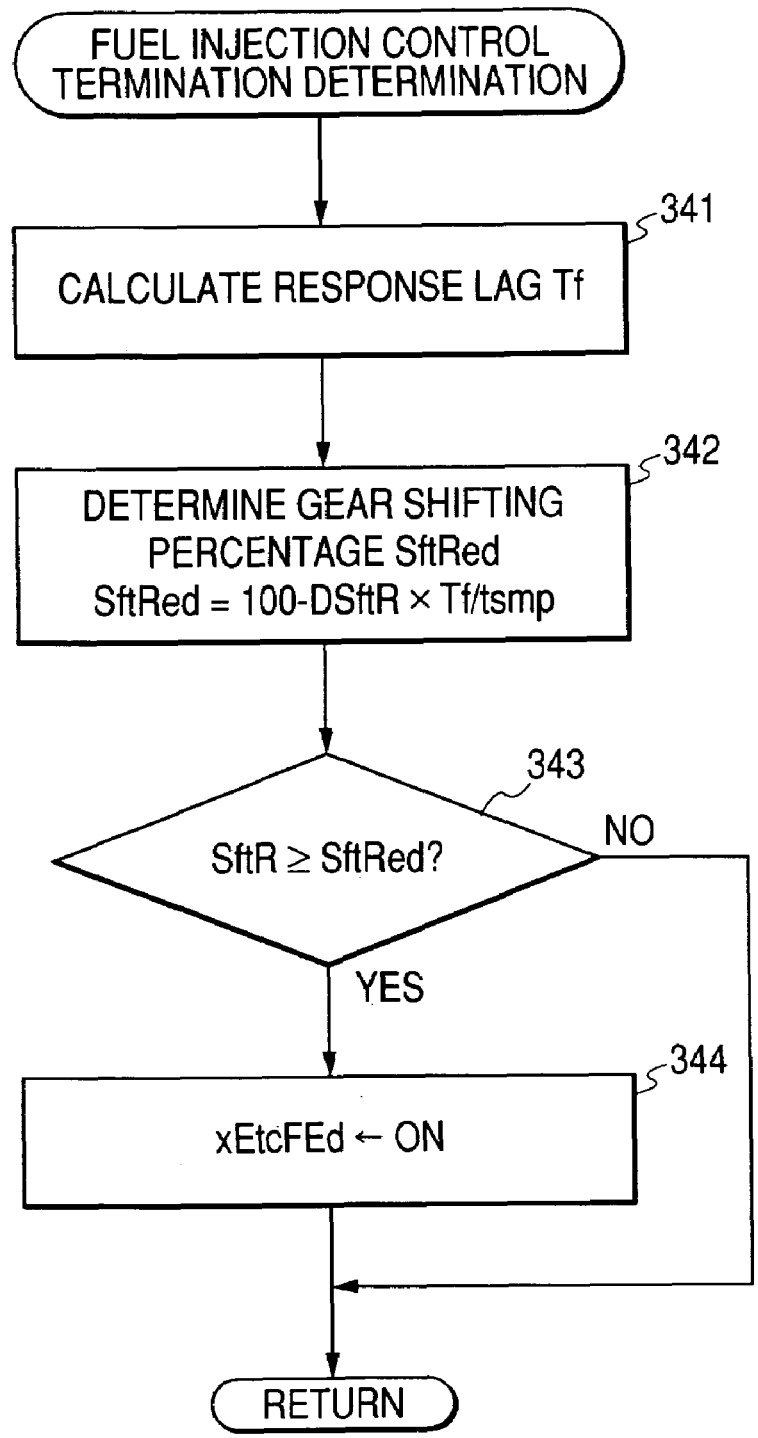
FIG. 24 is a flowchart of a fuel injection control termination decision program to be executed by the engine control system of FIG. 1 upon a downshift of an automatic transmission.

If a NO answer is obtained in step 301 meaning that the fuel injection resumption control start flag xEtcFSt is ON indicating that the fuel injection resumption control is being carried out, then the routine proceeds to step 302 wherein it is determined whether a fuel injection resumption control end flag xEtcFEd is OFF or not which indicates that the fuel injection resumption control is not yet to be terminated. If a NO answer is obtained, then the routine proceeds to step 309 wherein the fuel is maintained to be cut. Alternatively, if a YES answer is obtained, then the routine proceeds to step 304 wherein a fuel injection control termination decision, as will be discussed later in FIG. 24, is made to determine whether the time the fuel injection control should be terminated has been reached or not. The fuel injection resumption control end flag xEtcFEd is set to ON or OFF which indicates a result of the determination.

The routine proceeds to step 306 wherein it is determined whether the fuel injection resumption control end flag xEtcFEd is still OFF or not. If a YES answer is obtained, then the routine proceeds to step 308. Alternatively, if a NO answer is obtained, then the routine proceeds to step 309 wherein the fuel is maintained to be cut.

FIG. 23 shows a fuel injection resumption initiation determining program to be executed in FIG. 303 of FIG. 22.

First, in step 321, the actual pressure estimate Preal of hydraulic pressure acting on the off-going clutch (y) which is going to be disengaged currently is, like in step 221 of FIG. 18, approximated to a first-order lag function of the hydraulic pressure control command PyDr for the off-going clutch (y) and calculated according to the following equation.

$$Preal = m \cdot PyDr + (1-m) \cdot Preal0$$

The routine proceeds to step 322 wherein the actual pressure estimate Preal, as derived in this program cycle, is set to an initial value of the actual pressure estimate PrealF, as will be described later, during a response lag and stored in the memory. The routine proceeds to step 323 wherein a count value of the counter working to count the number of calculations of the actual pressure estimate PrealF during the response lag is reset to zero (0). The routine proceeds to step 324 wherein the response lag Tc between the resumption of injection of fuel into the engine 11 and a resulting rise in power of the engine 11 is calculated as the time required for rotation of the crankshaft of the engine 11 through 720° CA.

The routine proceeds to step 325 wherein the number of calculations M of the actual pressure estimate PrealF during the response lag Tc is determined by a relation of M=Tc/tcal where tcal is a cycle of calculation of the actual pressure estimate PrealF. The number of calculations M is expressed by an integer derived by counting fractions of 0.5 and over as a unit and cut away the rest or cutting away fractions.

The routine proceeds to step 326 wherein it is determined whether the count value of the counter has reached the number of calculations M or not. If a NO answer is obtained, then the routine proceeds to step 327 wherein the actual pressure estimate PrealF during the response lag is calculated, like in step 227 o FIG. 18, by smoothing the hydraulic pressure control command PyDr according to the following equation.

$$PrealF = m \cdot PyDr + (1-m) \cdot PrealF0$$

The routine proceeds to step 328 wherein the count value of the counter is incremented by one (1) and returns back to step 326.

If a YES answer is obtained in step 326 meaning that the count value has reached the number of calculations M, then the routine proceeds to step 329 wherein it is determined, like in step 229 of FIG. 18, whether the actual pressure estimate PeralF has dropped below the control start pressure (equivalent to a given torque transfer capacity) or not. The control start pressure is selected to a level at which the driver is insensitive to increasing of the engine power and does not feel acceleration of the vehicle since the torque transfer capacity of the off-going clutch is decreased to a lower value or zero (0).

If a NO answer is obtained in step 329 meaning that the actual pressure estimate PrealF does not yet drop below the control start pressure, then the routine terminates. Alternatively, if a YES answer is obtained, then the routine proceeds to step 330 wherein the routine waits for the dead time Tm of the hydraulic response. Afterwards, the routine then proceeds to step 331 wherein the fuel injection control start flag xEtcFSt is set to ON. The routine then terminates.

FIG. 24 shows a fuel injection control termination decision program to be executed in step 304 of the fuel injection resumption, as illustrated n FIG. 22.

First, in step 341, the response lag Tf between the resumption of the fuel cut and the time when the power of the engine 11 becomes zero (0) is calculated as the time required for rotation of the crankshaft of the engine 11 through 720° CA.

The routine proceeds to step 342 wherein the gear shifting percentage SftRed upon termination of the fuel injection resumption (i.e., the initiation of the resumption termination control) is calculated according to an equation below.

$$SftRed = 100 - DSftR \times Tf/tsmp$$

where DSftR is a change in gear shifting percentage SftR per calculation cycle (i.e., a current value of SftR—a previous one), and tsmp is a calculation cycle of DSftR.

From the above equation, the gear shifting percentage SftRed upon termination of the fuel injection resumption is derived which compensates for a time lag (Tf) of response of the system serving to terminate the resumption of fuel injection to achieve an after-shift gear ratio (i.e., StfR=100%).

The routine proceeds to step 343 wherein it is determined whether the actual gear shifting percentage SftR has exceeded the percentage SftRed or not. If a NO answer is obtained (i.e., SftR<SftRed), then the routine terminates. Alternatively, if a YES answer is obtained meaning that the condition in which the downshift terminates actually has been encountered, then the routine proceeds to step 344 wherein the fuel injection resumption end flag end flag xEtcFEd is set to ON.

FIG. 25 shows the spark retard control to be executed in step 212 of the throttle opening control in FIG. 17.

First, in step 351, it is determined whether a spark advance flag is ON or not. If a YES answer is obtained, then the routine proceeds to step 355, as will be described later. Alternatively, if a NO answer is obtained, then the routine proceeds to step 352 wherein it is determined whether a set time has expired from the time the spark (i.e., the ignition timing for each of the spark plugs 21) was retarded or not. The retard of the spark is to be launched when step 213 of FIG. 17 is entered. If a NO answer is obtained, then the routine proceeds to step 353 wherein the amount by which the spark is to be retarded is set to a selected value to keep the spark retarded.

If a YES answer is obtained in step 352 meaning the set time has expired, then the routine proceeds to step 354 wherein the spark advance flag is set to ON. The routine proceeds to step 355 wherein the amount of spark retard is decreased at a constant rate to advance the spark. The routine proceeds to step 356 wherein it is determined whether a base ignition timing has been reached or not. If a NO answer is obtained, then the routine terminates. This causes the degree of spark retard to be returned back to the initial one at a constant rate until the current ignition timing reaches the base ignition timing. If a YES answer is obtained meaning that the current ignition timing has reached the base ignition timing, then the routine proceeds to step 357 wherein a spark retard control end flag is set to ON. The routine then terminates the spark retard control.

FIG. 26 shows a fuel cut control program to be executed in step 213 of the throttle opening control in FIG. 17.

First, in step 361, the fuel cut is resumed. The routine proceeds to step 362 wherein a fuel cut resumption flag is set to ON. The routine then terminates.

As apparent from the above discussion, the engine control system of this embodiment is designed to increase the output of the engine 11 regardless of depression of the accelerator pedal 26 in the ETC downshift mode which produces the engine braking according to a driver's deceleration intention and to inhibit the engine output increasing control immediately when either of two conditions is encountered: 1) a defect in operation of any of the hydraulic control valves 90 such as a wire breakage of the solenoid 81 is detected and 2) an actual gear shift of the automatic transmission 51 is not yet found upon expiry of a period of time selected to be slightly longer than a time interval between the start of hydraulic control to make a downshift and the moment the downshift is expected to be launched actually for avoiding an error in operation of the automatic transmission 51 resulting in, for example, undesirable acceleration of the vehicle.

The inhibition of the engine output increasing control is achieved by cutting the fuel to the engine 11 and correcting the amount of retard of the ignition timing of the spark plugs 21 in addition to closing the throttle valve 15, thereby ensuring a quick drop in power of the engine 11 in response to a command to inhibit the engine output increasing control. The correction of the amount of retard of the ignition timing may not be made when the engine output increasing control is inhibited.

The engine control system of the second embodiment will be described below.

Figure 27:
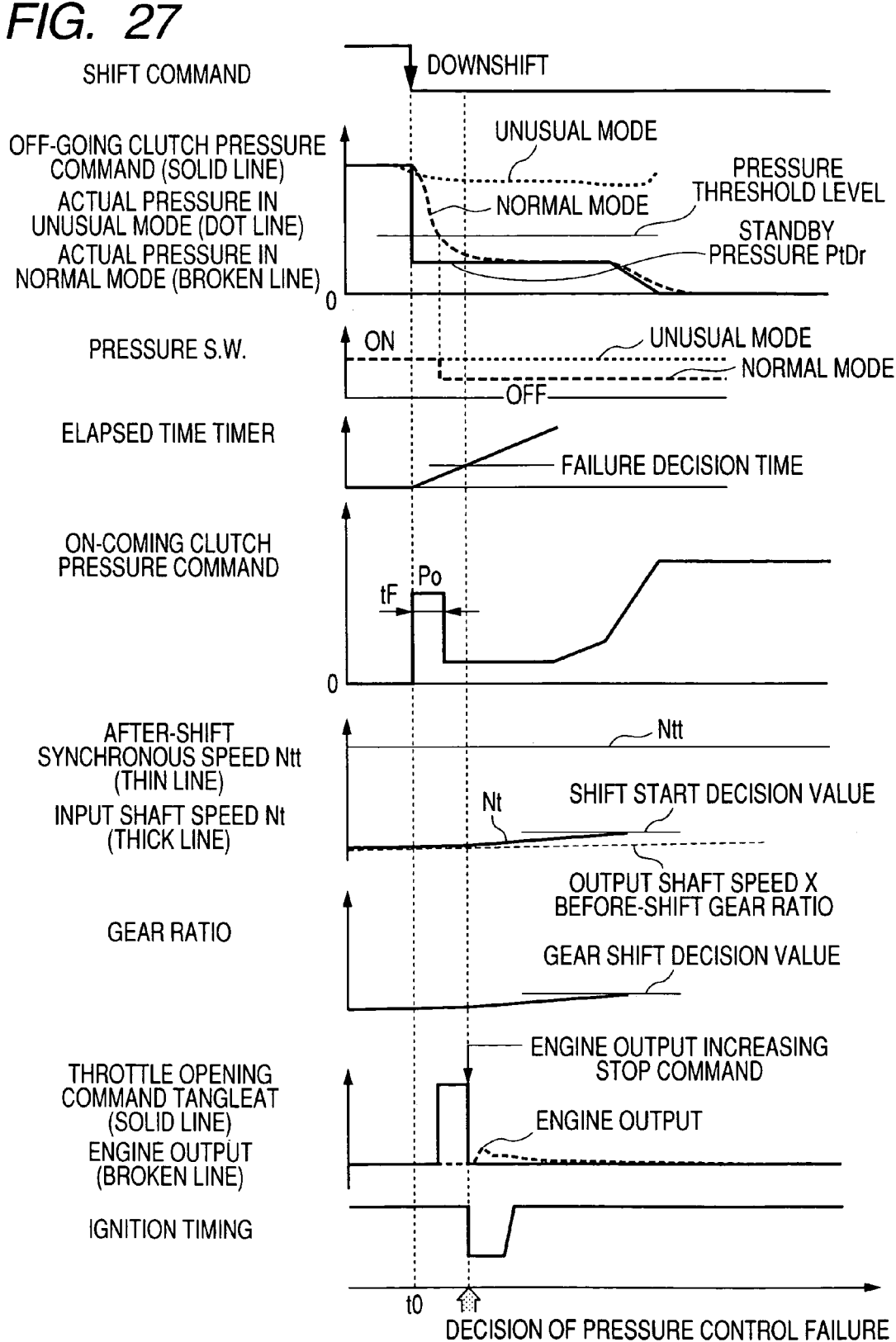
FIG. 27 is a timechart which demonstrates operations of an engine control system of the second embodiment of the invention when an ETC (Electronic Throttle Controlled) downshift operation has failed due to a defect in downshift hydraulic control.

The engine control system of the first embodiment is designed to decide that a failure has occurred in the hydraulic pressure control for the automatic transmission 51 if an actual downshift is not detected when the elapsed time from the start of hydraulic pressure control has reached the failure decision time slightly longer than an expected time at which the automatic transmission 51 will initiate the downshift actually and immediately stop the engine output increasing control. The engine control system of the second embodiment is equipped with a hydraulic switch working to detect the fact that the hydraulic pressure acting on the off-going clutch lies within a lower range defined around the standby hydraulic pressure and designed to measure the elapsed time from the start of the hydraulic pressure control for a downshift, decide that a failure has occurred in the hydraulic pressure control when a count of the timer has reached a failure decision time selected to be slightly longer than the time required by the hydraulic pressure on the off-going clutch to usually drop to within the lower range around the standby hydraulic pressure, but the hydraulic switch does not yet find the fact that the hydraulic pressure falls within the lower range, and immediately inhibit the engine output increasing control. The hydraulic switch is designed to be turned off when the hydraulic pressure exerted on the off-going clutch has dropped below a level slightly higher than the standby hydraulic pressure. FIG. 27 demonstrates an operation of the engine control system of the second embodiment.

The engine control system of the second embodiment is designed to execute a hydraulic pressure control defect detection program instead of the one of FIG. 15.

Figure 28:
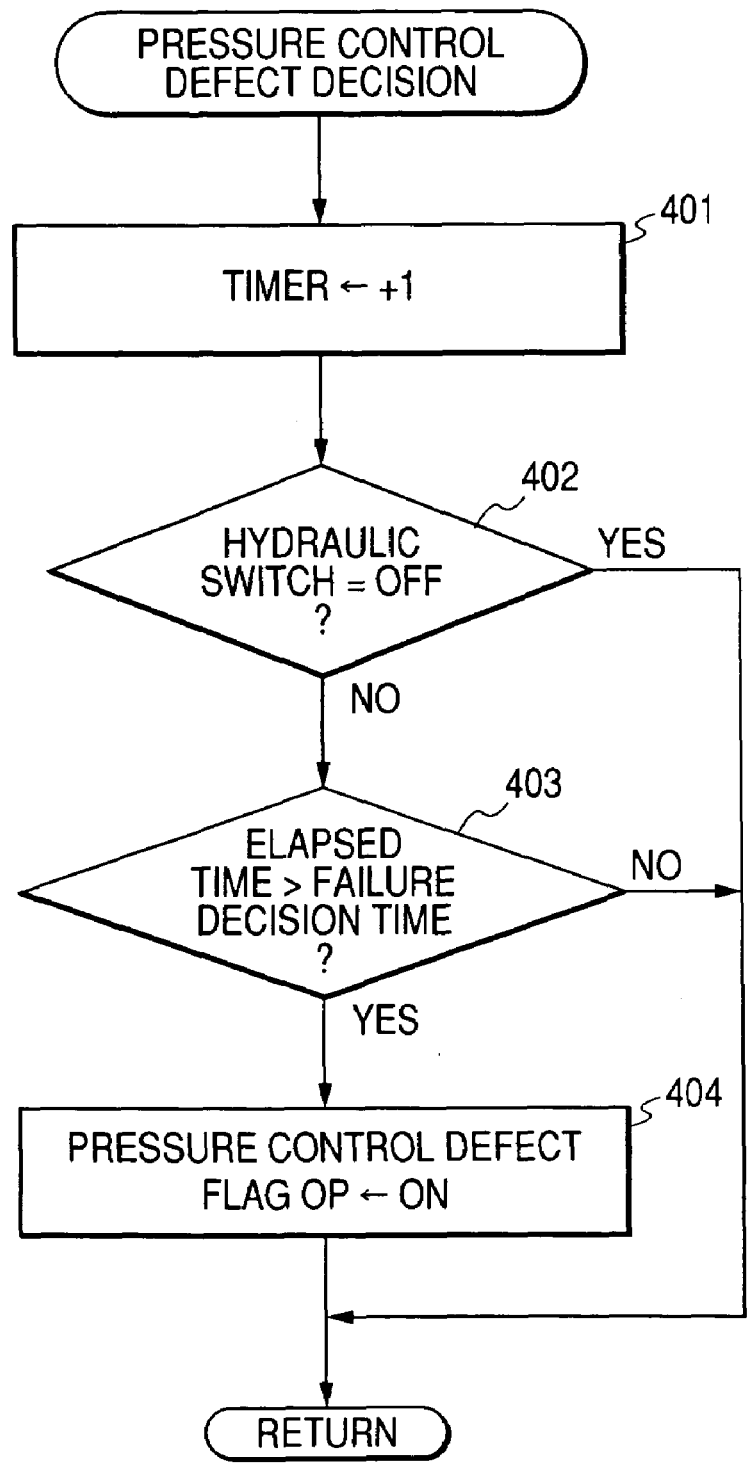
FIG. 28 is a flowchart of a hydraulic control defect decision program for an automatic transmission in the second embodiment of the invention.

First, in step 401 of FIG. 28, the timer is activated to count up the elapsed time from the start of the downshift hydraulic pressure control, i.e., since a downshift request arise.

The routine proceeds to step 402 wherein it is determined whether the hydraulic switch is turned off or not, that is, whether the hydraulic pressure acting on the off-going clutch has dropped to within the lower range near the standby hydraulic pressure or not. If a YES answer is obtained, then the routine terminates. Alternatively, if a NO answer is obtained, then the routine proceeds to step 403 wherein it is determined whether the elapsed time, as measured by the timer instep 401, has exceeded the failure decision time set slightly longer than an expected time at which the automatic transmission 51 will make the gear shift actually or not. If a NO answer is obtained, then the routine terminates. Alternatively, if a YES answer is obtained meaning that the hydraulic switch is not yet turned off, but the elapsed time has exceeded the failure decision time, then the routine proceeds to step 404 wherein the pressure control failure flag OP is set to ON indicating the occurrence of failure in the hydraulic pressure control for the automatic transmission 51.

The engine control system of the third embodiment will be described below.

Figure 29:
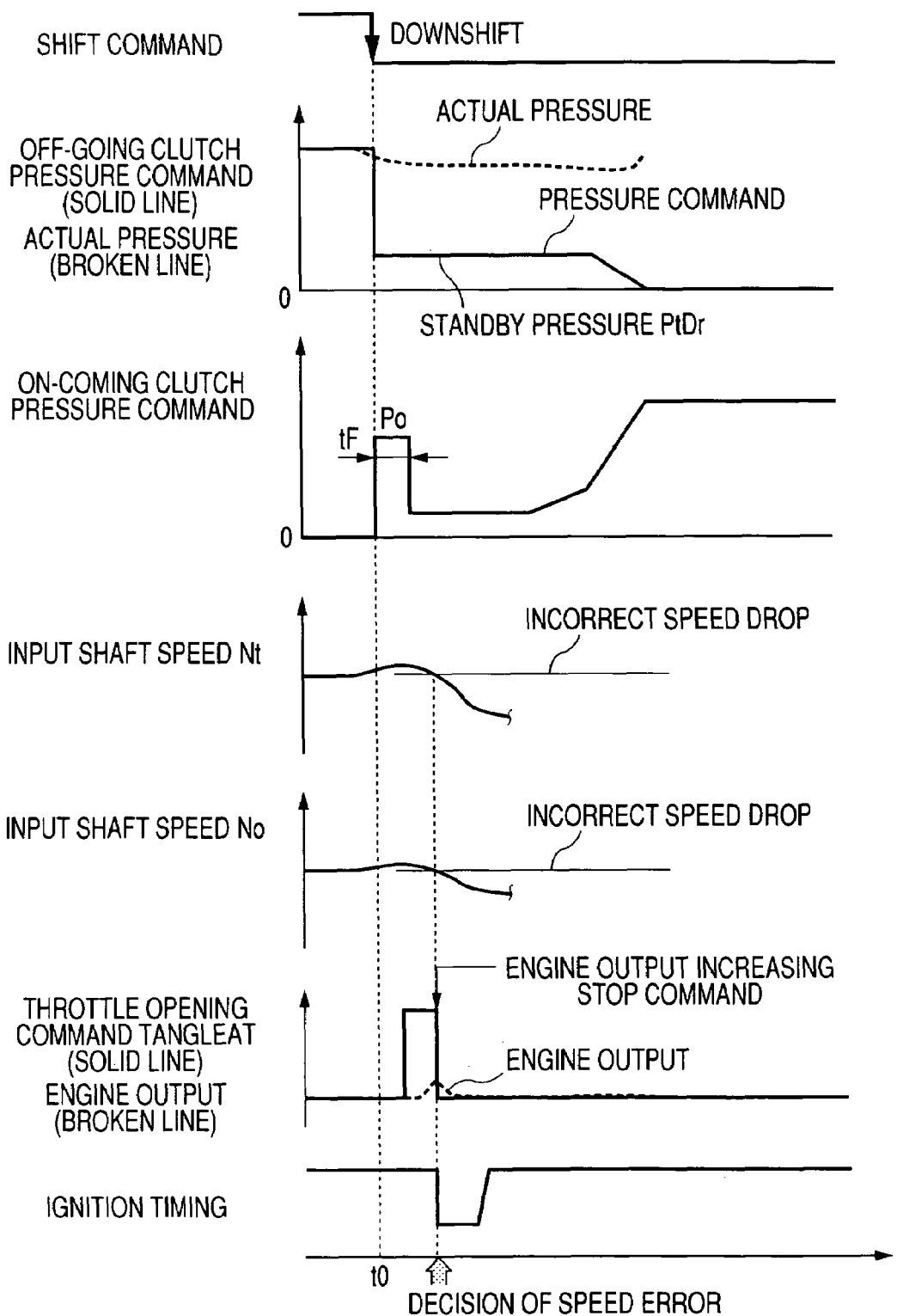
FIG. 29 is a timechart which demonstrates operations of an engine control system of the third embodiment of the invention upon an ETC downshift of an automatic transmission when the automatic transmission has failed in rotation thereof.

If the hydraulic pressure acting on the off-going clutch fails to drop to within the lower range after the start of the hydraulic pressure control to make a downshift in the automatic transmission 51, it may result in an interlocking in which the hydraulic pressure applied to the off-going clutch fails to drop, and that applied to on-coming clutch arises, so that they are engaged simultaneously. If such an interlocking is taken place upon downshifting of the transmission gearbox 55, it will, as demonstrated in FIG. 29, result in a drop in the input shaft speed Nt or the output shaft speed No of the transmission gearbox 55 due to deceleration of the vehicle.

The engine control system of the third embodiment is designed to inhibit the engine output increasing control using the above event. Specifically, the engine control system works to decide that the interlocking between the on-coming and off-going clutches when the input shaft speed Nt (or the output shaft speed No) of the transmission gearbox 55 has dropped by a stated incorrect speed drop amount ΔNth or more after the start of the downshift hydraulic pressure control and immediately inhibit the engine output increasing control.

Figure 30:
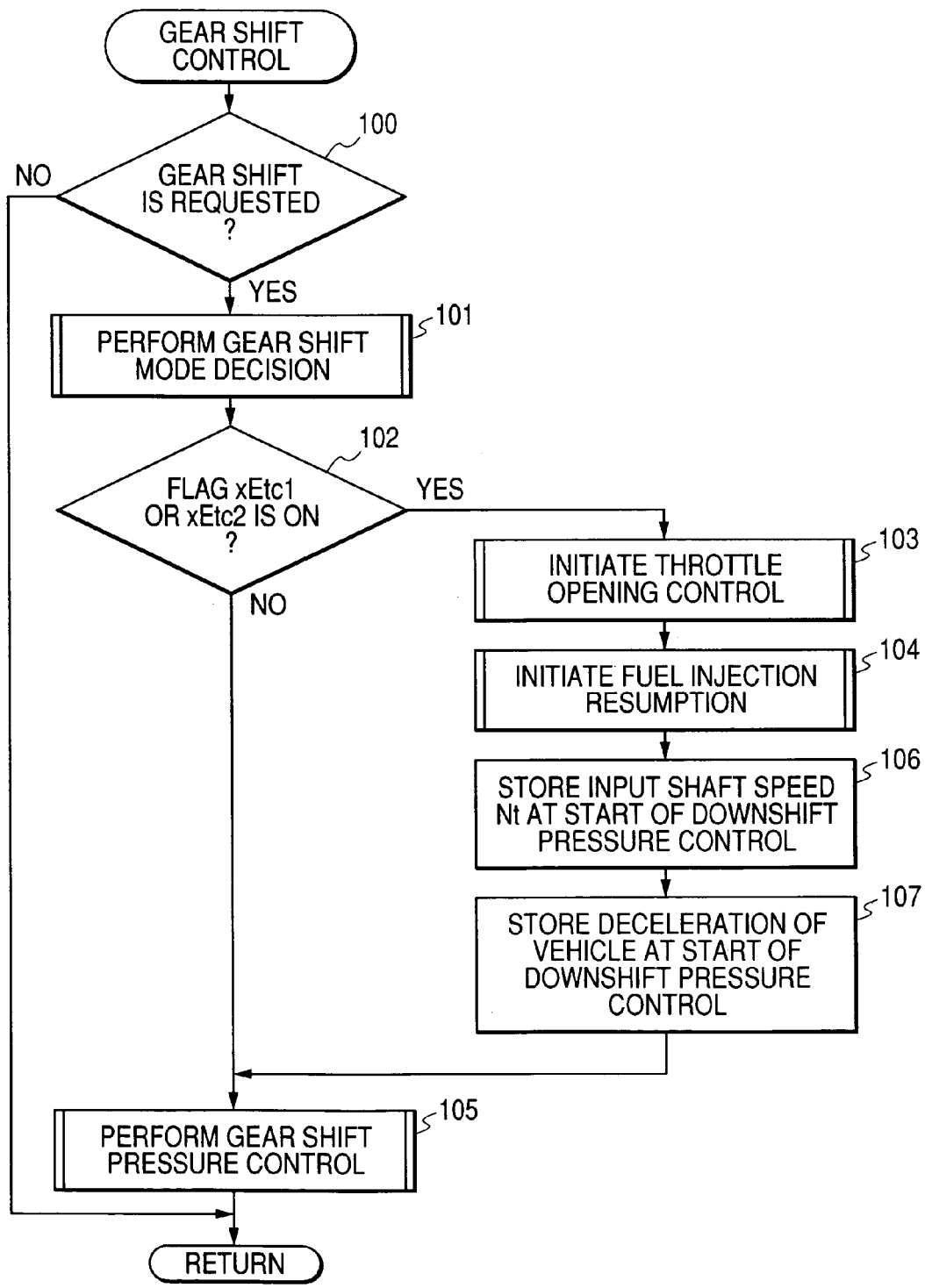
FIG. 30 is a flowchart of a gear shifting program for an automatic transmission to be executed by an engine control system of the third embodiment of the invention.
Figure 31:
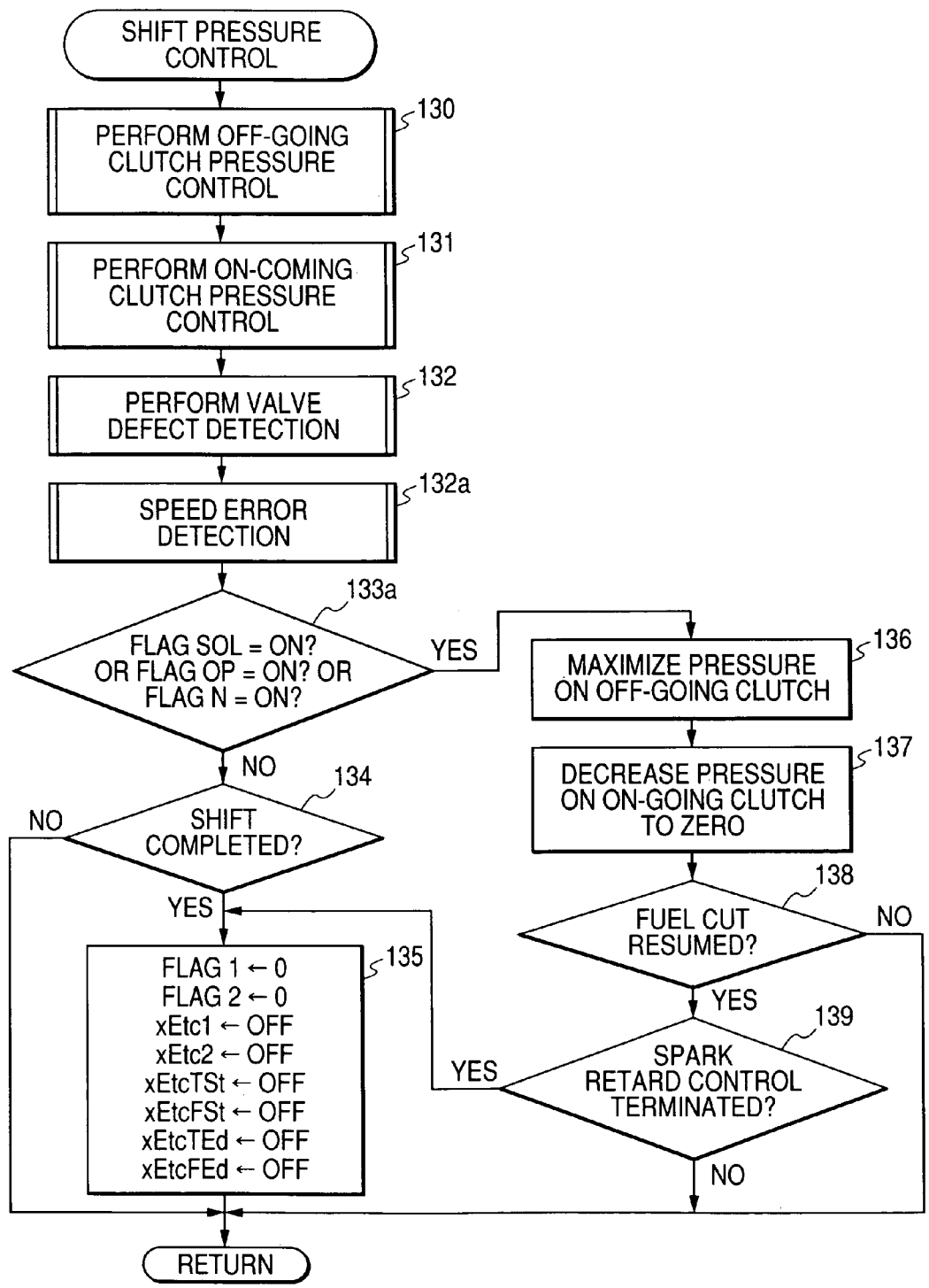
FIG. 31 is a flowchart of a hydraulic pressure control program to be executed by an engine control system of the third embodiment of the invention.
Figure 32:
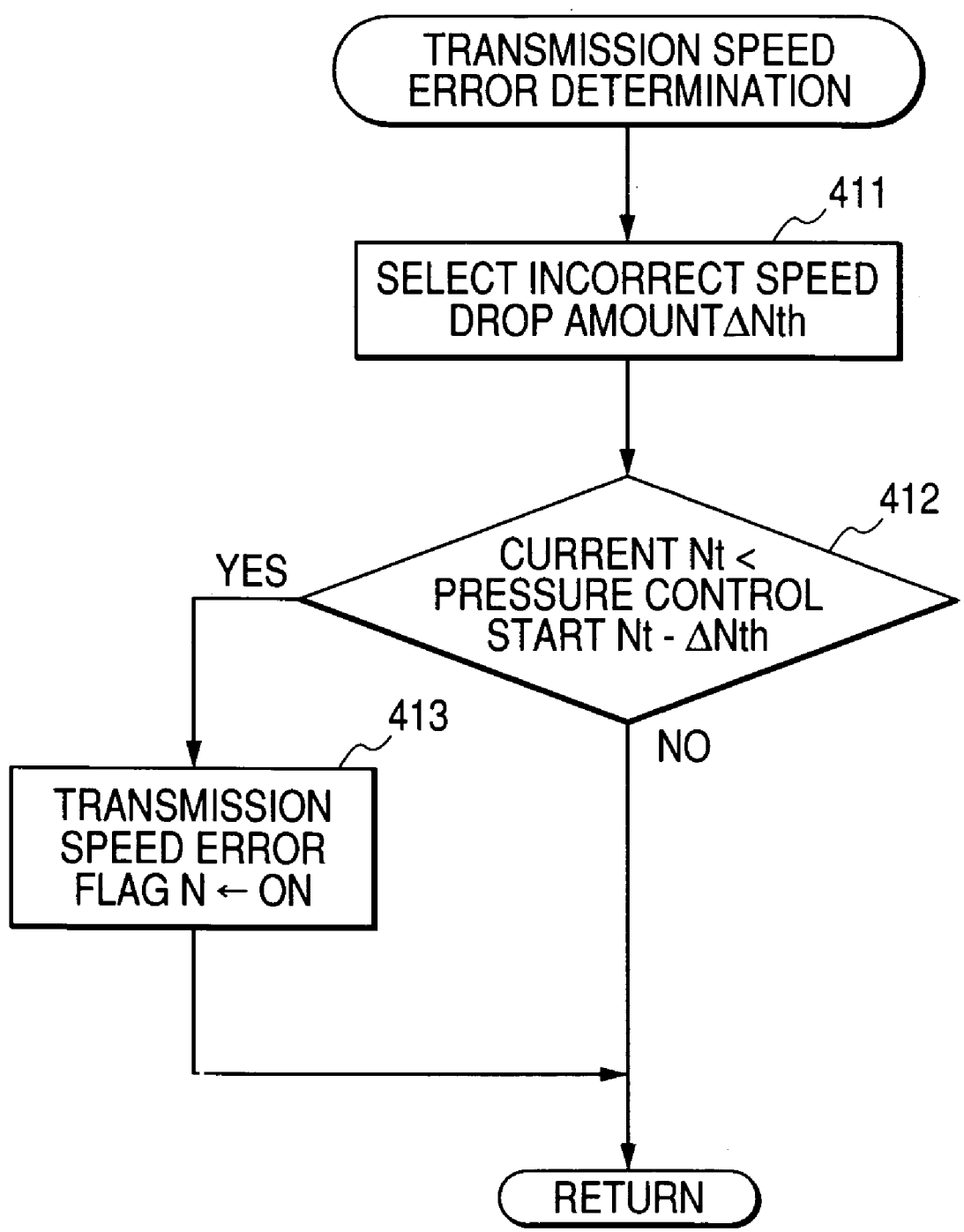
FIG. 32 is a flowchart of a transmission speed error determination program to be executed by an engine control system of the third embodiment of the invention.

The engine control system is designed to execute a gear shift control program, as illustrated in FIG. 30, a gear shift hydraulic control program, as illustrated in FIG. 31, and a transmission speed error decision program, as illustrated in FIG. 32.

The gear shift control program of FIG. 30 is a modification of the one of FIG. 10 and has additional steps 106 and 107 to be executed between steps 104 and 105. Other steps are identical in operation with those in FIG. 10, and explanation thereof in detail will be omitted here.

After the fuel injection resumption control in step 104 in the ETC downshift mode, the routine proceeds to step 106 wherein the input shaft speed Nt at the start of the downshift hydraulic pressure control is measured by the input shaft speed sensor 68 and stored in a RAM.

The routine proceeds to step 107 wherein a deceleration of the vehicle at the start of the downshift hydraulic pressure control is stored in the RAM. The routine proceeds to step 105 wherein the gear shift hydraulic pressure control in the gear shift mode, as determined in step 101, is executed to shift the gear of the automatic transmission 51 to that, as requested by the gear shift command. The routine then terminates.

The gear shift hydraulic control program of FIG. 31 is a modification of the one of FIG. 12 and executes a sequence of steps 132a and 133a after step 132. Other steps are identical with those in FIG. 12, and explanation thereof in detail will be omitted here.

After the valve defect detection, as discussed in FIG. 13, is performed in step 132, the routine proceeds to step 132a wherein the transmission speed error decision program, as illustrated in FIG. 32, is executed. The routine proceeds to step 133a wherein it is determined whether the valve defect flag SOL indicating the presence of a defect in any of the hydraulic pressure control valves 90 such as a wire disconnection in the solenoids 81, the pressure control defect flag OP indicating the presence of a defect in the hydraulic pressure control by the hydraulic control circuit 57, or a transmission speed error flag N is ON or not. If a NO answer is obtained meaning that the automatic transmission 51 is operating properly, then the routine proceeds to step 134 wherein it is determined whether the downshift has been completed or not. Alternatively, if a YES answer is obtained meaning that the automatic transmission 51 has failed in operation, so that it is impossible to make a downshift properly, then the routine proceeds to step 136 wherein the hydraulic pressure to be supplied to the off-going clutch is maximized. The routine then proceeds to step 137 wherein the hydraulic pressure to be supplied to the on-coming clutch is decreased to zero (0) to inhibit the downshift.

The transmission speed error decision program of FIG. 32 is, as described above, to be executed in step 132a.

Figure 33:
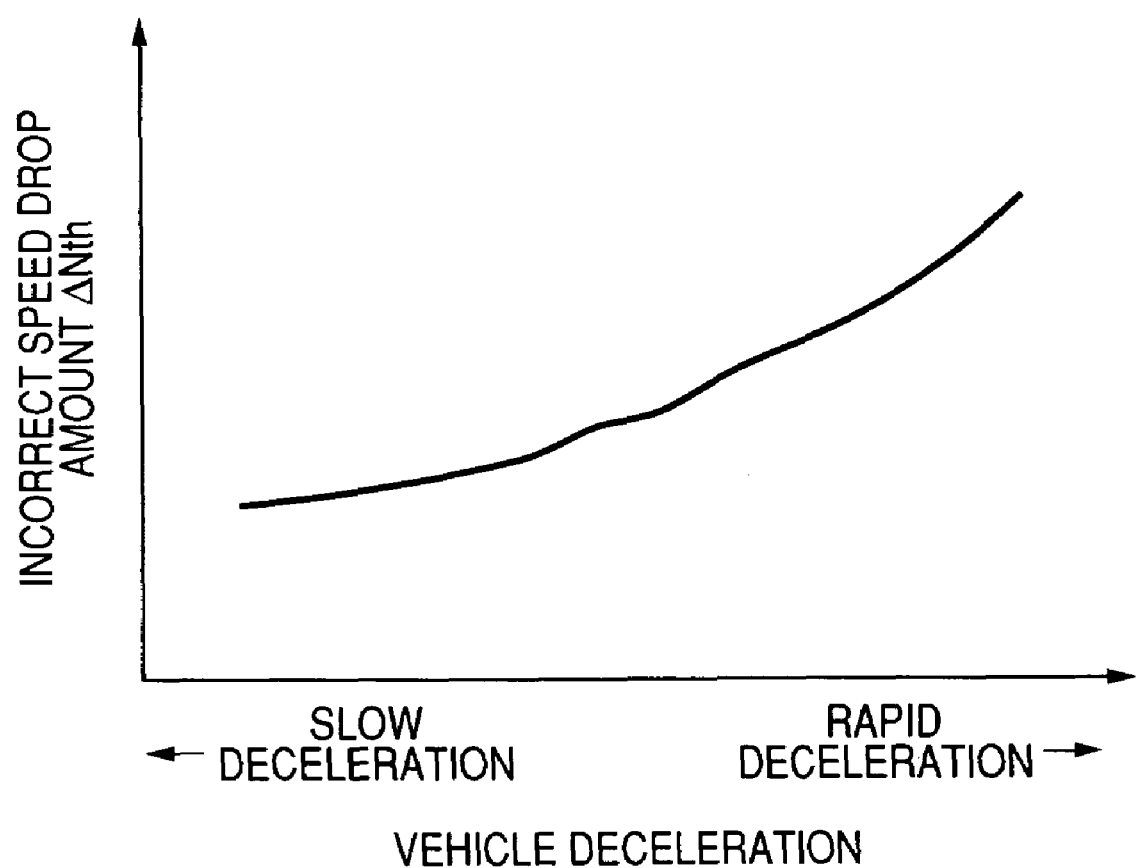
FIG. 33 is a map used to determine an incorrect speed drop amount in a downshift control of the third embodiment of the invention.

First, in step 411, the incorrect speed drop amount Δ Nth is selected from a map, as shown in FIG. 33, as a function of deceleration of the vehicle upon initiation of the downshift hydraulic pressure control. This is because usually an amount by which each of the input shaft speed Nt and the output shaft speed No drops in the event of the interlocking between the on-coming and off-going clutches depends upon the deceleration of the vehicle, and the accuracy in determining the occurrence of error of the speed of the automatic transmission 51 is increased by selecting the incorrect speed drop amount ΔNth as a function of the deceleration of the vehicle at the start of the downshift hydraulic pressure control.

The routine proceeds to step 412 wherein it is determined whether a current value of the input shaft speed Nt is lower than a value of the input shaft speed Nt upon initiation of the downshift hydraulic pressure control by the incorrect speed drop amount Δ Nth or more or not. If a YES answer is obtained, then the routine proceeds to step 413 wherein the transmission speed error flag N is set to ON indicating the occurrence of interlocking between the on-coming and off-going clutches of the automatic transmission 51. The routine then terminates. Alternatively, if a NO answer is obtained in step 412 meaning that the speed of the automatic transmission 51 is correct, then the routine terminates.

In step 412, a determination may alternatively be made as to whether a current value of the output shaft speed No is lower than a value of the output shaft speed No upon initiation of the downshift hydraulic pressure control by the incorrect speed drop amount Δ Nth or more or not.

The engine control system of the fourth embodiment will be described below.

Figure 34:
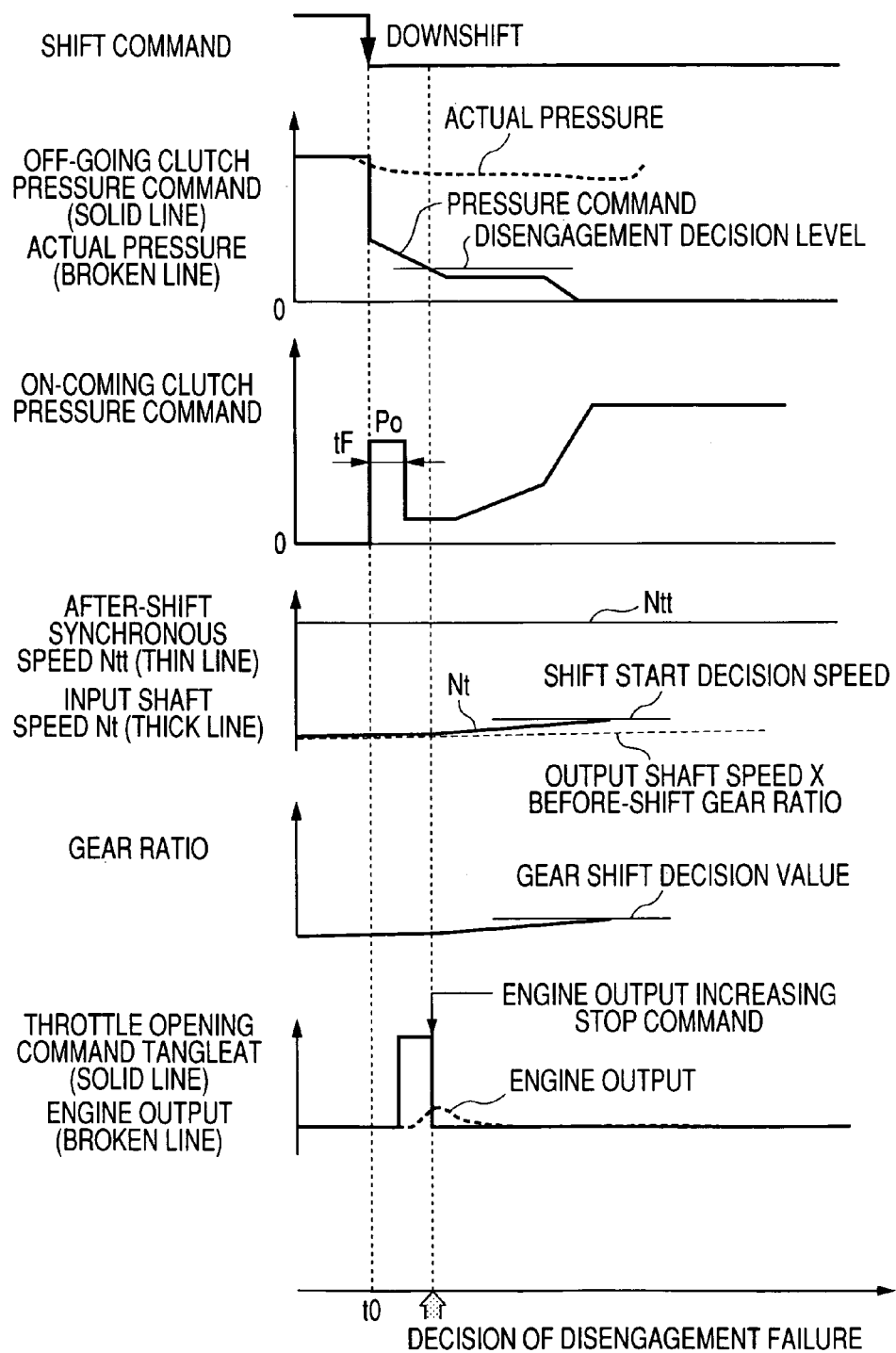
FIG. 34 is a timechart which demonstrates operations of an engine control system of the fourth embodiment of the invention in ETC downshift control when clutches of an automatic transmission have failed in operation.

The engine control system of the first embodiment is, as described above, designed to decide that a failure has occurred in the hydraulic pressure control for the automatic transmission 51 if an actual downshift is not detected when the elapsed time from the start of hydraulic pressure control has reached the failure decision time slightly longer than an expected time at which the automatic transmission 51 will launch the downshift actually and immediately stop the engine output increasing control. The engine control system of the fourth embodiment is, as can be seen from FIG. 34, designed to decide that the off-going clutch has failed to be engaged when the hydraulic pressure command for the off-going clutch has fallen within a range (less than a disengagement decision level) which is low enough to decrease the torque transfer capacity of the off-going clutch to zero (0) after the start of the downshift hydraulic pressure control, but an actual downshift is not found and immediately inhibit the downshift hydraulic pressure control. The determination of whether the actual downshift has been launched or not may be made in the same manner as described in the first embodiment.

Figure 35:
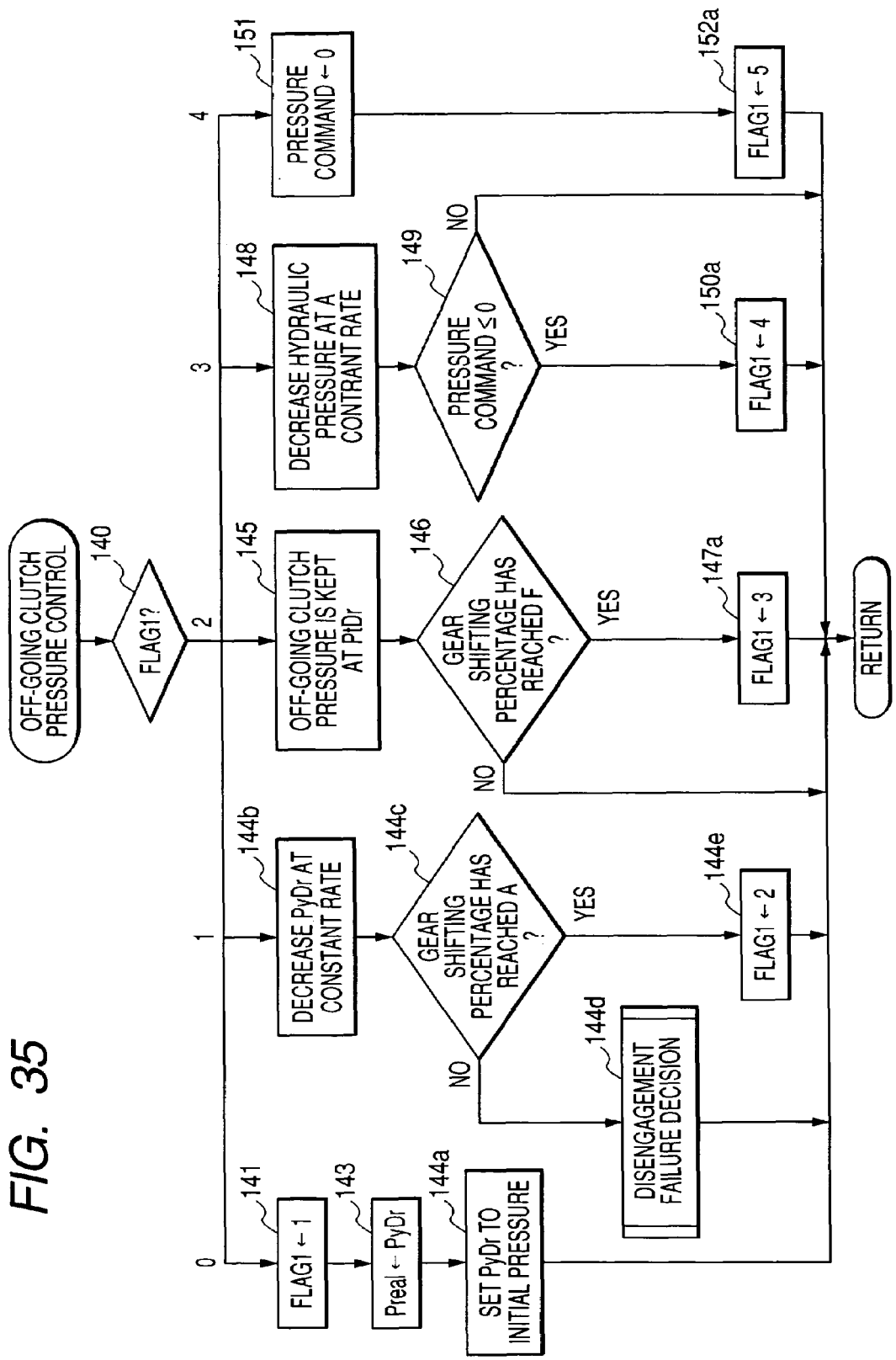
FIG. 35 is a flowchart of an off-going clutch control program for an automatic transmission to be executed by an engine control system of the fourth embodiment of the invention.
Figure 36:
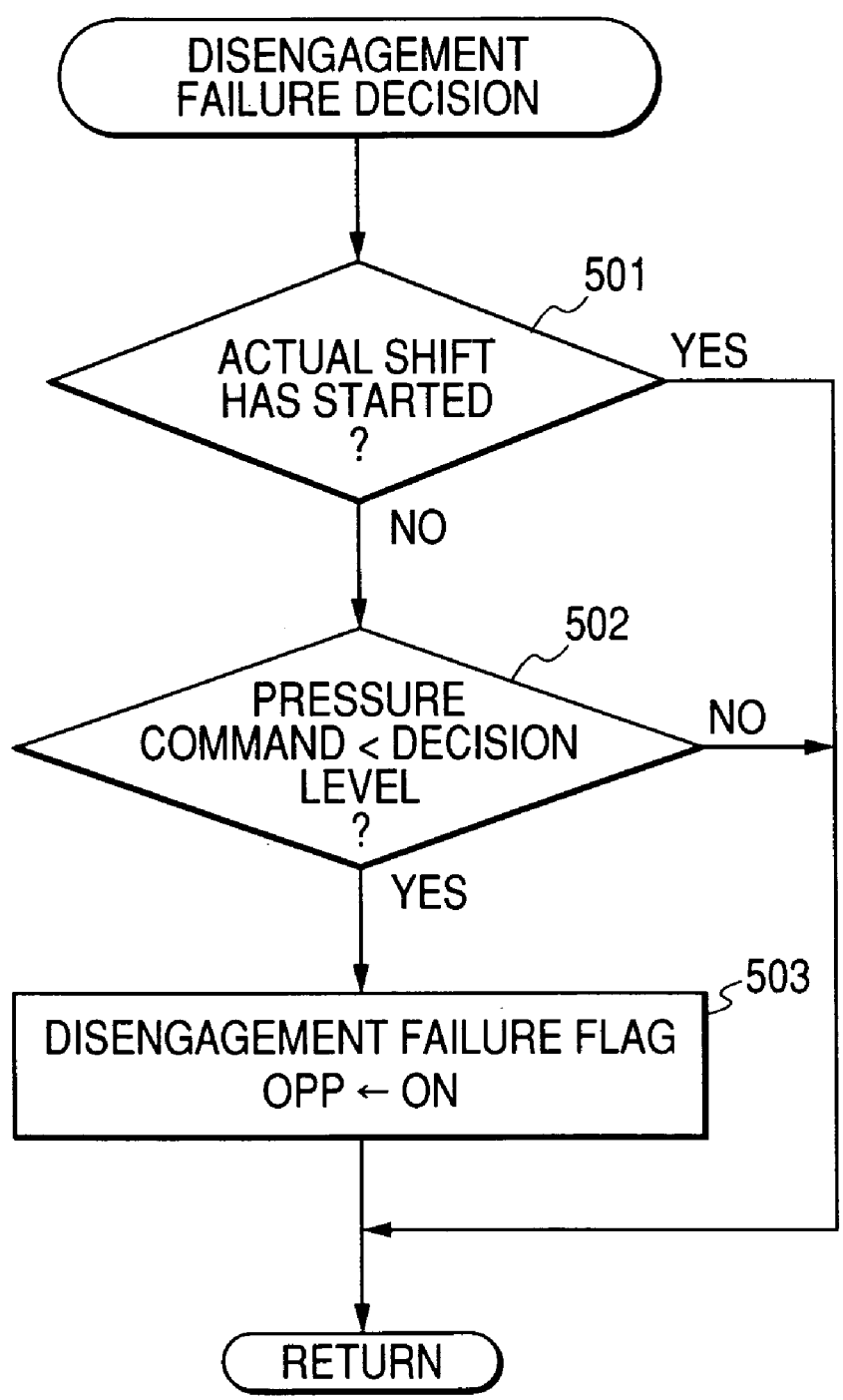
FIG. 36 is a flowchart of a clutch disengagement failure decision program to be executed by an engine control system of the fourth embodiment of the invention.

The engine control system of this embodiment is designed to an off-going clutch pressure control program, as illustrated in FIG. 35 and a disengagement failure decision program, as illustrated in FIG. 36. The off-going clutch pressure control program is to be executed in place of the one of FIG. 14. Other operations are identical with those in the first embodiment.

After entering the program of FIG. 35, the routine proceeds to step 140 wherein it is determined which of 0, 1, 2, 3, and 4 the control step flag Flag1 indicates to find a current step of hydraulic pressure control for the off-going clutch of the automatic transmission 51. Specifically, the AT-ECU 70 is designed to control the hydraulic pressure to be supplied to the off-going clutch in a sequence of five control steps. The control step flag Flag1 is incremented by one (1) each time the control step proceeds to the next one. The control step flag Flag1 changes from an initial value of zero (0) to five (5) representing the final control step.

For example, at time t0 when the hydraulic pressure control for the off-going clutch starts, the control step flag Flag1 is placed at the initial value of zero (0). The routine, thus, proceeds to step 141 wherein the control step flag Flag1 is set to one (1). The routine proceeds to step 143 wherein an initial value of the actual pressure estimate Preal for the off-going clutch (y) which is going to be disengaged at the current ETC downshift is updated to the hydraulic pressure command value PyDr for the off-going clutch (y). The routine proceeds to step 144a wherein the hydraulic pressure command value PyDr is set to an initial pressure to decrease the hydraulic pressure to be supplied to the off-going clutch to the initial pressure (i.e., the first control step).

Upon subsequent initiation of this program, the routine proceeds from step 140 to step 144b since the control step flag Flag1 is already set to one (1). In step 144b, the hydraulic pressure command value PyDr is decreased at a stated constant rate. The routine proceeds to step 144c wherein it is determined whether the gear shifting percentage SftR has reached a stated value A or not. If a NO answer is obtained, then the routine proceed to step 144d wherein the disengagement failure decision program of FIG. 36 is executed to diagnose the off-going clutch. Alternatively, if a YES answer is obtained, then the routine proceeds to step 144e wherein the control step flag Flag1 is set to two (2) to terminate the second step of the hydraulic pressure control for the off-going clutch.

Upon subsequent initiation of this program, the routine proceeds from step 140 to step 145 since the control step flag Flag1 is already set to one (1). In step 145, the hydraulic pressure acting on the off-going clutch is kept at the standby hydraulic pressure PtDr. The routine proceeds to step 146 wherein it is determined whether the gear shifting percentage SftR has reached to a stated value F defined near 100% or not. If a NO answer is obtained, the third step of the hydraulic pressure control continues to maintain the standby hydraulic pressure PtDr until the gear shifting percentage SftR reaches the value F.

Alternatively, if a YES answer is obtained in step 146 meaning that the gear shifting percentage SftR has reached to the stated value F, then the routine proceeds to step 147a wherein the control step flag Flag1 is set to three (3) to terminate the third step of the hydraulic pressure control for the off-going clutch.

Upon subsequent initiation of this program, the routine proceeds from step 140 to step 148 wherein the hydraulic pressure command value for the off-going clutch is decreased at a constant rate. The routine proceeds to step 149 wherein it is determined whether the hydraulic pressure command value has decreased below zero (0) or not. The fourth step of the hydraulic pressure control continues until the hydraulic pressure command value is below zero (0). If a YES answer is obtained, then the routine proceeds to step 150a wherein the control step flag Flag1 is set to four (4) to terminate the fourth step of the hydraulic pressure control for the off-going clutch.

Upon subsequent initiation of this program, the routine proceeds from step 140 to step 151 wherein the hydraulic pressure command value is set to zero (0) to disengage the off-going clutch fully. The routine proceeds to step 152a wherein the control step flag Flag1 is set to five (5) to terminate the hydraulic pressure control for the off-going clutch.

The disengagement failure decision program of FIG. 36 is to be executed in step 144d of FIG. 35.

First, in step 501, wherein it is determined whether an actual gear shift has started in the transmission gearbox 55 or not by, as described above, determining whether the gear ratio (Nt/No) has started to change to that upon completion of the gear shift or whether the input shaft speed Nt of the transmission gearbox 55 has exceeded a stated decision speed lightly greater than the product of the output shaft speed No and the gear ratio at the speed before the gear shift.

If a YES answer is obtained meaning that the transmission gearbox 55 has started to make the gear shift actually, then the routine terminates. Alternatively, if a NO answer is obtained, then the routine proceeds to step 502 wherein it is determined whether the hydraulic pressure command value has dropped below the disengagement decision level or not.

If a NO answer is obtained meaning that the actual downshift is not yet found, but the hydraulic pressure command value has decreased below the disengagement decision level, then the routine terminates. Alternatively, if a YES answer is obtained, then the routine proceeds to step 503 wherein a disengagement failure flag OPP is set to ON indicating the occurrence of failure in disengaging the off-going clutch.

Figure 37:
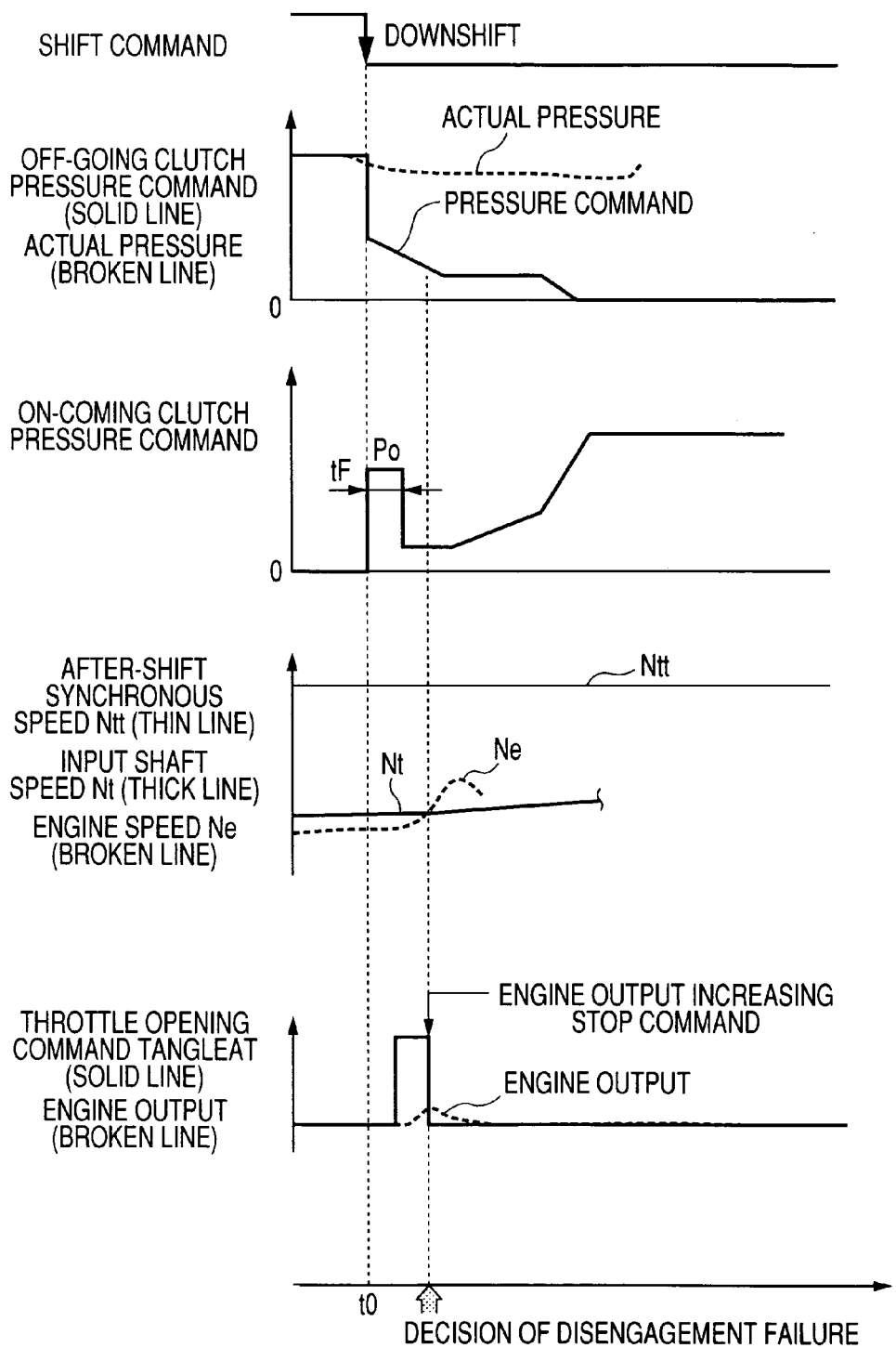
FIG. 37 is a timechart which demonstrates operations of an engine control system of the fifth embodiment of the invention in ETC downshift control when clutches of an automatic transmission have failed to be disengaged.

The engine control system of the fifth embodiment will be described below whose operation is demonstrated in FIG. 37.

The engine control system is designed to inhibit the engine output increasing control when the fact that the torque converter 52 has switched in rotation from a reverse direction which develops the engine braking to a normal direction where engine torque is transmitted to wheels of the vehicle is detected before the transmission gearbox 55 starts to make a downshift actually following initiation of the downshift hydraulic pressure control. Specifically, the fact that the torque converter 52 has switched in rotation to the normal direction to accelerate the vehicle through the engine torque during the downshift hydraulic pressure control performed to provide the engine braking means that the automatic transmission 51 is placed in an unusual state to accelerate the vehicle under the engine output increasing control. The engine control system is, therefore, designed to inhibit the engine output increasing control upon detection of switching of the rotation of the torque converter 52 to the normal direction, thereby avoiding undesirable acceleration of the vehicle arising from a failure in operation of the hydraulic control circuit 50 during the downshift control.

Figure 38:
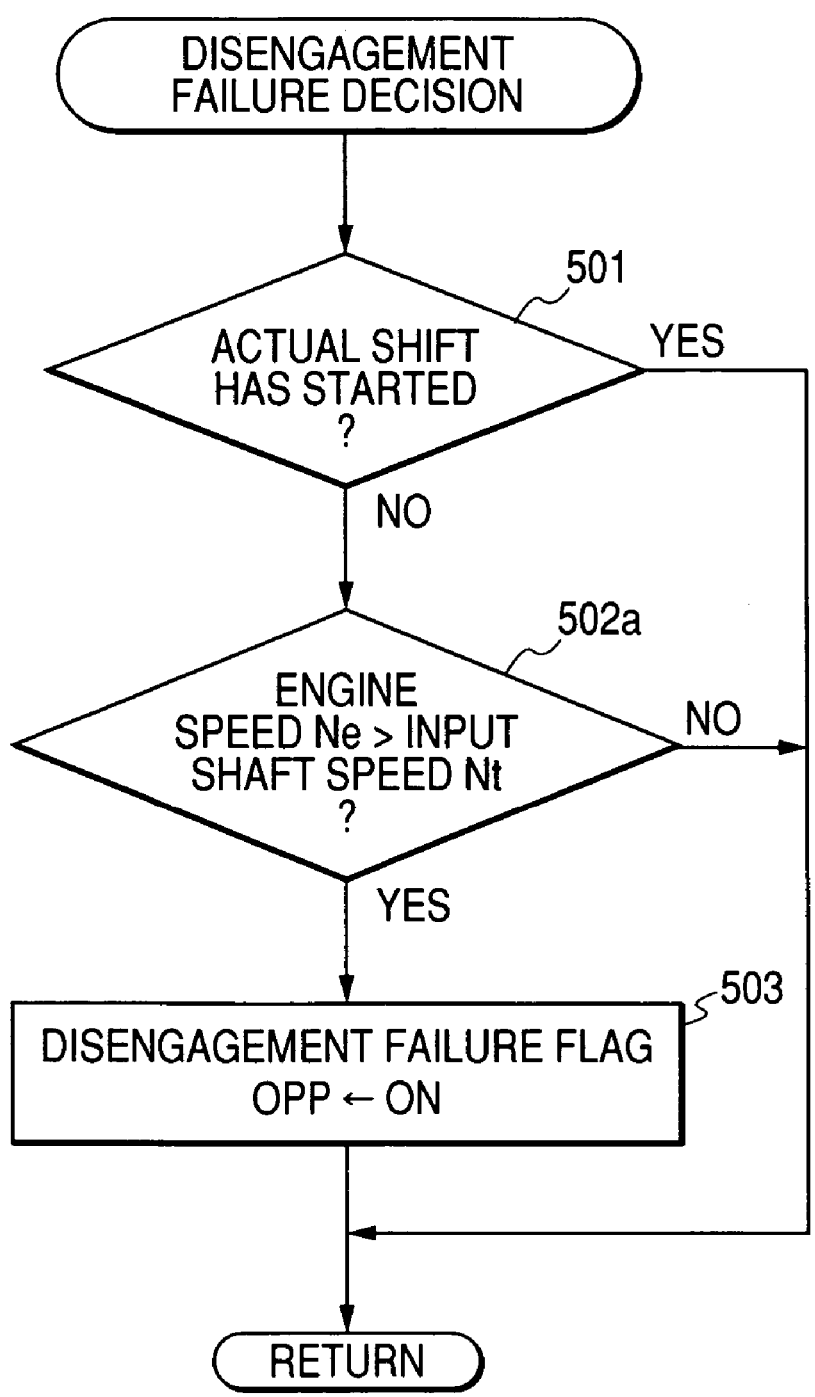
FIG. 38 is a flowchart of a disengagement failure decision program to be executed by an engine control system of the fifth embodiment of the invention.

The direction of rotation of the torque converter 52 in which the torque is transmitted may be determined by a comparison between the engine speed Ne and the input shaft speed Nt of the transmission gearbox 55. The engine control system of this embodiment is designed to execute a disengagement failure decision program, as illustrated in FIG. 38, which is different from the one of FIG. 36 only in step 502*a*.

Specifically, in step 502*a*, it is determined whether the engine speed Ne, as measured by the crank angle sensor 24, is greater than the input shaft speed Nt of the transmission gearbox 55, as measured by the input shaft speed sensor 68, or not before the transmission gearbox 55 starts to make a downshift actually. If a NO answer is obtained, then the routine terminates. Alternatively, if a YES answer is obtained, then the routine proceeds to step 503 wherein the disengagement failure flag OPP is set to ON indicating the occurrence of failure in disengaging the off-going clutch. Other operations are identical with those in the fourth embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

For instance, the engine output increasing control in each of the first to fifth embodiments is achieved by a combination of the throttle opening control and the fuel injection resumption control, but however, may also be achieved by using additional control such as fuel increasing control and/or spark retard control. The engine output increasing control may alternatively accomplished only by a combination of the fuel increasing control and the spark retard control. The engine control system may also be used with diesel engines.

What is claimed is:

1. An automatic transmission control apparatus comprising:
    a hydraulic control circuit which controls hydraulic pressures to be applied to a plurality of frictional elements of an automatic transmission joined to an engine to selectively achieve engagement and disengagement of the frictional elements for establishing a required speed of the automatic transmission;
    a defect detector working to detect a defect of said hydraulic control circuit;
    an engine output increasing circuit designed to perform engine output increasing control to increase an output of the engine upon a downshift of the automatic transmission to develop engine braking in response to a request from an operator to decelerate a speed of the automatic transmission, said engine output increasing circuit initiating the engine output increasing control within an interval between start to control the hydraulic pressures through said hydraulic control circuit to achieve the downshift and start of an actual shift in speed of the automatic transmission; and
    a fail-safe circuit working to stop the engine output increasing control when said defect detector detects the defect of said hydraulic control circuit after said hydraulic control circuit starts to control the hydraulic pressures to achieve the downshift of the automatic transmission.

2. An automatic transmission control apparatus as set forth in claim 1, wherein said hydraulic control circuit includes a solenoid-operated hydraulic control valve working to control the hydraulic pressures to be supplied to the frictional elements of the automatic transmission, and wherein said defect detector works to detect a defect of one of a solenoid of the hydraulic control valve and a circuit line leading to the hydraulic control valve.

3. An automatic transmission control apparatus as set forth in claim 1, wherein the automatic transmission control apparatus is designed to be installed in a vehicle equipped with an electronic throttle system working to operate a throttle valve for the engine through an electronic actuator, wherein said engine output increasing circuit is designed to control an amount of opening of the throttle valve to achieve the engine output increasing control, and wherein said fail-safe circuit works to close the throttle valve to stop the engine output increasing control.

4. An automatic transmission control apparatus as set forth in claim 1, wherein said fail-safe circuit works to establish a fuel cut in the engine to stop the engine output increasing control.

5. An automatic transmission control apparatus as set forth in claim 1, wherein said fail-safe circuit works to correct an amount of retard of ignition timing in the engine to stop the engine output increasing control.

6. An automatic transmission control apparatus comprising:
    a hydraulic control circuit which controls hydraulic pressures to be applied to a plurality of frictional elements of an automatic transmission joined to an engine to selectively achieve engagement and disengagement of the frictional elements for establishing a required speed of the automatic transmission;
    a gear shift detecting circuit working to detect start of an actual gear shift of the automatic transmission;

an engine output increasing circuit designed to perform engine output increasing control to increase an output of the engine upon a downshift of the automatic transmission to develop engine braking in response to a request from an operator to decelerate a speed of the automatic transmission, said engine output increasing circuit initiating the engine output increasing control within an interval between start to control the hydraulic pressures through said hydraulic control circuit to achieve the downshift and start of an actual shift in speed of the automatic transmission;

a timer working to measure an elapsed time from one of events where a request to make the downshift of the automatic transmission to develop the engine braking was outputted and where said hydraulic control circuit started to control the hydraulic pressures to achieve the downshift; and a fail-safe circuit working to stop the engine output increasing control when the elapsed time, as measured by said timer, has reached a time selected to be longer than that required to initiate an actual shift of the automatic transmission normally, and said gear shift detecting circuit does not yet detect the actual gear shift of the automatic transmission.

7. An automatic transmission control apparatus as set forth in claim 6, wherein when said gear shift detecting circuit detects a fact that a gear ratio that is a speed ratio of an input shaft to an output shaft of the automatic transmission has started to change to that upon completion of the downshift, said gear shift detecting circuit determines that the start of the actual gear shift of the automatic transmission has been detected.

8. An automatic transmission control apparatus as set forth in claim 6, wherein when said gear shift detecting circuit detects a fact that a speed of an input shaft of the automatic transmission exceeds a product of a speed of an output shaft and a gear ratio of the automatic transmission before the downshift, said gear shift detecting circuit determines that the start of the actual gear shift of the automatic transmission has been detected.

9. An automatic transmission control apparatus as set forth in claim 6, wherein the automatic transmission control apparatus is designed to be installed in a vehicle equipped with an electronic throttle system working to operate a throttle valve for the engine through an electronic actuator, wherein said engine output increasing circuit is designed to control an amount of opening of the throttle valve to achieve the engine output increasing control, and wherein said fail-safe circuit works to close the throttle valve to stop the engine output increasing control.

10. An automatic transmission control apparatus as set forth in claim 6, wherein said fail-safe circuit works to establish a fuel cut in the engine to stop the engine output increasing control.

11. An automatic transmission control apparatus as set forth in claim 6, wherein said fail-safe circuit works to correct an amount of retard of ignition timing in the engine to stop the engine output increasing control.

12. An automatic transmission control apparatus comprising:

a hydraulic control circuit which is responsive to a hydraulic pressure command to control hydraulic pressures to be applied to a plurality of frictional elements of an automatic transmission joined to an engine to selectively achieve engagement and disengagement of the frictional elements for establishing a required speed of the automatic transmission;

a gear shift detecting circuit working to detect start of an actual gear shift of the automatic transmission;

an engine output increasing circuit designed to perform engine output increasing control to increase an output of the engine upon a downshift of the automatic transmission to develop engine braking in response to a request from an operator to decelerate a speed of the automatic transmission, said engine output increasing circuit initiating the engine output increasing control within an interval between start to control the hydraulic pressures through said hydraulic control circuit to achieve the downshift and start of an actual shift in speed of the automatic transmission; and a fail-safe circuit working to stop the engine output increasing control when a value of the hydraulic pressure command indicative of a value of the hydraulic pressure to be supplied to an off-going one of the frictional elements of the automatic transmission which is to be disengaged has dropped to within a pressure range low enough to eliminate a torque transfer capacity of the off-going one of the frictional elements, and said gear shift detecting circuit does not yet detect the actual gear shift of the automatic transmission.

13. An automatic transmission control apparatus as set forth in claim 12, wherein when said gear shift detecting circuit detects a fact that a gear ratio that is a speed ratio of an input shaft to an output shaft of the automatic transmission has started to change to that upon completion of the downshift, said gear shift detecting circuit determines that the start of the actual gear shift of the automatic transmission has been detected.

14. An automatic transmission control apparatus as set forth in claim 12, wherein when said gear shift detecting circuit detects a fact that a speed of an input shaft of the automatic transmission exceeds a product of a speed of an output shaft and a gear ratio of the automatic transmission before the downshift, said gear shift detecting circuit determines that the start of the actual gear shift of the automatic transmission has been detected.

15. An automatic transmission control apparatus as set forth in claim 12, wherein the automatic transmission control apparatus is designed to be installed in a vehicle equipped with an electronic throttle system working to operate a throttle valve for the engine through an electronic actuator, wherein said engine output increasing circuit is designed to control an amount of opening of the throttle valve to achieve the engine output increasing control, and wherein said fail-safe circuit works to close the throttle valve to stop the engine output increasing control.

16. An automatic transmission control apparatus as set forth in claim 12, wherein said fail-safe circuit works to establish a fuel cut in the engine to stop the engine output increasing control.

17. An automatic transmission control apparatus as set forth in claim 12, wherein said fail-safe circuit works to correct an amount of retard of ignition timing in the engine to stop the engine output increasing control.

18. An automatic transmission control apparatus comprising:

a hydraulic control circuit which controls hydraulic pressures to be applied to a plurality of frictional elements of an automatic transmission joined to an engine to selectively achieve engagement and disengagement of the frictional elements for establishing a required speed of the automatic transmission;

a hydraulic pressure detector working to detect a fact that the hydraulic pressure acting on an off-going one of the frictional elements of the automatic transmission which is to be disengaged lies within a given lower range;

an engine output increasing circuit designed to perform engine output increasing control to increase an output of the engine upon a downshift of the automatic transmission to develop engine braking in response to a request from an operator to decelerate a speed of the automatic transmission, said engine output increasing circuit initiating the engine output increasing control within an interval between start to control the hydraulic pressures through said hydraulic control circuit to achieve the downshift and start of an actual shift in speed of the automatic transmission;

a timer working to measure an elapsed time from one of events where a request to make the downshift of the automatic transmission to develop the engine braking was outputted and where said hydraulic control circuit started to control the hydraulic pressures to achieve the downshift; and a fail-safe circuit working to stop the engine output increasing control when the elapsed time, as measured by said timer, has reached a time selected to be longer than that required by the hydraulic pressure acting on the off-going one of the frictional elements to drop to within the given lower range usually during control of the hydraulic pressures for the downshift, and said hydraulic pressure detector does not yet detect the fact that the hydraulic pressure acting on the off-going one of the frictional elements of the automatic transmission lies within the given lower range.

19. An automatic transmission control apparatus as set forth in claim 18, wherein the automatic transmission control apparatus is designed to be installed in a vehicle equipped with an electronic throttle system working to operate a throttle valve for the engine through an electronic actuator, wherein said engine output increasing circuit is designed to control an amount of opening of the throttle valve to achieve the engine output increasing control, and wherein said fail-safe circuit works to close the throttle valve to stop the engine output increasing control.

20. An automatic transmission control apparatus as set forth in claim 19, wherein said fail-safe circuit works to establish a fuel cut in the engine to stop the engine output increasing control.

21. An automatic transmission control apparatus as set forth in claim 19, wherein said fail-safe circuit works to correct an amount of retard of ignition timing in the engine to stop the engine output increasing control.

22. An automatic transmission control apparatus comprising:

a hydraulic control circuit which controls hydraulic pressures to be applied to a plurality of frictional elements of an automatic transmission joined to an engine to selectively achieve engagement and disengagement of the frictional elements for establishing a required speed of the automatic transmission;

an engine output increasing circuit designed to perform engine output increasing control to increase an output of the engine upon a downshift of the automatic transmission to develop engine braking in response to a request from an operator to decelerate a speed of the automatic transmission, said engine output increasing circuit initiating the engine output increasing control within an interval between start to control the hydraulic pressures through said hydraulic control circuit to achieve the downshift and start of an actual shift in speed of the automatic transmission; and a fail-safe circuit working to stop the engine output increasing control immediately when a speed of one of an input shaft and an output shaft of the automatic transmission has dropped below a given failure decision value after start of control of the hydraulic pressures for achieving the downshift.

23. An automatic transmission control apparatus as set forth in claim 22, wherein said fail-safe circuit determines the failure decision value as a function of a deceleration of a vehicle in which the engine is mounted.

24. An automatic transmission control apparatus as set forth in claim 22, wherein the automatic transmission control apparatus is designed to be installed in a vehicle equipped with an electronic throttle system working to operate a throttle valve for the engine through an electronic actuator, wherein said engine output increasing circuit is designed to control an amount of opening of the throttle valve to achieve the engine output increasing control, and wherein said fail-safe circuit works to close the throttle valve to stop the engine output increasing control.

25. An automatic transmission control apparatus as set forth in claim 22, wherein said fail-safe circuit works to establish a fuel cut in the engine to stop the engine output increasing control.

26. An automatic transmission control apparatus as set forth in claim 22, wherein said fail-safe circuit works to correct an amount of retard of ignition timing in the engine to stop the engine output increasing control.

27. An automatic transmission control apparatus comprising:

a hydraulic control circuit which controls hydraulic pressures to be applied to a plurality of frictional elements of an automatic transmission joined to an engine mounted in a vehicle to selectively achieve engagement and disengagement of the frictional elements for establishing a required speed of the automatic transmission;

an engine output increasing circuit designed to perform engine output increasing control to increase an output of the engine upon a downshift of the automatic transmission to develop engine braking in response to a request from an operator to decelerate a speed of the automatic transmission, said engine output increasing circuit initiating the engine output increasing control within an interval between start to control the hydraulic pressures through said hydraulic control circuit to achieve the downshift and start of an actual shift in speed of the automatic transmission; and a fail-safe circuit working to stop the engine output increasing control immediately when detecting a fact that a torque converter of the automatic transmission has switched in rotation from a reverse direction which develops the engine braking to a normal direction where engine torque is transmitted to wheels of the vehicle is detected before the downshift is made actually following initiation of control of the hydraulic pressures for the downshift.

28. An automatic transmission control apparatus as set forth in claim 27, wherein when a speed of the engine exceeds a speed of an input shaft of the automatic transmission after start of control of the hydraulic pressures for the downshift and before start of an actual downshift of the automatic transmission, said fail-safe circuit determines that the fact that the torque converter of the automatic transmission has switched in rotation from the reverse direction to the normal direction is detected.

29. An automatic transmission control apparatus as set forth in claim 27, wherein the automatic transmission control apparatus is designed to be installed in a vehicle equipped with an electronic throttle system working to operate a throttle valve for the engine through an electronic actuator, wherein said engine output increasing circuit is designed to control an amount of opening of the throttle valve to achieve the engine output increasing control, and wherein said fail-safe circuit works to close the throttle valve to stop the engine output increasing control.

30. An automatic transmission control apparatus as set forth in claim 27, wherein said fail-safe circuit works to establish a fuel cut in the engine to stop the engine output increasing control.

31. An automatic transmission control apparatus as set forth in claim 27, wherein said fail-safe circuit works to correct an amount of retard of ignition timing in the engine to stop the engine output increasing control.

* * * * *